US009347271B2

(12) United States Patent
Zediker et al.

(10) Patent No.: US 9,347,271 B2
(45) Date of Patent: May 24, 2016

(54) OPTICAL FIBER CABLE FOR TRANSMISSION OF HIGH POWER LASER ENERGY OVER GREAT DISTANCES

(75) Inventors: Mark S. Zediker, Weldon Spring, MO (US); Charles C. Rinzler, Denver, CO (US); Brian O. Faircloth, Evergreen, CO (US); Joel F. Moxley, Denver, CO (US); Yeshaya Koblick, Sharon, MA (US)

(73) Assignee: Foro Energy, Inc., Littleton, CO (US)

( * ) Notice: Subject to any disclaimer, the term of this patent is extended or adjusted under 35 U.S.C. 154(b) by 659 days.

(21) Appl. No.: 12/706,576

(22) Filed: Feb. 16, 2010

(65) Prior Publication Data

US 2010/0215326 A1   Aug. 26, 2010

Related U.S. Application Data

(63) Continuation-in-part of application No. 12/544,136, filed on Aug. 19, 2009, now Pat. No. 8,511,401.

(60) Provisional application No. 61/106,472, filed on Oct. 17, 2008, provisional application No. 61/153,271, filed on Feb. 17, 2009, provisional application No. 61/295,562, filed on Jan. 15, 2010.

(51) Int. Cl.
*G02B 6/44* (2006.01)
*E21B 7/14* (2006.01)
*E21B 10/60* (2006.01)
*G02B 6/42* (2006.01)

(52) U.S. Cl.
CPC . *E21B 7/14* (2013.01); *E21B 10/60* (2013.01); *G02B 6/443* (2013.01); *G02B 6/4415* (2013.01); *G02B 6/4296* (2013.01); *G02B 6/4436* (2013.01); *G02B 6/4492* (2013.01)

(58) Field of Classification Search
CPC .................................... G02B 6/44; G02B 6/28
USPC .................................................. 385/123, 124
See application file for complete search history.

(56) References Cited

U.S. PATENT DOCUMENTS 914,636 A   3/1909 Case
2,548,463 A   4/1951 Blood (Continued)

FOREIGN PATENT DOCUMENTS

DE   4429022   2/1996
EP   0 295 045 A2   12/1988

(Continued)

OTHER PUBLICATIONS

International Search Report and Written Opinion for PCT App. No. PCT/US10/24368, dated Nov. 2, 2010, 16 pgs.

(Continued)

*Primary Examiner* — Kaveh C Kianni
(74) *Attorney, Agent, or Firm* — Glen P. Belvis; Steptoe & Johnson

(57) ABSTRACT

There is provided a system and apparatus for the transmission of high power laser energy over great distances without substantial power loss and without the presence of stimulated Raman scattering. There is further provided systems and optical fiber cable configurations and optical fiber structures for the delivering high power laser energy over great distances to a tool or surface to perform an operation or work with the tool or upon the surface.

16 Claims, 6 Drawing Sheets

(56) References Cited

U.S. PATENT DOCUMENTS

| | | | |
|---|---|---|---|
| 2,742,555 A | 4/1956 | Murray | |
| 3,122,212 A | 2/1964 | Karlovitz | |
| 3,383,491 A | 5/1968 | Muncheryan | |
| 3,461,964 A | 8/1969 | Venghiattis | |
| 3,493,060 A | 2/1970 | Van Dyk | |
| 3,503,804 A | 3/1970 | Schneider et al. | |
| 3,539,221 A | 11/1970 | Gladstone | |
| 3,544,165 A | 12/1970 | Snedden | |
| 3,556,600 A | 1/1971 | Shoupp et al. | |
| 3,574,357 A | 4/1971 | Alexandru et al. | |
| 3,586,413 A | 6/1971 | Adams | |
| 3,652,447 A | 3/1972 | Yant | |
| 3,693,718 A | 9/1972 | Stout | |
| 3,699,649 A | 10/1972 | McWilliams | |
| 3,802,203 A | 4/1974 | Ichise et al. | |
| 3,820,605 A | 6/1974 | Barber et al. | |
| 3,821,510 A | 6/1974 | Muncheryan | |
| 3,823,788 A | 7/1974 | Garrison et al. | |
| 3,871,485 A | 3/1975 | Keenan, Jr. | |
| 3,882,945 A | 5/1975 | Keenan, Jr. | |
| 3,938,599 A | 2/1976 | Horn | |
| 3,960,448 A | 6/1976 | Schmidt et al. | |
| 3,977,478 A | 8/1976 | Shuck | |
| 3,992,095 A | 11/1976 | Jacoby et al. | |
| 3,998,281 A | 12/1976 | Salisbury et al. | |
| 4,019,331 A | 4/1977 | Rom et al. | |
| 4,025,091 A | 5/1977 | Zeile, Jr. | |
| 4,026,356 A | 5/1977 | Shuck | |
| 4,047,580 A | 9/1977 | Yahiro et al. | |
| 4,057,118 A | 11/1977 | Ford | |
| 4,061,190 A | 12/1977 | Bloomfield | |
| 4,066,138 A | 1/1978 | Salisbury et al. | |
| 4,090,572 A | 5/1978 | Welch | |
| 4,113,036 A | 9/1978 | Stout | |
| 4,125,757 A | 11/1978 | Ross | |
| 4,151,393 A | 4/1979 | Fenneman et al. | |
| 4,162,400 A | 7/1979 | Pitts, Jr. | |
| 4,189,705 A | 2/1980 | Pitts, Jr. | |
| 4,194,536 A | 3/1980 | Stine et al. | |
| 4,199,034 A | 4/1980 | Salisbury et al. | |
| 4,227,582 A | 10/1980 | Price | |
| 4,228,856 A | 10/1980 | Reale | |
| 4,243,298 A | 1/1981 | Kao et al. | |
| 4,249,925 A | 2/1981 | Kawashima et al. | |
| 4,252,015 A | 2/1981 | Harbon et al. | |
| 4,256,146 A | 3/1981 | Genini et al. | |
| 4,266,609 A | 5/1981 | Rom et al. | |
| 4,280,535 A | 7/1981 | Willis | |
| 4,281,891 A | 8/1981 | Shinohara et al. | |
| 4,282,940 A | 8/1981 | Salisbury et al. | |
| 4,332,401 A | 6/1982 | Stephenson et al. | |
| 4,336,415 A | 6/1982 | Walling | |
| 4,340,245 A | 7/1982 | Stalder | |
| 4,367,917 A | 1/1983 | Gray | |
| 4,370,886 A | 2/1983 | Smith, Jr. et al. | |
| 4,374,530 A | 2/1983 | Walling | |
| 4,375,164 A | 3/1983 | Dodge et al. | |
| 4,389,645 A | 6/1983 | Wharton | |
| 4,415,184 A | 11/1983 | Stephenson et al. | |
| 4,417,603 A | 11/1983 | Argy | |
| 4,436,177 A | 3/1984 | Elliston | |
| 4,444,420 A | 4/1984 | McStravick et al. | |
| 4,453,570 A | 6/1984 | Hutchison | |
| 4,459,731 A | 7/1984 | Hutchison | |
| 4,477,106 A | 10/1984 | Hutchison | |
| 4,504,112 A | 3/1985 | Gould et al. | |
| 4,522,464 A | 6/1985 | Thompson et al. | |
| 4,531,552 A | 7/1985 | Kim | |
| 4,565,351 A | 1/1986 | Conti et al. | |
| 4,662,437 A | 5/1987 | Renfro | |
| 4,676,586 A * | 6/1987 | Jones et al. | 385/33 |
| 4,694,865 A | 9/1987 | Tauschmann | |
| 4,725,116 A | 2/1988 | Spencer et al. | |
| 4,741,405 A | 5/1988 | Moeny et al. | |
| 4,744,420 A | 5/1988 | Patterson et al. | |
| 4,770,493 A | 9/1988 | Ara et al. | |
| 4,793,383 A | 12/1988 | Gyory et al. | |
| 4,830,113 A | 5/1989 | Geyer | |
| 4,860,654 A | 8/1989 | Chawla et al. | |
| 4,860,655 A | 8/1989 | Chawla | |
| 4,872,520 A | 10/1989 | Nelson | |
| 4,924,870 A | 5/1990 | Wlodarczyk et al. | |
| 4,952,771 A | 8/1990 | Wrobel | |
| 4,989,236 A | 1/1991 | Myllymäki | |
| 4,997,250 A | 3/1991 | Ortiz, Jr. | |
| 5,003,144 A | 3/1991 | Lindroth et al. | |
| 5,004,166 A | 4/1991 | Sellar | |
| 5,033,545 A | 7/1991 | Sudol | |
| 5,049,738 A | 9/1991 | Gergely et al. | |
| 5,084,617 A | 1/1992 | Gergely | |
| 5,086,842 A | 2/1992 | Cholet | |
| 5,093,880 A * | 3/1992 | Matsuda et al. | 385/100 |
| 5,107,936 A | 4/1992 | Foppe | |
| 5,121,872 A | 6/1992 | Legget | |
| 5,125,061 A | 6/1992 | Marlier et al. | |
| 5,125,063 A | 6/1992 | Panuska et al. | |
| 5,128,882 A | 7/1992 | Cooper et al. | |
| 5,140,664 A | 8/1992 | Bosisio et al. | |
| 5,163,321 A | 11/1992 | Perales | |
| 5,168,940 A | 12/1992 | Foppe | |
| 5,172,112 A | 12/1992 | Jennings | |
| 5,182,785 A * | 1/1993 | Savegh et al. | 385/128 |
| 5,212,755 A | 5/1993 | Holmberg | |
| 5,269,377 A | 12/1993 | Martin | |
| 5,285,204 A | 2/1994 | Sas-Jaworsky | |
| 5,348,097 A | 9/1994 | Giannesini et al. | |
| 5,351,533 A | 10/1994 | Macadam et al. | |
| 5,353,875 A | 10/1994 | Schultz et al. | |
| 5,355,967 A | 10/1994 | Mueller et al. | |
| 5,356,081 A | 10/1994 | Sellar | |
| 5,396,805 A | 3/1995 | Surjaatmadja | |
| 5,397,372 A * | 3/1995 | Partus et al. | 65/391 |
| 5,411,081 A | 5/1995 | Moore et al. | |
| 5,411,085 A | 5/1995 | Moore et al. | |
| 5,411,105 A | 5/1995 | Gray | |
| 5,413,045 A | 5/1995 | Miszewski | |
| 5,413,170 A | 5/1995 | Moore | |
| 5,419,188 A | 5/1995 | Rademaker et al. | |
| 5,423,383 A | 6/1995 | Pringle | |
| 5,425,420 A | 6/1995 | Pringle | |
| 5,435,351 A | 7/1995 | Head | |
| 5,435,395 A | 7/1995 | Connell | |
| 5,463,711 A | 10/1995 | Chu | |
| 5,465,793 A | 11/1995 | Pringle | |
| 5,469,878 A | 11/1995 | Pringle | |
| 5,479,860 A | 1/1996 | Ellis | |
| 5,483,988 A | 1/1996 | Pringle | |
| 5,488,992 A | 2/1996 | Pringle | |
| 5,500,768 A | 3/1996 | Doggett et al. | |
| 5,501,385 A * | 3/1996 | Halpin | 225/96 |
| 5,503,014 A | 4/1996 | Griffith | |
| 5,503,370 A | 4/1996 | Newman et al. | |
| 5,505,259 A | 4/1996 | Wittrisch et al. | |
| 5,515,926 A | 5/1996 | Boychuk | |
| 5,526,887 A | 6/1996 | Vestavik | |
| 5,561,516 A | 10/1996 | Noble et al. | |
| 5,566,267 A * | 10/1996 | Neuberger | 385/123 |
| 5,566,764 A | 10/1996 | Elliston | |
| 5,573,225 A | 11/1996 | Boyle et al. | |
| 5,574,815 A * | 11/1996 | Kneeland | 385/101 |
| 5,577,560 A | 11/1996 | Coronado et al. | |
| 5,581,385 A * | 12/1996 | Spitzer et al. | 349/58 |
| 5,586,609 A | 12/1996 | Schuh | |
| 5,599,004 A | 2/1997 | Newman et al. | |
| 5,615,052 A | 3/1997 | Doggett | |
| 5,619,602 A * | 4/1997 | Sandstrom et al. | 385/31 |
| 5,638,904 A | 6/1997 | Misselbrook et al. | |
| 5,655,745 A | 8/1997 | Morrill | |
| 5,692,087 A * | 11/1997 | Partus et al. | 385/123 |
| 5,694,408 A | 12/1997 | Bott et al. | |
| 5,707,939 A | 1/1998 | Patel | |
| 5,757,484 A | 5/1998 | Miles et al. | |
| 5,759,859 A | 6/1998 | Sausa | |
| 5,771,984 A | 6/1998 | Potter et al. | |

(56) References Cited

U.S. PATENT DOCUMENTS

| | | |
|---|---|---|
| 5,773,791 A | 6/1998 | Kuykendal |
| 5,774,610 A * | 6/1998 | O'Rourke et al. .............. 385/52 |
| 5,794,703 A | 8/1998 | Newman et al. |
| 5,813,465 A | 9/1998 | Terrell et al. |
| 5,828,003 A | 10/1998 | Thomeer et al. |
| 5,832,006 A | 11/1998 | Rice et al. |
| 5,833,003 A | 11/1998 | Longbottom et al. |
| 5,847,825 A | 12/1998 | Alexander |
| 5,862,273 A | 1/1999 | Pelletier |
| 5,862,862 A | 1/1999 | Terrell |
| 5,896,482 A | 4/1999 | Blee et al. |
| 5,896,938 A | 4/1999 | Moeny et al. |
| 5,902,499 A | 5/1999 | Richerzhagen |
| 5,905,834 A | 5/1999 | Anderson |
| 5,909,306 A | 6/1999 | Goldberg et al. |
| 5,913,337 A | 6/1999 | Williams et al. |
| 5,924,489 A | 7/1999 | Hatcher |
| 5,929,986 A | 7/1999 | Slater et al. |
| 5,933,945 A | 8/1999 | Thomeer et al. |
| 5,938,954 A | 8/1999 | Onuma et al. |
| 5,973,783 A | 10/1999 | Goldner et al. |
| 5,978,534 A * | 11/1999 | O'Rourke et al. .............. 385/52 |
| 5,986,756 A | 11/1999 | Slater et al. |
| 5,991,479 A * | 11/1999 | Kleinerman ................. 385/31 |
| RE36,525 E | 1/2000 | Pringle |
| 6,015,015 A | 1/2000 | Luft et al. |
| 6,038,363 A | 3/2000 | Slater et al. |
| 6,059,037 A | 5/2000 | Longbottom et al. |
| 6,060,662 A | 5/2000 | Rafie et al. |
| 6,065,540 A | 5/2000 | Thomeer et al. |
| RE36,723 E | 6/2000 | Moore et al. |
| 6,076,602 A | 6/2000 | Gano et al. |
| 6,092,601 A | 7/2000 | Gano et al. |
| 6,104,022 A | 8/2000 | Young et al. |
| RE36,880 E | 9/2000 | Pringle |
| 6,116,344 A | 9/2000 | Longbottom et al. |
| 6,135,206 A | 10/2000 | Gano et al. |
| 6,147,754 A | 11/2000 | Theriault et al. |
| 6,157,893 A | 12/2000 | Berger et al. |
| 6,166,546 A | 12/2000 | Scheihing et al. |
| 6,215,734 B1 | 4/2001 | Moeny et al. |
| 6,227,300 B1 | 5/2001 | Cunningham et al. |
| 6,250,391 B1 | 6/2001 | Proudfoot |
| 6,273,193 B1 | 8/2001 | Hermann et al. |
| 6,275,645 B1 | 8/2001 | Vereecken et al. |
| 6,281,489 B1 | 8/2001 | Tubel et al. |
| 6,292,610 B1 * | 9/2001 | O'Rourke et al. .............. 385/52 |
| 6,301,423 B1 | 10/2001 | Olson |
| 6,309,195 B1 | 10/2001 | Bottos et al. |
| 6,321,839 B1 | 11/2001 | Vereecken et al. |
| 6,352,114 B1 | 3/2002 | Toalson et al. |
| 6,355,928 B1 | 3/2002 | Skinner et al. |
| 6,356,683 B1 | 3/2002 | Hu et al. |
| 6,377,591 B1 | 4/2002 | Hollister et al. |
| 6,384,738 B1 | 5/2002 | Carstensen et al. |
| 6,386,300 B1 | 5/2002 | Curlett et al. |
| 6,401,825 B1 | 6/2002 | Woodrow |
| 6,426,479 B1 | 7/2002 | Bischof |
| 6,437,326 B1 | 8/2002 | Yamate et al. |
| 6,450,257 B1 | 9/2002 | Douglas |
| 6,463,198 B1 * | 10/2002 | Coleman et al. .............. 385/101 |
| 6,494,259 B2 | 12/2002 | Surjaatmadja |
| 6,497,290 B1 | 12/2002 | Misselbrook et al. |
| 6,557,249 B1 | 5/2003 | Pruett et al. |
| 6,561,289 B2 | 5/2003 | Portman et al. |
| 6,564,046 B1 | 5/2003 | Chateau |
| 6,591,046 B2 | 7/2003 | Stottlemyer |
| 6,615,922 B2 | 9/2003 | Deul et al. |
| 6,626,249 B2 | 9/2003 | Rosa |
| 6,644,848 B1 | 11/2003 | Clayton et al. |
| 6,710,720 B2 | 3/2004 | Carstensen et al. |
| 6,712,150 B1 | 3/2004 | Misselbrook et al. |
| 6,725,924 B2 | 4/2004 | Davidson et al. |
| 6,747,743 B2 | 6/2004 | Skinner et al. |
| 6,755,262 B2 | 6/2004 | Parker |
| 6,808,023 B2 | 10/2004 | Smith et al. |
| 6,832,654 B2 | 12/2004 | Ravensbergen et al. |
| 6,847,034 B2 | 1/2005 | Shah et al. |
| 6,851,488 B2 | 2/2005 | Batarseh |
| 6,867,858 B2 | 3/2005 | Owen et al. |
| 6,870,128 B2 | 3/2005 | Kobayashi et al. |
| 6,874,361 B1 | 4/2005 | Meltz et al. |
| 6,880,646 B2 | 4/2005 | Batarseh |
| 6,885,784 B2 | 4/2005 | Bohnert |
| 6,888,097 B2 | 5/2005 | Batarseh |
| 6,888,127 B2 | 5/2005 | Jones et al. |
| 6,912,898 B2 | 7/2005 | Jones et al. |
| 6,913,079 B2 | 7/2005 | Tubel |
| 6,920,395 B2 | 7/2005 | Brown |
| 6,920,946 B2 | 7/2005 | Oglesby |
| 6,923,273 B2 | 8/2005 | Terry et al. |
| 6,944,380 B1 * | 9/2005 | Hideo et al. ................. 385/123 |
| 6,957,576 B2 | 10/2005 | Skinner et al. |
| 6,967,322 B2 | 11/2005 | Jones et al. |
| 6,977,367 B2 | 12/2005 | Tubel et al. |
| 6,978,832 B2 | 12/2005 | Gardner et al. |
| 6,981,561 B2 | 1/2006 | Krueger et al. |
| 6,994,162 B2 | 2/2006 | Robison |
| 7,040,746 B2 | 5/2006 | McCain et al. |
| 7,055,604 B2 | 6/2006 | Jee et al. |
| 7,055,629 B2 | 6/2006 | Oglesby |
| 7,072,044 B2 | 7/2006 | Kringlebotn et al. |
| 7,072,588 B2 | 7/2006 | Skinner |
| 7,086,484 B2 | 8/2006 | Smith, Jr. |
| 7,087,865 B2 | 8/2006 | Lerner |
| 7,088,437 B2 | 8/2006 | Blomster et al. |
| 7,099,533 B1 * | 8/2006 | Chenard ..................... 385/31 |
| 7,126,332 B2 | 10/2006 | Blanz et al. |
| 7,134,488 B2 | 11/2006 | Tudor et al. |
| 7,134,514 B2 | 11/2006 | Riel et al. |
| 7,140,435 B2 | 11/2006 | Defretin et al. |
| 7,147,064 B2 | 12/2006 | Batarseh et al. |
| 7,152,700 B2 | 12/2006 | Church et al. |
| 7,163,875 B2 | 1/2007 | Richerzhagen |
| 7,172,026 B2 | 2/2007 | Misselbrook |
| 7,172,038 B2 | 2/2007 | Terry et al. |
| 7,174,067 B2 | 2/2007 | Murshid et al. |
| 7,188,687 B2 | 3/2007 | Rudd et al. |
| 7,195,731 B2 | 3/2007 | Jones |
| 7,196,786 B2 | 3/2007 | DiFoggio |
| 7,199,869 B2 | 4/2007 | MacDougall |
| 7,201,222 B2 | 4/2007 | Kanady et al. |
| 7,210,343 B2 | 5/2007 | Shammai et al. |
| 7,212,283 B2 | 5/2007 | Hother et al. |
| 7,249,633 B2 | 7/2007 | Ravensbergen et al. |
| 7,264,057 B2 | 9/2007 | Rytlewski et al. |
| 7,270,195 B2 | 9/2007 | MacGregor et al. |
| 7,273,108 B2 | 9/2007 | Misselbrook |
| 7,283,714 B1 * | 10/2007 | Gapontsev et al. ........... 385/126 |
| 7,310,466 B2 * | 12/2007 | Fink et al. ................... 385/126 |
| 7,334,637 B2 | 2/2008 | Smith, Jr. |
| 7,337,660 B2 | 3/2008 | Ibrahim et al. |
| 7,362,422 B2 | 4/2008 | DiFoggio et al. |
| 7,372,230 B2 | 5/2008 | McKay |
| 7,394,064 B2 | 7/2008 | Marsh |
| 7,395,696 B2 | 7/2008 | Bissonnette et al. |
| 7,416,032 B2 | 8/2008 | Moeny et al. |
| 7,416,258 B2 | 8/2008 | Reed et al. |
| 7,424,190 B2 | 9/2008 | Dowd et al. |
| 7,471,831 B2 | 12/2008 | Bearman et al. |
| 7,487,834 B2 | 2/2009 | Reed et al. |
| 7,490,664 B2 | 2/2009 | Skinner et al. |
| 7,503,404 B2 | 3/2009 | McDaniel et al. |
| 7,515,782 B2 | 4/2009 | Zhang et al. |
| 7,516,802 B2 | 4/2009 | Smith, Jr. |
| 7,518,722 B2 | 4/2009 | Julian et al. |
| 7,527,108 B2 | 5/2009 | Moeny |
| 7,530,406 B2 | 5/2009 | Moeny et al. |
| 7,535,628 B2 * | 5/2009 | Tsuchiya et al. .............. 359/333 |
| 7,559,378 B2 | 7/2009 | Moeny |
| 7,587,111 B2 | 9/2009 | de Montmorillon et al. |
| 7,600,564 B2 | 10/2009 | Shampine et al. |
| 7,603,011 B2 | 10/2009 | Varkey et al. |
| 7,617,873 B2 | 11/2009 | Lovell et al. |

(56) References Cited

U.S. PATENT DOCUMENTS

| | | | |
|---|---|---|---|
| 7,624,743 B2 | 12/2009 | Sarkar et al. | |
| 7,628,227 B2 | 12/2009 | Marsh | |
| 7,646,953 B2 | 1/2010 | Dowd et al. | |
| 7,647,948 B2 | 1/2010 | Quigley et al. | |
| 7,671,983 B2 | 3/2010 | Shammai et al. | |
| 7,715,664 B1 | 5/2010 | Shou et al. | |
| 7,720,323 B2 | 5/2010 | Yamate et al. | |
| 7,769,260 B2 | 8/2010 | Hansen et al. | |
| 7,802,384 B2 | 9/2010 | Kobayashi et al. | |
| 7,834,777 B2 | 11/2010 | Gold | |
| 7,848,368 B2 | 12/2010 | Gapontsev et al. | |
| 7,900,699 B2 | 3/2011 | Ramos et al. | |
| 7,938,175 B2 | 5/2011 | Skinner et al. | |
| 8,011,454 B2 | 9/2011 | Castillo | |
| 8,062,986 B2* | 11/2011 | Khrapko et al. | 501/54 |
| 8,074,332 B2 | 12/2011 | Keatch et al. | |
| 8,082,996 B2 | 12/2011 | Kocis et al. | |
| 8,091,638 B2 | 1/2012 | Dusterhoft et al. | |
| 8,109,345 B2 | 2/2012 | Jeffryes | |
| 8,175,433 B2 | 5/2012 | Caldwell et al. | |
| 8,385,705 B2* | 2/2013 | Overton et al. | 385/128 |
| 2002/0007945 A1 | 1/2002 | Neuroth et al. | |
| 2002/0028287 A1* | 3/2002 | Kawada et al. | 427/163.1 |
| 2002/0039465 A1 | 4/2002 | Skinner | |
| 2002/0189806 A1 | 12/2002 | Davidson et al. | |
| 2003/0000741 A1 | 1/2003 | Rosa | |
| 2003/0053783 A1 | 3/2003 | Shirasaki | |
| 2003/0056990 A1 | 3/2003 | Oglesby | |
| 2003/0085040 A1 | 5/2003 | Hemphill et al. | |
| 2003/0094281 A1 | 5/2003 | Tubel | |
| 2003/0132029 A1 | 7/2003 | Parker | |
| 2003/0145991 A1 | 8/2003 | Olsen | |
| 2003/0159283 A1 | 8/2003 | White | |
| 2003/0160164 A1 | 8/2003 | Jones et al. | |
| 2003/0226826 A1 | 12/2003 | Kobayashi et al. | |
| 2004/0006429 A1 | 1/2004 | Brown | |
| 2004/0016295 A1 | 1/2004 | Skinner et al. | |
| 2004/0020643 A1 | 2/2004 | Thomeer et al. | |
| 2004/0026382 A1 | 2/2004 | Richerzhagen | |
| 2004/0033017 A1 | 2/2004 | Kringlebotn et al. | |
| 2004/0036955 A1* | 2/2004 | Digonnet et al. | 359/341.1 |
| 2004/0074979 A1 | 4/2004 | McGuire | |
| 2004/0093950 A1 | 5/2004 | Bohnert | |
| 2004/0112642 A1 | 6/2004 | Krueger et al. | |
| 2004/0119471 A1 | 6/2004 | Blanz et al. | |
| 2004/0129418 A1 | 7/2004 | Jee et al. | |
| 2004/0195003 A1 | 10/2004 | Batarseh | |
| 2004/0206505 A1 | 10/2004 | Batarseh | |
| 2004/0207731 A1 | 10/2004 | Bearman et al. | |
| 2004/0211894 A1 | 10/2004 | Hother et al. | |
| 2004/0218176 A1 | 11/2004 | Shammal et al. | |
| 2004/0244970 A1 | 12/2004 | Smith, Jr. | |
| 2004/0252748 A1 | 12/2004 | Gleitman | |
| 2004/0256103 A1 | 12/2004 | Batarseh | |
| 2005/0007583 A1 | 1/2005 | DiFoggio | |
| 2005/0012244 A1 | 1/2005 | Jones | |
| 2005/0024716 A1* | 2/2005 | Nilsson et al. | 359/341.31 |
| 2005/0034857 A1 | 2/2005 | Defretin et al. | |
| 2005/0094129 A1 | 5/2005 | MacDougall | |
| 2005/0099618 A1 | 5/2005 | DiFoggio et al. | |
| 2005/0115741 A1 | 6/2005 | Terry et al. | |
| 2005/0121235 A1 | 6/2005 | Larsen et al. | |
| 2005/0189146 A1 | 9/2005 | Oglesby | |
| 2005/0201652 A1 | 9/2005 | Ellwood, Jr. | |
| 2005/0230107 A1 | 10/2005 | McDaniel et al. | |
| 2005/0252286 A1 | 11/2005 | Ibrahim et al. | |
| 2005/0263281 A1 | 12/2005 | Lovell et al. | |
| 2005/0268704 A1 | 12/2005 | Bissonnette et al. | |
| 2005/0269132 A1 | 12/2005 | Batarseh et al. | |
| 2005/0272512 A1 | 12/2005 | Bissonnette et al. | |
| 2005/0272513 A1 | 12/2005 | Bissonnette et al. | |
| 2005/0272514 A1 | 12/2005 | Bissonnette et al. | |
| 2005/0282645 A1 | 12/2005 | Bissonnette et al. | |
| 2006/0005579 A1* | 1/2006 | Jacobsen et al. | 65/392 |
| 2006/0038997 A1 | 2/2006 | Julian et al. | |
| 2006/0049345 A1 | 3/2006 | Rao et al. | |
| 2006/0065815 A1 | 3/2006 | Jurca | |
| 2006/0070770 A1 | 4/2006 | Marsh | |
| 2006/0102343 A1 | 5/2006 | Skinner et al. | |
| 2006/0118303 A1 | 6/2006 | Schultz et al. | |
| 2006/0137875 A1 | 6/2006 | Dusterhoft et al. | |
| 2006/0173148 A1* | 8/2006 | Sasaki et al. | 526/319 |
| 2006/0185843 A1 | 8/2006 | Smith, Jr. | |
| 2006/0191684 A1 | 8/2006 | Smith, Jr. | |
| 2006/0204188 A1 | 9/2006 | Clarkson et al. | |
| 2006/0207799 A1 | 9/2006 | Yu | |
| 2006/0231257 A1 | 10/2006 | Reed et al. | |
| 2006/0237233 A1 | 10/2006 | Reed et al. | |
| 2006/0245468 A1* | 11/2006 | Hartog | 374/161 |
| 2006/0257150 A1* | 11/2006 | Tsuchiya et al. | 398/79 |
| 2006/0260832 A1 | 11/2006 | McKay | |
| 2006/0266522 A1 | 11/2006 | Eoff et al. | |
| 2006/0283592 A1 | 12/2006 | Sierra et al. | |
| 2006/0289724 A1 | 12/2006 | Skinner et al. | |
| 2007/0034409 A1 | 2/2007 | Dale et al. | |
| 2007/0081157 A1 | 4/2007 | Csutak et al. | |
| 2007/0125163 A1 | 6/2007 | Dria et al. | |
| 2007/0193990 A1 | 8/2007 | Richerzhagen et al. | |
| 2007/0217736 A1 | 9/2007 | Zhang et al. | |
| 2007/0227741 A1 | 10/2007 | Lovell et al. | |
| 2007/0242265 A1 | 10/2007 | Vessereau et al. | |
| 2007/0247701 A1 | 10/2007 | Akasaka et al. | |
| 2007/0267220 A1 | 11/2007 | Magiawala et al. | |
| 2007/0278195 A1 | 12/2007 | Richerzhagen et al. | |
| 2007/0280615 A1 | 12/2007 | de Montmorillon et al. | |
| 2008/0023202 A1 | 1/2008 | Keatch et al. | |
| 2008/0053702 A1 | 3/2008 | Smith, Jr. | |
| 2008/0073077 A1 | 3/2008 | Tunc et al. | |
| 2008/0093125 A1 | 4/2008 | Potter et al. | |
| 2008/0112760 A1 | 5/2008 | Curlett | |
| 2008/0128123 A1 | 6/2008 | Gold | |
| 2008/0138022 A1 | 6/2008 | Tassone | |
| 2008/0165356 A1 | 7/2008 | DiFoggio et al. | |
| 2008/0166132 A1 | 7/2008 | Lynde et al. | |
| 2008/0180787 A1 | 7/2008 | DiGiovanni et al. | |
| 2008/0245568 A1 | 10/2008 | Jeffryes | |
| 2008/0273852 A1 | 11/2008 | Parker et al. | |
| 2009/0020333 A1 | 1/2009 | Marsh | |
| 2009/0029842 A1* | 1/2009 | Khrapko et al. | 501/53 |
| 2009/0031870 A1 | 2/2009 | O'Connor | |
| 2009/0033176 A1 | 2/2009 | Huang et al. | |
| 2009/0049345 A1 | 2/2009 | Mock et al. | |
| 2009/0050371 A1 | 2/2009 | Moeny | |
| 2009/0078467 A1 | 3/2009 | Castillo | |
| 2009/0105955 A1 | 4/2009 | Castillo et al. | |
| 2009/0126235 A1 | 5/2009 | Kobayashi et al. | |
| 2009/0133871 A1 | 5/2009 | Skinner et al. | |
| 2009/0133929 A1 | 5/2009 | Rodland | |
| 2009/0139768 A1 | 6/2009 | Castillo | |
| 2009/0166042 A1 | 7/2009 | Skinner | |
| 2009/0190887 A1 | 7/2009 | Freeland et al. | |
| 2009/0194292 A1 | 8/2009 | Oglesby | |
| 2009/0205675 A1 | 8/2009 | Sarkar et al. | |
| 2009/0207485 A1* | 8/2009 | Goto | 359/341.3 |
| 2009/0214154 A1* | 8/2009 | Kashiwagi | 385/12 |
| 2009/0260834 A1 | 10/2009 | Henson et al. | |
| 2009/0266562 A1 | 10/2009 | Greenaway | |
| 2209/0266552 | 10/2009 | Barra et al. | |
| 2009/0272424 A1 | 11/2009 | Ortabasi | |
| 2009/0272547 A1 | 11/2009 | Dale et al. | |
| 2009/0274175 A1* | 11/2009 | Kitabayashi et al. | 372/3 |
| 2009/0279635 A1 | 11/2009 | De Montmorillon et al. | |
| 2009/0294050 A1 | 12/2009 | Traggis et al. | |
| 2009/0308852 A1 | 12/2009 | Alpay et al. | |
| 2009/0310917 A1* | 12/2009 | Roos et al. | 385/70 |
| 2009/0324183 A1 | 12/2009 | Bringuier et al. | |
| 2009/0324186 A1* | 12/2009 | Goto | 385/127 |
| 2010/0000790 A1 | 1/2010 | Moeny | |
| 2010/0001179 A1 | 1/2010 | Kobayashi et al. | |
| 2010/0008631 A1 | 1/2010 | Herbst | |
| 2010/0013663 A1 | 1/2010 | Cavender et al. | |
| 2010/0018703 A1 | 1/2010 | Lovell et al. | |
| 2010/0025032 A1 | 2/2010 | Smith et al. | |
| 2010/0032207 A1 | 2/2010 | Potter et al. | |

(56) References Cited

U.S. PATENT DOCUMENTS

| | | |
|---|---|---|
| 2010/0044102 A1 | 2/2010 | Rinzler |
| 2010/0044103 A1 | 2/2010 | Moxley |
| 2010/0044104 A1 | 2/2010 | Zediker |
| 2010/0044105 A1 | 2/2010 | Faircloth |
| 2010/0044106 A1* | 2/2010 | Zediker et al. ............... 175/16 |
| 2010/0071794 A1 | 3/2010 | Homan |
| 2010/0078414 A1 | 4/2010 | Perry et al. |
| 2010/0084132 A1 | 4/2010 | Noya et al. |
| 2010/0089571 A1 | 4/2010 | Revellat et al. |
| 2010/0089574 A1 | 4/2010 | Wideman et al. |
| 2010/0089576 A1 | 4/2010 | Wideman et al. |
| 2010/0089577 A1 | 4/2010 | Wideman et al. |
| 2010/0111474 A1 | 5/2010 | Satake |
| 2010/0114190 A1* | 5/2010 | Bendett et al. ............... 607/3 |
| 2010/0155059 A1 | 6/2010 | Ullah |
| 2010/0158457 A1* | 6/2010 | Drozd et al. ............... 385/113 |
| 2010/0170672 A1 | 7/2010 | Schwoebel et al. |
| 2010/0170680 A1 | 7/2010 | McGregor et al. |
| 2010/0187010 A1 | 7/2010 | Abbasi et al. |
| 2010/0195957 A1* | 8/2010 | Roos et al. ............... 385/29 |
| 2010/0197116 A1 | 8/2010 | Shah et al. |
| 2010/0215326 A1 | 8/2010 | Zediker et al. |
| 2010/0218993 A1 | 9/2010 | Wideman et al. |
| 2010/0224408 A1 | 9/2010 | Kocis et al. |
| 2010/0226135 A1 | 9/2010 | Chen |
| 2010/0236785 A1 | 9/2010 | Collis et al. |
| 2010/0290781 A1* | 11/2010 | Overton et al. ............... 398/43 |
| 2010/0326659 A1 | 12/2010 | Schultz et al. |
| 2010/0326665 A1 | 12/2010 | Redlinger et al. |
| 2011/0030957 A1 | 2/2011 | Constantz et al. |
| 2011/0035154 A1 | 2/2011 | Kendall et al. |
| 2011/0048743 A1 | 3/2011 | Stafford et al. |
| 2011/0061869 A1 | 3/2011 | Abass et al. |
| 2011/0079437 A1 | 4/2011 | Hopkins et al. |
| 2011/0122644 A1* | 5/2011 | Okuno ............... 362/553 |
| 2011/0127028 A1 | 6/2011 | Strickland |
| 2011/0139450 A1 | 6/2011 | Vasques et al. |
| 2011/0147013 A1 | 6/2011 | Kilgore |
| 2011/0162854 A1 | 7/2011 | Bailey et al. |
| 2011/0168443 A1 | 7/2011 | Smolka |
| 2011/0170563 A1* | 7/2011 | Heebner et al. ............... 372/3 |
| 2011/0174537 A1 | 7/2011 | Potter et al. |
| 2011/0186298 A1 | 8/2011 | Clark et al. |
| 2011/0198075 A1 | 8/2011 | Okada et al. |
| 2011/0205652 A1 | 8/2011 | Abbasi et al. |
| 2011/0220409 A1 | 9/2011 | Foppe |
| 2011/0240314 A1 | 10/2011 | Greenaway |
| 2011/0266062 A1 | 11/2011 | Shuman, V et al. |
| 2011/0278070 A1 | 11/2011 | Hopkins et al. |
| 2011/0290563 A1 | 12/2011 | Kocis et al. |
| 2011/0303460 A1 | 12/2011 | Von Rohr et al. |
| 2012/0000646 A1 | 1/2012 | Liotta et al. |
| 2012/0012392 A1 | 1/2012 | Kumar |
| 2012/0012393 A1 | 1/2012 | Kumar |
| 2012/0020631 A1 | 1/2012 | Rinzler |
| 2012/0048550 A1 | 3/2012 | Dusterhoft et al. |
| 2012/0048568 A1 | 3/2012 | Li et al. |
| 2012/0061091 A1 | 3/2012 | Radi |
| 2012/0067643 A1 | 3/2012 | DeWitt |
| 2012/0068086 A1 | 3/2012 | DeWitt |
| 2012/0068523 A1 | 3/2012 | Bowles |
| 2012/0074110 A1 | 3/2012 | Zediker |
| 2012/0103693 A1 | 5/2012 | Jeffryes |
| 2012/0111578 A1 | 5/2012 | Tverlid |
| 2012/0118568 A1 | 5/2012 | Kleefisch et al. |
| 2012/0118578 A1 | 5/2012 | Skinner |
| 2012/0189258 A1* | 7/2012 | Overton et al. ............... 385/124 |
| 2012/0217015 A1 | 8/2012 | Zediker |
| 2012/0217017 A1 | 8/2012 | Zediker |
| 2012/0217018 A1 | 8/2012 | Zediker |
| 2012/0217019 A1 | 8/2012 | Zediker |
| 2012/0239013 A1* | 9/2012 | Islam ............... 606/3 |
| 2012/0248078 A1 | 10/2012 | Zediker |
| 2012/0255774 A1 | 10/2012 | Grubb |
| 2012/0255933 A1 | 10/2012 | McKay |
| 2012/0261188 A1 | 10/2012 | Zediker |
| 2012/0266803 A1 | 10/2012 | Zediker |
| 2012/0267168 A1 | 10/2012 | Grubb et al. |
| 2012/1267168 | 10/2012 | Grubb |
| 2012/0273269 A1 | 11/2012 | Rinzler |
| 2012/0273470 A1 | 11/2012 | Zediker |
| 2012/0275159 A1 | 11/2012 | Fraze |
| 2013/0011102 A1 | 1/2013 | Rinzler |
| 2013/0175090 A1 | 7/2013 | Zediker |
| 2013/0192893 A1 | 8/2013 | Zediker |
| 2013/0192894 A1 | 8/2013 | Zediker |
| 2013/0220626 A1 | 8/2013 | Zediker |
| 2013/0228372 A1 | 9/2013 | Linyaev |
| 2013/0228557 A1 | 9/2013 | Zediker |
| 2013/0266031 A1 | 10/2013 | Norton |
| 2013/0319984 A1 | 12/2013 | Linyaev |
| 2014/0000902 A1 | 1/2014 | Wolfe |
| 2014/0060802 A1 | 3/2014 | Zediker |
| 2014/0060930 A1 | 3/2014 | Zediker |
| 2014/0069896 A1 | 3/2014 | Deutch |
| 2014/0090846 A1 | 4/2014 | Deutch |
| 2014/0190949 A1 | 7/2014 | Zediker |
| 2014/0231085 A1 | 8/2014 | Zediker |
| 2014/0231398 A1 | 8/2014 | Land |
| 2014/0248025 A1 | 9/2014 | Rinzler |
| 2014/0345872 A1 | 11/2014 | Zediker |

FOREIGN PATENT DOCUMENTS

| | | |
|---|---|---|
| EP | 0 515 983 A1 | 12/1992 |
| EP | 0 565 287 A1 | 10/1993 |
| EP | 0 950 170 B1 | 9/2002 |
| FR | 2 716 924 | 9/1995 |
| GB | 1 284 454 | 8/1972 |
| GB | 2420358 B | 5/2006 |
| JP | 1987-011804 | 1/1987 |
| JP | 09072738 A | 3/1997 |
| JP | 09-242453 A | 9/1997 |
| JP | 2000-334590 A | 12/2000 |
| JP | 2001154070 | 6/2001 |
| JP | 2001-208924 | 8/2001 |
| JP | 2004-108132 A | 4/2004 |
| JP | 2006-039147 | 2/2006 |
| JP | 2006-509253 | 3/2006 |
| JP | 2006-307481 A | 11/2006 |
| JP | 2007-120048 A | 5/2007 |
| JP | 2008-242012 | 10/2008 |
| WO | WO 95/32834 A1 | 12/1995 |
| WO | WO 97/49893 A1 | 12/1997 |
| WO | WO 98/50673 A1 | 11/1998 |
| WO | WO 98/56534 A1 | 12/1998 |
| WO | WO 02/057805 A2 | 7/2002 |
| WO | WO 03/027433 A1 | 4/2003 |
| WO | WO 03/060286 A1 | 7/2003 |
| WO | WO 2004/009958 A1 | 1/2004 |
| WO | WO2004/052078 | 6/2004 |
| WO | WO 2004/094786 A1 | 11/2004 |
| WO | WO 2005/001232 A2 | 1/2005 |
| WO | WO 2005/001239 A1 | 1/2005 |
| WO | WO 2006/008155 A1 | 1/2006 |
| WO | WO 2006/041565 A1 | 4/2006 |
| WO | WO 2006/054079 A1 | 5/2006 |
| WO | WO 2007/002064 A1 | 1/2007 |
| WO | WO 2007/112387 A2 | 10/2007 |
| WO | WO 2007/136485 A2 | 11/2007 |
| WO | WO 2008/016852 A1 | 2/2008 |
| WO | WO 2008/070509 A2 | 6/2008 |
| WO | WO 2008/085675 A1 | 7/2008 |
| WO | WO 2009/042774 A2 | 4/2009 |
| WO | WO 2009/042781 A2 | 4/2009 |
| WO | WO 2009/042785 A2 | 4/2009 |
| WO | WO 2009/131584 A1 | 10/2009 |
| WO | WO 2010/036318 A1 | 4/2010 |
| WO | WO 2010/060177 A1 | 6/2010 |
| WO | WO 2010/087944 A1 | 8/2010 |
| WO | WO 2011/008544 A2 | 1/2011 |
| WO | WO 2011/032083 A1 | 3/2011 |
| WO | WO 2011/041390 A2 | 4/2011 |
| WO | WO 2011/075247 A2 | 6/2011 |

(56) References Cited

FOREIGN PATENT DOCUMENTS

| WO | WO 2011/106078 A2 | 9/2011 |
|----|-------------------|--------|
| WO | WO 2012/003146 A2 | 1/2012 |
| WO | WO 2012/012006 A1 | 1/2012 |
| WO | WO 2012/027699 A1 | 3/2012 |
| WO | WO 2012/064356 A1 | 5/2012 |
| WO | WO 2012/116189 A2 | 8/2012 |

OTHER PUBLICATIONS

Agrawal, Govind P., "Nonlinear Fiber Optics", Chap. 9, Fourth Edition, Academic Press copyright 2007, pp. 334-337.
Damzen, M. J. et al., "Stimulated Brillion Scattering", Chapter 8—SBS in Optical Fibres, OP Publishing Ltd, Published by Institute of Physics, London, England, 2003, pp. 137-153.
Eichler, H.J. et al., "Stimulated Brillouin Scattering in Multimode Fibers for Optical Phase Conjugation", *Optics Communications*, vol. 208, 2002, pp. 427-431.
Kubacki, Emily et al., "Optics for Fiber Laser Applications", *CVI Laser, LLC*, Technical Reference Document #20050415, 2005, 5 pgs.
Lally, Evan M., "A Narrow-Linewidth Laser at 1550 nm Using the Pound-Drever-Hall Stabilization Technique", *Thesis*, submitted to Virginia Polytechnic Institute and State University, Blacksburg, Virginia, 2006, 92 pgs.
McElhenny, John E. et al., "Unique Characteristic Features of Stimulated Brillouin Scattering in Small-Core Photonic Crystal Fibers", *J. Opt. Soc. Am. B*, vol. 25, No. 4, 2008, pp. 582-593.
Mocofanescu, A. et al., "SBS threshold for single mode and multimode GRIN fibers in an all fiber configuration", *Optics Express*, vol. 13, No. 6, 2005, pp. 2019-2024.
Shannon, G. J. et al., "High power laser welding in hyperbaric gas and water environments", *Journal of Laser Applications*, vol. 9, 1997, pp. 129-136.
U.S. Appl. No. 12/706,576, filed Feb. 16, 2010, 28 pgs.
U.S. Appl. No. 12/840,978, filed Jul. 21, 2009, 61 pgs.
Agrawal Dinesh et al., Report on "Development of Advanced Drill Components for BHA Using Mircowave Technology Incorporating Carbide Diamond Composites and Functionally Graded Materials", Microwave Processing and Engineering Center, Material Research Institute, the Pennsylvania State University, 2003, 10 pgs.
Agrawal Dinesh et al., Report on "Graded Steele-Tungsten Cardide/Cobalt-Diamond Systems Using Microwave Heating", Material Research Institute, Penn State University, *Proceedings of the 2002 International Conference on Functionally Graded Materials*, 2002, pp. 50-58.
Agrawal Dinesh et al., "Microstructural by TEM of WC/Co composites Prepared by Conventional and Microwave Processes", Materials Research Lab, the Pennsylvania State University, *15th International Plansee Seminar*, vol. 2, , 2001, pp. 677-684.
Ai, H.A. et al., "Simulation of dynamic response of granite: A numerical approach of shock-induced damage beneath impact craters", *International Journal of Impact Engineering*, vol. 33, 2006, pp. 1-10.
Anton, Richard J. et al., "Dynamic Vickers indentation of brittle materials", *Wear*, vol. 239, 2000, pp. 27-35.
Ashby, M. F. et al., "The Failure of Brittle Solids Containing Small Cracks Under Compressive Stress States", *Acta Metall.*, vol. 34, No. 3, 1986, pp. 497-510.
Aydin, A. et al., "The Schmidt hammer in rock material characterization", *Engineering Geology*, vol. 81, 2005, pp. 1-14.
Baflon, Jean-Paul et al., "On the Relationship Between the Parameters of Paris' Law for Fatigue Crack Growth in Aluminium Alloys", *Scripta Metallurgica*, vol. 11, No. 12, 1977, pp. 1101-1106.
Bailo, El Tahir et al., "Spectral signatures and optic coefficients of surface and reservoir shales and limestones at COIL, $CO_2$ and Nd:YAG laser wavelengths", *Petroleum Engineering Department, Colorado School of Mines*, 2004, 13 pgs.
Baird, J.A. "GEODYN: A Geological Formation/Drillstring Dynamics Computer Program", *Society of Petroleum Engineers of AIME*, 1964, 9 pgs.

Baird, Jerold et al., Phase 1 Theoretical Description, a Geological Formation Drill String Dynamic Interaction Finite Element Program (GEODYN), *Sandia National Laboratories*, Report No. Sand-84/7101, 1984, 196 pgs.
Batarseh, S. et al. "Well Perforation Using High-Power Lasers", *Society of Petroleum Engineers*, SPE 84418, 2003, pp. 1-10.
BDM Corporation, Geothermal Completion Technology Life-Cycle Cost Model (GEOCOM), *Sandia National Laboratories*, for the U.S. Dept. of Energy, vols. 1 and 2, 1982, 222 pgs.
Beste, U. et al., "Micro-scratch evaluation of rock types—a means to comprehend rock drill wear", *Tribology International*, vol. 37, 2004, pp. 203-210.
Blackwell, B. F., "Temperature Profile in Semi-infinite Body With Exponential Source and Convective Boundary Condition", *Journal of Heat Transfer, Transactions of the ASME*, vol. 112, 1990, pp. 567-571.
Britz, Dieter, "Digital Simulation in Electrochemistry", *Lect. Notes Phys.*, vol. 666, 2005, pp. 103-117.
Browning, J. A. et al., "Recent Advances in Flame Jet Working of Minerals", *7th Symposium on Rock Mechanics*, Pennsylvania State Univ., 1965, pp. 281-313.
Cardenas, R., "Protected Polycrystalline Diamond Compact Bits for Hard Rock Drilling", Report No. DOE-99049-1381, *U.S. Department of Energy*, 2000, pp. 1-79.
Carstens, Jeffrey et al., "Heat-Assisted Tunnel Boring Machines", *Federal Railroad Administration and Urban Mass Transportation Administration*, U.S. Dept. of Transportation, Report No. FRA-RT-71-63, 1970, 340 pgs.
Clegg, John et al., "Improved Optimisation of Bit Selection Using Mathematically Modelled Bit-Performance Indices", *IADC/SPE International* 102287, 2006, pp. 1-10.
Close, F. et al., "Successful Drilling of Basalt in a West of Shetland Deepwater Discovery", *SPE International* 96575, Society of Petroleum Engineers, 2006, pp. 1-10.
Cobern, Martin E., "Downhole Vibration Monitoring & Control System Quarterly Technical Report #1", *APS Technology, Inc.*, Quarterly Technical Report #1, DVMCS, 2003, pp. 1-15.
Cogotsi, G. A. et al., "Use of Nondestructive Testing Methods in Evaluation of Thermal Damage for Ceramics Under Conditions of Nonstationary Thermal Effects", *Institute of Strength Problems, Academy of Sciences of the Ukrainian SSR*, 1985, pp. 52-56.
Cook, Troy, "Chapter 23, Calculation of Estimated Ultimate Recovery (EUR) for Wells in Continuous-Type Oil and Gas Accumulations", *U.S. Geological Survey Digital Data Series DDS-69-D*, Denver, Colorado: Version 1, 2005, pp. 1-9.
Dahl, Filip et al., "Development of a new direct test method for estimating cutter life, based on the Sievers J miniature drill test", *Tunnelling and Underground Space Technology*, vol. 22, 2007, pp. 106-116.
Das, A. C. et al., "Acousto-ultrasonic study of thermal shock damage in castable refractory", *Journal of Materials Science Letters*, vol. 10, 1991, pp. 173-175.
De Guire, Mark R., "Thermal Expansion Coefficient (start)", *EMSE 201—Introduction to Materials Science & Engineering*, 2003, pp. 15.1-15.15.
Din Dinçer, er, Ismail et al., "Correlation between Schmidt hardness, uniaxial compressive strength and Young's modulus for andesites, basalts and tuffs", *Bull Eng Geol Env*, vol. 63, 2004, pp. 141-148.
Dunn, James C., "Geothermal Technology Development at Sandia", *Geothermal Research Division, Sandia National Laboratories*, 1987, pp. 1-6.
Eighmy, T. T. et al., "Microfracture Surface Charaterizations: Implications for in Situ Remedial Methods in Fractured Rock", *Bedrock Bioremediation Center, Final Report, National Risk Management Research Laboratory, Office of Research and Development, U.S. Environmental Protection Agency*, EPA/600/R-05/121, 2006, pp. 1-99.
Elsayed, M.A. et al., "Measurement and analysis of Chatter in a Compliant Model of a Drillstring Equipped With a PDC Bit", *Mechanical Engineering Dept., University of Southwestern Louisiana and Sandia National Laboratories*, 2000, pp. 1-10.

(56) References Cited

OTHER PUBLICATIONS

Ferro, D. et al., "Vickers and Knoop hardness of electron beam deposited ZrC and HfC thin films on titanium", *Surface & Coatings Technology*, vol. 200, 2006, pp. 4701-4707.
Figueroa, H. et al., "Rock removal using high power lasers for petroleum exploitation purposes", *Gas Technology Institute, Colorado School of Mines, Halliburton Energy Services, Argonne National Laboratory*, 2002, pp. 1-13.
Finger, John T. et al., "PDC Bit Research at Sandia National Laboratories", Sandia Report, *Geothermal Research Division 6252, Sandia National Laboratories*, SAND89-0079-UC-253, 1989, pp. 1-88.
Gahan, Brian C. et al. "Analysis of Efficient High-Power Fiber Lasers for Well Perforation", *Society of Petroleum Engineers*, SPE 90661, 2004, pp. 1-9.
Gahan, Brian C. et al. "Efficient of Downhole Pressure Conditions on High-Power Laser Perforation", *Society of Petroleum Engineers*, SPE 97093, 2005, pp. 1-7.
Gahan, B. C. et al., "Laser Drilling: Determination of Energy Required to Remove Rock", *Society of Petroleum Engineers* International, SPE 71466, 2001, pp. 1-11.
Gahan, Brian C. et al., "Laser Drilling: Drilling with the Power of Light, Phase 1: Feasibility Study", *Topical Report*, Cooperative Agreement No. DE-FC26-00NT40917, 2000-2001, pp. 1-148.
Glowka, David A., "Design Considerations for a Hard-Rock PDC Drill Bit", *Geothermal Technology Development Division 6241, Sandia National Laboratories*, SAND-85-0666C, DE85 008313, 1985, pp. 1-23.
Glowka, David A., "Development of a Method for Predicting the Performance and Wear of PDC Drill Bits", *Sandia National Laboratories*, SAND86-1745-UC-66c, 1987, pp. 1-206.
Glowka, David A. et al., "Program Plan for the Development of Advanced Synthetic-Diamond Drill Bits for Hard-Rock Drilling", *Sandia National Laboratories*, SAND 93/1953, 1993, pp. 1-50.
Glowka, David A. et al., "Progress in the Advanced Synthetic-Diamond Drill Bit Program", *Sandia National Laboratories*, SAND95-2617C, 1994, pp. 1-9.
Glowka, David A., "The Use of Single-Cutter Data in the Analysis of PDC Bit Designs", *61st Annual Technical Conference and Exhibition of Society of Petroleum Engineers*, 1986, pp. 1-37.
Graves, Ramona M. et al., "Application of High Power Laser Technology to Laser/Rock Destruction: Where Have We Been? Where Are We Now?", *SW AAPG Convention*, 2002, pp. 213-224.
Graves, Ramona M. et al., "Laser Parameters That Effect Laser-Rock Interaction: Determining the Benefits of Applying Star Wars Laser Technology for Drilling and Completing Oil and Natural Gas Wells", Topical Report, *Petroleum Engineering Department, Colorado School of Mines*, 2001, pp. 1-157.
Gurarie, V. N., "Stress resistance parameters of brittle solids under laser/plasma pulse heating", *Materials Science and Engineering*, vol. A288, 2000, pp. 168-172.
Habib, P. et al., "The Influence of Residual Stresses on Rock Hardness", *Rock Mechanics*, vol. 6, 1974, pp. 15-24.
Hall, Kevin, "The role of thermal stress fatigue in the breakdown of rock in cold regions", *Geomorphology*, vol. 31, 1999, pp. 47-63.
Han, Wei, "Computational and experimental investigations of laser drilling and welding for microelectronic packaging", *Dorchester Polytechnic Institute*, a Dissertation submitted in May 2004, 242 pgs.
Hareland, G. et al., "Cutting Efficiency of a Single PDC Cutter on Hard Rock", *Journal of Canadian Petroleum Technology*, vol. 48, No. 6, 2009, pp. 1-6.
Hashida, T. et al., "Numerical simulation with experimental verification of the fracture behavior in granite under confining pressures based on the tension-softening model", *International Journal of Fracture*, vol. 59, 1993, pp. 227-244.
Healy, Thomas E., "Fatigue Crack Growth in Lithium Hydride", *Lawrence Livermore National Laboratory*, 1993, pp. 1-32.
Hettema, M. H. H. et al., "The Influence of Steam Pressure on Thermal Spelling of Sedimentary Rock: Theory and Experiments", *Int. J. Rock Mech. Min. Sci.*, vol. 35, No. 1, 1998, pp. 3-15.
Hibbs, Louis E. et al., "Wear Machanisms for Polycrystalline-Diamond Compacts as Utilized fro Drilling in Geothermal Environments", *Sandia National Laboratories*, for the United States Government, Report No. SAND-82/7213, 1983, 287 pgs.
Hoek, E., "Fracture of Anisotropic Rock", *Journal of the South African Institute of Mining and Metallurgy*, vol. 64, No. 10, 1964, pp. 501-523.
Hoover, Ed R. et al., "Failure Mechanisms of Polycrystalline-Diamond Compact Drill Bits in Geothermal Environments", Sandia Report, *Sandia National Laboratories*, SAND81-1404, 1981, pp. 1-35.
Huff, C. F. et al., "Recent Developments in Polycrystalline Diamond-Drill-Bit Design", *Drilling Technology Division-4741, Sandia National Laboratories*, 1980, pp. 1-29.
Jimeno, Carlos Lopez et al., Drilling and Blasting of Rocks, *a. a. Balkema Publishers*, 1995, 30 pgs.
Kahraman, S. et al., "Dominant rock properties affecting the penetration rate of percussive drills", *International Journal of Rock Mechanics and Mining Sciences*, 2003, vol. 40, pp. 711-723.
Kelsey, James R., "Drilling Technology/GDO", *Sandia National Laboratories*, SAND-85-1866c, DE85 017231, 1985, pp. 1-7.
Kerr, Callin Joe, "PDC Drill Bit Design and Field Application Evolution", *Journal of Petroleum Technology*, 1988, pp. 327-332.
Ketata, C. et al., "Knowledge Selection for Laser Drilling in the Oil and Gas Industry", *Computer Society*, 2005, pp. 1-6.
Khan, Ovais U. et al., "Laser heating of sheet metal and thermal stress development", *Journal of Materials Processing Technology*, vol. 155-156, 2004, pp. 2045-2050.
Kim, K. R. et al., "$CO_2$ laser-plume interaction in materials processing", *Journal of Applied Physics*, vol. 89, No. 1, 2001, pp. 681-688.
Klotz, K. et al., "Coatings with intrinsic stress profile: Refined creep analysis of (Ti,Al)N and cracking due to cyclic laser heating", *Thin Solid Films*, vol. 496, 2006, pp. 469-474.
Kobayashi, Toshio et al., "Drilling a 2-inch in Diameter Hole in Granites Submerged in Water by $CO_2$ Lasers", *SPE International, IADC 119914 Drilling Conference and Exhibition*, 2009, pp. 1-11.
Kujawski, Daniel, "A fatigue crack driving force parameter with load ratio effects", *International Journal of Fatigue*, vol. 23, 2001, pp. S239-S246.
Labuz, J. F. et al., "Microrack-dependent fracture of damaged rock", *International Journal of Fracture*, vol. 51, 1991, pp. 231-240.
Lacy, Lewis L., "Dynamic Rock Mechanics Testing for Optimized Fracture Designs", *Society of Petroleum Engineers International, Annual Technical Conference and Exhibition*, 1997, pp. 23-36.
Lau, John H., "Thermal Fatigue Life Prediction of Flip Chip Solder Joints by Fracture Mechanics Method", *Engineering Fracture Mechanics*, vol. 45, No. 5, 1993, pp. 643-654.
Leong, K. H. et al., "Lasers and Beam Delivery for Rock Drilling", *Argonne National Laboratory*, ANL/TD/TM03-01, 2003, pp. 1-35.
Leung, M. et al., "Theoretical study of heat transfer with moving phase-change interface in thawing of frozen food", *Journal of Physics D: Applied Physics*, vol. 38, 2005, pp. 477-482.
Lima, R. S. et al., "Elastic Modulus Measurements via Laser-Ultrasonic and Knoop Indentation Techniques in Thermally Sprayed Coatings", *Journal of Thermal Spray Technology*, vol. 14(1), 2005, pp. 52-60.
Lin, Y. T., "The Impact of Bit Performance on Geothermal-Well Cost", *Sandia National Laboratories*, SAND-81-1470C, 1981, pp. 1-6.
Lomov, I. N. et al., "Explosion in the Granite Field: Hardening and Softening Behavior in Rocks", *U.S. Department of Energy, Lawrence Livermore National Laboratory*, 2001, pp. 1-7.
Long, S. G. et al., "Thermal fatigue of particle reinforced metal-matrix composite induced by laser heating and mechanical load", *Composites Science and Technology*, vol. 65, 2005, pp. 1391-1400.
Lyons, K. David et al., "NETL Extreme Drilling Laboratory Studies High Pressure High Temperature Drilling Phenomena", *U.S. Department of Energy, National Energy Technology Laboratory*, 2007, pp. 1-6.
Marshall, David B. et al., "Indentation of Brittle Materials", *Microindentation Techniques in Materials Science and Engineering, ASTM STP 889; American Society for Testing and Materials*, 1986, pp. 26-46.

(56) References Cited

OTHER PUBLICATIONS

Maurer, William C., "Advanced Drilling Techniques", published by Petroleum Publishing Co., copyright 1980, 26 pgs.

Maurer, William C., "Novel Drilling Techniques", published by Pergamon Press, UK, copyright 1968, pp. 1-64.

Mazerov, Katie, "Bigger coil sizes, hybrid rigs, rotary steerable advances push coiled tubing drilling to next level", *Drilling Contractor*, 2008, pp. 54-60.

Medvedev, I. F. et al., "Optimum Force Characteristics of Rotary-Percussive Machines for Drilling Blast Holes", Moscow, Translated from *Fiziko-Tekhnicheskie Problemy Razrabotki Poleznykh Iskopaemykh*, No. 1, 1967, pp. 77-80.

Mensa-Wilmot, Graham et al., "Advanced Cutting Structure Improves PDC Bit Performance in Hard and Abrasive Drilling Environments", *Society of Petroleum Engineers International*, 2003, pp. 1-13.

Messaoud, Louafi, "Influence of Fluids on the Essential Parameters of Rotary Percussive Drilling", *Laboratoire d'Environnement (Tébessa)*, vol. 14, 2009, pp. 1-8.

Moradian, Z. A. et al., "Predicting the Uniaxial Compressive Strength and Static Young's Modulus of Intact Sedimentary Rocks Using the Ultrasonic Test", *International Journal of Geomechanics*, vol. 9, No. 1, 2009, pp. 14-19.

Muto, Shigeki et al., "Laser cutting for thick concrete by multi-pass technique", *Chinese Optics Letters*, vol. 5 Supplement, 2007, pp. S39-S41.

Naqavi, I. Z. et al., "Laser heating of multilayer assembly and stress levels: elasto-plastic consideration", *Heat and Mass Transfer*, vol. 40, 2003, pp. 25-32.

Nara, Y. et al., "Sub-critical crack growth in anisotropic rock", *International Journal of Rock Mechanics and Mining Sciences*, vol. 43, 2006, pp. 437-453.

Nemat-Nasser, S. et al., "Compression-Induced Nonplanar Crack Extension With Application to Splitting, Exfoliation, and Rockburst", *Journal of Geophysical Research*, vol. 87, No. B8, 1982, pp. 6805-6821.

O'Hare, Jim et al., "Design Index: A Systematic Method of PDC Drill-Bit Selection", *Society of Petroleum Engineers International*, IADC/SPE Drilling Conference, 2000, pp. 1-15.

Okon, P. et al., "Laser Welding of Aluminium Alloy 5083", *21st International Congress on Applications of Lasers and Electro-Optics*, 2002, pp. 1-9.

Ortega, Alfonso et al., "Frictional Heating and Convective Cooling of Polycrystalline Diamond Drag Tools During Rock Cutting", Report No. SAND 82-0675c, *Sandia National Laboratories*, 1982, 23 pgs.

Ortega, Alfonso et al., "Studies of the Frictional Heating of Polycrystalline Diamond Compact Drag Tools During Rock Cutting", *Sandia National Laboratories*, SAND-80/2677, 1982, pp. 1-151.

Ortiz, Blas et al., Improved Bit Stability Reduces Downhole Harmonics (Vibrations), *International Association of Drilling Contractors/Society of Petroleum Engineers Inc.*, 1996, pp. 379-389.

Palashchenko, Yuri A., "Pure Rolling of Bit Cones Doubles Performance", *I & Gas Journal*, vol. 106, 2008, 8 pgs.

Pardoen, T. et al., "An extended model for void growth and Coalescence", *Journal of the Mechanics and Physics of Solids*, vol. 48, 2000, pp. 2467-2512.

Park, Un-Chul et al., "Thermal Analysis of Laser Drilling Processes", *IEEE Journal of Quantum Electronics*, 1972, vol. QK-8, No. 2, 1972, pp. 112-119.

Parker, Richard A. et al., "Laser Drilling Effects of Beam Application Methods on Improving Rock Removal", *Society of Petroleum Engineers*, SPE 84353, 2003, pp. 1-7.

Pavlina, E. J. et al., "Correlation of Yield Strength and Tensile Strength with Hardness for Steels", *Journals of Materials Engineering and Performance*, vol. 17, No. 6, 2008, pp. 888-893.

Ping, Cao et al., "Testing study of subcritical crack growth rate and fracture toughness in different rocks", *Transactions of Nonferrous Metals Society of China*, vol. 16, 2006, pp. 709-714.

Plinninger, Ralf J. et al., "Predicting Tool Wear in Drill and Blast", *Tunnels & Tunneling International Magazine*, 2002, pp. 1-5.

Plinninger, Dr. Ralf J. et al., "Wear Prediction in Hardrock Excavation Using the CERCHAR Abrasiveness Index (CAI)", *EUROCK 2004 & 53rd Geomechanics Colloquium. Schubert (ed.)*, VGE, 2004, pp. 1-6.

Polsky, Yarom et al., "Enhanced Geothermal Systems (EGS) Well Construction Technology Evaluation Report", *Sandia National Laboratories*, Sandia Report, SAND2008-7866, 2008, pp. 1-108.

Pooniwala, Shahvir, "Lasers: The Next Bit", *Society of Petroleum Engineers*, No. SPE 104223, 2006, 10 pgs.

Potyondy, D. O. et al., "A Bonded-particle model for rock", *International Journal of Rock Mechanics and Mining Sciences*, vol. 41, 2004, pp. 1329-1364.

Qixian, Luo et al., "Using compression wave ultrasonic transducers to measure the velocity of surface waves and hence determine dynamic modulus of elasticity for concrete", *Construction and Building Materials*, vol. 10, No. 4, 1996, pp. 237-242.

Radkte, Robert, "New High Strength and faster Drilling TSP Diamond Cutters", Report by *Technology International, Inc.*, DOE Award No. DE-FC26-97FT34368, 2006, 97 pgs.

Rauenzahn, R. M., "Analysis of Rock Mechanics and Gas Dynamics of Flame-Jet Thermal Spallation Drilling", *Massachusetts Institute of Technology*, submitted in partial fulfillment of doctorate degree, 1986 583 pgs.

Rauenzahn, R. M. et al., "Rock Failure Mechanisms of Flame-Jet Thermal Spallation Drilling—Theory and Experimental Testing", *Int. J. Rock Merch. Min. Sci. & Geomech. Abstr.*, vol. 26, No. 5, 1989, pp. 381-399.

Raymond, David W., "PDC Bit Testing at Sandia Reveals Influence of Chatter in Hard-Rock Drilling", *Geothermal Resources Council Monthly Bulletin*, SAND99-2655J, 1999, 7 pgs.

Rossmanith, H. P. et al., "Wave Propagation, Damage Evolution, and Dynamic Fracture Extension. Part I. Percussion Drilling", *Materials Science*, vol. 32, No. 3, 1996, pp. 350-358.

Sachpazis, C. I, M, Sc., Ph. D., "Correlating Schmidt Hardness With Compressive Strength and Young's Modulus of Carbonate Rocks", *International Association of Engineering Geology*, Bulletin, No. 42, 1990, pp. 75-83.

Sano, Osam et al., "Acoustic Emission During Slow Crack Growth", *Department Mining and Mineral Engineering, NII-Electronic Library Service*, 1980, pp. 381-388.

Schormair, Nik et al., "The influence of anisotropy on hard rock drilling and cutting", *The Geological Society of London, IAEG*, Paper No. 491, 2006, pp. 1-11.

Shuja, S. Z. et al., "Laser heating of semi-infinite solid with consecutive pulses: Influence of materaial properties on temperature field", *Optics & Laser Technology*, vol. 40, 2008, pp. 472-480.

Smith, E., "Crack Propagation at a Constant Crack Tip Stress Intensity Factor", *Int. Journal of Fracture*, vol. 16, 1980, pp. R215-R218.

Solomon, A. D. et al., "Moving Boundary Problems in Phase Change Models Current Research Questions", *Engineering Physics and Mathematics Division*, ACM Signum Newsletter, vol. 20, Issue 2, 1985, pp. 8-12.

Sousa, Luis M. O. et al., "Influence of microfractures and porosity on the physico-mechanical properties and weathering of ornamental granites", *Engineering Geology*, vol. 77, 2005, pp. 153-168.

Stone, Charles M. et al., "Qualification of a Computer Program for Drill String Dynamics", *Sandia National Laboratories*, SAND-85-0633C, 1985, pp. 1-20.

Takarli, Mokhfi et al., "Damage in granite under heating/cooling cycles and water freeze-thaw condition", *International Journal of Rock Mechanics and Mining Sciences*, vol. 45, 2008, pp. 1164-1175.

Tanaka, K. et al., "The Generalized Relationship Between the Parameters C and m of Paris' Law for Fatigue Crack Growth", *Scripta Metallurgica*, vol. 15, No. 3, 1981, pp. 259-264.

Tang, C. A. et al., "Coupled analysis of flow, stress and damage (FSD) in rock failure", *International Journal of Rock Mechanics and Mining Sciences*, vol. 39, 2002, pp. 477-489.

(56) References Cited

OTHER PUBLICATIONS

Thorsteinsson, Hildigunnur et al., "The Impacts of Drilling and Reservoir Technology Advances on EGS Exploitation", *Proceedings, Thirty-Third Workshop on Geothermal Reservoir Engineering, Institute for Sustainable Energy, Environment, and Economy (ISEEE)*, 2008, pp. 1-14.
U.S. Dept of Energy, "Chapter 6—Drilling Technology and Costs", from Report for the Future of Geothermal Energy, 2005, 53 pgs.
Varnado, S. G. et al., "The Design and Use of Polycrystalline Diamond Compact Drag Bits in the Geothermal Environment", *Society of Petroleum Engineers of AIME*, SPE 8378, 1979, pp. 1-11.
Wen-gui, Cao et al., "Damage constituitive model for strain-softening rock based on normal distribution and its parameter determination", *J. Cent. South Univ. Technol.*, vol. 14, No. 5, 2007, pp. 719-724.
Wiercigroch, M., "Dynamics of ultrasonic percussive drilling of hard rocks", *Journal of Sound and Vibration*, vol. 280, 2005, pp. 739-757.
Williams, R. E. et al., "Experiments in Thermal Spallation of Various Rocks", *Transactions of the ASME*, vol. 118, 1996, pp. 2-8.
Willis, David A. et al., "Heat transfer and phase change during picosecond laser ablation of nickel", *International Journal of Heat and Mass Transfer*, vol. 45, 2002, pp. 3911-3918.
Wong, Teng-fong et al., "Microcrack statistics, Weibull distribution and micromechanical modeling of compressive failure in rock", *Mechanics of Materials*, vol. 38, 2006, pp. 664-681.
Wood, Tom, "Dual Purpose COTD™ Rigs Establish New Operational Records", *Treme Coil Drilling Corp., Drilling Technology Without Borders*, 2009, pp. 1-18.
Xia, K. et al., "Effects of microstructures on dynamic compression of Barre granite", *International Journal of Rock Mechanics and Mining Sciences*, vol. 45, 2008. pp. 879-887, available at: www.sciencedirect.com.
Xu, Zhiyue et al., "Laser Spallation of Rocks for Oil Well Drilling", *Proceedings of the 23rd International Congress on Applications of Lasers and Electro-Optics*, 2004, pp. 1-6.
Xu, Z et al. "Modeling of Laser Spallation Drilling of Rocks fro gas- and Oilwell Drilling", *Society of Petroleum Engineers*, SPE 95746, 2005, pp. 1-6.
Xu, Z. et al., "Specific Energy for Laser Removal of Rocks", *Proceedings of the 20th International Congress on Applications of Lasers & Electro-Optics*, 2001, pp. 1-8.
Xu, Z. et al., "Specific energy for pulsed laser rock drilling", *Journal of Laser Applications*, vol. 15, No. 1, 2003, pp. 25-30.
Yamshchikov, V. S. et al., "An Evaluation of the Microcrack Density of Rocks by Ultrasonic Velocimetric Method", *Moscow Mining Institute. (Translated from Fiziko-Tekhnicheskie Problemy Razrabotki Poleznykh Iskopaemykh)*, 1985, pp. 363-366.
Yilbas, B. S. et al., "Laser short pulse heating: Influence of pulse intensity on temperature and stress fields", *Applied Surface Science*, vol. 252, 2006, pp. 8428-8437.
Yilbas, B. S. et al., "Laser treatment of aluminum surface: Analysis of thermal stress field in the irradiated region", *Journal of Materials Processing Technology*, vol. 209, 2009, pp. 77-88.
Yilbas, B. S. et al., "Nano-second laser pulse heating and assisting gas jet considerations", *International Journal of Machine Tools & Manufacture*, vol. 40, 2000, pp. 1023-1038.
Yilbas, B. S. et al., "Repetitive laser pulse heating with a convective boundary condition at the surface", *Journal of Physics D: Applied Physics*, vol. 34, 2001, pp. 222-231.
Yun, Yingwei et al., "Thermal Stress Distribution in Thick Wall Cylinder Under Thermal Shock", *Journal of Pressure Vessel Technology, Transactions of the ASME*, 2009, vol. 131, pp. 1-6.
Zeuch, D.H. et al., "Rock Breakage Mechanism Wirt a PDC Cutter", *Society of Petroleum Engineers, 60th Annual Technical Conference*, Las Vegas, Sep. 22-25, 1985, 11 pgs.
Zhai, Yue et al., "Dynamic failure analysis on granite under uniaxial impact compressive load", *Front. Archit. Civ. Eng. China*, vol. 2, No. 3, 2008, pp. 253-260.
Zhou, X.P., "Microcrack Interaction Brittle Rock Subjected to Uniaxial Tensile Loads", *Theoretical and Applied Fracture Mechanics*, vol. 47, 2007, pp. 68-76.
Zhou, Zehua et al., "A New Thermal-Shock-Resistance Model for Ceramics: Establishment and validation", *Materials Science and Engineering*, A 405, 2005, pp. 272-276.
Zhu, Dongming et al., "Influence of High Cycle Thermal Loads on Thermal Fatigue Behavior of Thick Thermal Barrier Coatings", *National Aeronautics and Space Administration, Army Research Laboratory*, Technical Report ARL-TR-1341, NASA TP-3676, 1997, pp. 1-50.
Zhu, Dongming et al., "Investigation of thermal fatigue behavior of thermal barrier coating systems", *Surface and Coatings Technology*, vol. 94-95, 1997, pp. 94-101.
Zhu, Dongming et al., "Investigation of Thermal High Cycle and Low Cycle Fatigue Mechanisms of Thick Thermal Barrier Coatings", *National Aeronautics and Space Administration, Lewis Research Center*, NASA/TM-1998-206633, 1998, pp. 1-31.
Zhu, Dongming et al., "Thermophysical and Thermomechanical Properties of Thermal Barrier Coating Systems", *National Aeronautics and Space Administration, Glenn Research Center*, NASA/TM-2000-210237, 2000, pp. 1-22.
International Search Report for PCT Application No. PCT/US09/54295, dated Apr. 26, 2010, 16 pgs, Brochures.
A Built-for-Purpose Coiled Tubing Rig, by Schulumberger Wells,No. DE-PS26-03NT15474, 2006, 1 pg.
Diamond-Cutter Drill Bits, by Geothermal Energy Program, Office of Geothermal and Wind Technologies, 2000, 2 pgs.
Extreme Coil Drilling, by Extreme Drilling Corporation, 2009, 10 pgs.
IADC Dull Grading System for Fixed Cutter Bits, by Hughes Christensen, 1996, 14 pgs.
Percussion Drilling Manual, by Smith Tools, 2002, 67 pgs.
Simple Drilling Methods, WEDC Loughborough University, United Kingdom, 1995, 4 pgs.
U.S. Appl. No. 12/543,986, filed Aug. 19, 2009, Moxley et al.
U.S. Appl. No. 12/544,094, filed Aug. 19, 2009, Faircloth et al.
U.S. Appl. No. 12/543,968, filed Aug. 19, 2009, Rinzler et al.
U.S. Appl. No. 12/544,136, filed Aug. 19, 2009, Zediker et al.
U.S. Appl. No. 12/544,038, filed Aug. 19, 2009, Zediker et al.
U.S. Appl. No. 12/706,576, filed Feb. 16, 2010, Zediker et al.
U.S. Appl. No. 12/840,978, filed Jul. 21, 2010, Rinzler et al.
U.S. Appl. No. 12/896,021, filed Oct. 1, 2010, Underwood et al.
U.S. Appl. No. 13/034,017, filed Feb. 24, 2011, Zediker et al.
U.S. Appl. No. 13/034,037, filed Feb. 24, 2011, Zediker et al.
U.S. Appl. No. 13/034,175, filed Feb. 24, 2011, Zediker et al.
U.S. Appl. No. 13/034,183, filed Feb. 24, 2011, Zediker et al.
U.S. Appl. No. 13/210,581, filed Aug. 16, 2011, DeWitt et al.
U.S. Appl. No. 13/211,729, filed Aug. 17, 2011, DeWitt et al.
U.S. Appl. No. 13/222,931, filed Aug. 31, 2011, Zediker et al.
U.S. Appl. No. 13/347,445, filed Jan. 10, 2012, Zediker et al.
U.S. Appl. No. 13/403,132, filed Feb. 23, 2012, Zediker et al.
U.S. Appl. No. 13/403,509, filed Feb. 23, 2012, Fraze et al.
U.S. Appl. No. 13/403,287, filed Feb. 23, 2012, Grubb et al.
U.S. Appl. No. 13/403,615, filed Feb. 23, 2012, Grubb et al.
U.S. Appl. No. 13/366,882, filed Feb. 6, 2012, McKay et al.
U.S. Appl. No. 13/403,692, filed Feb. 23, 2012, Zediker et al.
U.S. Appl. No. 13/403,723, filed Feb. 23, 2012, Rinzler et al.
U.S. Appl. No. 13/403,741, filed Feb. 23, 2012, Zediker et al.
U.S. Appl. No. 13/486,795, filed Feb. 23, 2012, Rinzler et al.
U.S. Appl. No. 13/565,345, filed Feb. 23, 2012, Zediker et al.
U.S. Appl. No. 13/768,149, filed Feb. 15, 2013, Zediker et al.
U.S. Appl. No. 13/777,650, filed Feb. 26, 2013, Zediker et al.
U.S. Appl. No. 13/782,869, filed Mar. 1, 2013, Linyaev et al.
U.S. Appl. No. 13/782,942, filed Mar. 1, 2013, Norton et al.
U.S. Appl. No. 13/800,559, filed Mar. 13, 2013, Zediker et al.
U.S. Appl. No. 13/800,820, filed Mar. 13, 2013, Zediker et al.
U.S. Appl. No. 13/800,879, filed Mar. 13, 2013, Zediker et al.
U.S. Appl. No. 13/800,933, filed Mar. 13, 2013, Zediker et al.
U.S. Appl. No. 13/849,831, filed Mar. 25, 2013, Zediker et al.
U.S. Appl. No. 13/852,719, filed Mar. 28, 2013, Faircloth et al.
International Search Report for PCT Application No. PCT/US2011/044548, dated Jan. 24, 2012, 17 pgs.
International Search Report for PCT Application No. PCT/US2011/047902, dated Jan. 17, 2012, 9 pgs.

(56) References Cited

OTHER PUBLICATIONS

International Search Report for PCT Application No. PCT/US2011/050044 dated Feb. 1, 2012, 26 pgs.
International Search Report for PCT Application No. PCT/US2012/026277, dated May 30, 2012, 11 pgs.
International Search Report for PCT Application No. PCT/US2012/026265, dated May 30, 2012, 14 pgs.
International Search Report for PCT Application No. PCT/US2012/026280, dated May 30, 2012, 12 pgs.
International Search Report for PCT Application No. PCT/US2012/026337, dated Jun. 7, 2012, 21 pgs.
International Search Report for PCT Application No. PCT/US2012/026471, dated May 30, 2012, 13 pgs.
International Search Report for PCT Application No. PCT/US2012/026525, dated May 31, 2012, 8 pgs.
International Search Report for PCT Application No. PCT/US2012/026526, dated May 31, 2012, 10 pgs.
International Search Report for PCT Application No. PCT/US2012/026494, dated May 31, 2012, 12 pgs.
International Search Report for PCT Application No. PCT/US2012/020789, dated Jun. 29, 2012, 9 pgs.
International Search Report for PCT Application No. PCT/US2012/040490, dated Oct. 22, 2012, 14 pgs.
International Search Report for PCT Application No. PCT/US2012/049338, dated Jan. 22, 2013, 14 pgs.
Abdulagatova, Z. et al., "Effect of Temperature and Pressure on the Thermal Conductivity of Sandstone", *International Journal of Rock Mechanics & Mining Sciences*, vol. 46, 2009, pp. 1055-1071.
Abousleiman, Y. et al., "Poroelastic Solution of an Inclined Borehole in a Transversely Isotropic Medium", *Rock Mechanics*, Daemen & Schultz (eds), 1995, pp. 313-318.
Ackay, H. et al., Paper titled "Orthonormal Basis Functions for Continuous-Time Systems and Lp Convergence", date unknown but prior to Aug. 19, 2009, pp. 1-12.
Acosta, A. et al., paper from X Brazilian MRS meeting titled "Drilling Granite With Laser Light", X Encontro da SBPMat Granado-RS, Sep. 2011, 4 pages including pp. 56 and 59.
Ahmadi, M. et al., "The Effect of Interaction Time and Saturation of Rock on Specific Energy in ND:YAG Laser Perforating", *Optics and Laser Technology*, vol. 43, 2011, pp. 226-231.
Akhatov, I. et al., "Collapse and Rebound of a Laser-Induced Cavitation Bubble", *Physics of Fluids*, vol. 13, No. 10, Oct. 2001, pp. 2805-2819.
Albertson, M. L. et al., "Diffusion of Submerged Jets", a paper for the *American Society of Civil Engineers*, Nov. 5, 1852, pp. 1571-1596.
Al-Harthi, A. A. et al., "The Porosity and Engineering Properties of Vesicular Basalt in Saudi Arabia", *Engineering Geology*, vol. 54, 1999, pp. 313-320.
Anand, U. et al., "Prevention of Nozzle Wear in Abrasive Water Suspension Jets (AWSJ) Using PoroLubricated Nozzles", *Transactions of the ASME*, vol. 125, Jan. 2003, pp. 168-181.
Andersson, J. C. et al., "The Aspo Pillar Stability Experiment: Part II-Rock Mass Response to Coupled Excavation-Induced and Thermal-Induced Stresses", *International Journal of Rock Mechanics & Mining Sciences*, vol. 46, 2009, pp. 879-895.
Anovitz, L. M. et al., "A New Approach to Quantification of Metamorphism Using Ultra-Small and Small Angle Neutron Scattering", *Geochimica et Cosmochimica Acta*, vol. 73, 2009, pp. 7303-7324.
Antonucci, V. et al., "Numerical and Experimental Study of a Concentrated Indentation Force on Polymer Matrix Composites", an excerpt from the *Proceedings of the COMSOL Conference*, 2009, 4 pages.
Aptukov, V. N., "Two Stages of Spallation", publisher unknown, while the date of the publication is unknown, it is believed to be prior to Aug. 19, 2009, 6 pages.
ASTM International, "Standard Test Method for Thermal Conductivity of Solids by Means of the Guarded-Comparative-Longitudinal Heat Flow Technique", Standard under the fixed Designation E1225-09, 2009, pp. 1-9.

Atkinson, B. K., "Introduction to Fracture Mechanics and Its Geophysical Applications", *Fracture Mechanics of Rock*, 1987, pp. 1-26.
Aubertin, M. et al., "A Multiaxial Stress Criterion for Short- and Long-Term Strength of Isotropic Rock Media", *International Journal of Rock Mechanics & Mining Sciences*, vol. 37, 2000, pp. 1169-1193.
Author unknown, by RIO Technical Services, "Sub-Task 1: Current Capabilities of Hydraulic Motors, Air/Nitrogen Motors, and Electric Downhole Motors", a final report for Department of Energy National Petroleum Technology Office for the Contract Task 03NT30429, Jan. 30, 2004, 26 pages.
Avar, B. B. et al., "Porosity Dependence of the Elastic Modulof Lithophysae-rich Tuff: Numerical and Experimental Investigations", *International Journal of Rock Mechanics & Mining Sciences*, vol. 40, 2003, pp. 919-928.
Backers, T. et al., "Tensile Fracture Propagation and Acoustic Emission Activity in Sandstone: The Effect of Loading Rate", *International Journal of Rock Mechanics & Mining Sciences*, vol. 42, 2005, pp. 1094-1101.
Baek, S.Y. et al., "Simulation of the Coupled Thermal/Optical Effects for Liquid Immersion Micro-/Nanolithography", source unknown, believed to be publically available prior to 2012, 13 pages.
Bagatur, T. et al., "Air-entrainment Characteristics in a Plunging Water Jet System Using Rectangular Nozzles with Rounded Ends", *Water SA*, vol. 29, No. 1, Jan. 2003, pp. 35-38.
Baird, J. A. et al., "Analyzing the Dynamic Behavior of Downhole Equipment During Drilling", government Sandia Report, SAND-84-0758C, DE84 008840, 7 pages.
Batarseh, S. I. et al, "Innovation in Wellbore Perforation Using High-Power Laser", *International Petroleum Technology Conference*, IPTC No. 10981, Nov. 2005, 7 pages.
Batarseh, S. et al., "Well Perforation Using High-Power Lasers", a paper prepared for presentation at the SPE (Society of Petroleum Engineers) Annual Technical Conference and Exhibition, SPE No. 84418, Oct. 2003, 10 pages.
Baykasoglu, A. et al., "Prediction of Compressive and Tensile Strength of Limestone via Genetic Programming", *Expert Systems with Applications*, vol. 35, 2008, pp. 111-123.
Bechtel SAIC Company LLC, "Heat Capacity Analysis", a report prepared for Department of Energy, Nov. 2004, 100 pages.
Belushi, F. et al., "Demonstration of the Power of Inter-Disciplinary Integration to Beat Field Development Challenges in Complex Brown Field-South Oman", *Society of Petroleum Engineers*, a paper prepared for presentation at the Abu Dhabi International Petroleum Exhibition & Conference, SPE No. 137154, Nov. 2010, 18 pages.
Belyaev, V. V., "Spall Damage Modelling and Dynamic Fracture Specificities of Ceramics", *Journal of Materials Processing Technology*, vol. 32, 1992, pp. 135-144.
Benavente, D. et al., "The Combined Influence of Mineralogical, Hygric and Thermal Properties on the Durability of PoroBuilding Stones", *Eur. J. Mineral*, vol. 20, Aug. 2008, pp. 673-685.
Bieniawski, Z. T., "Mechanism of Brittle Fracture of Rock: Part I—Theory of the Fracture Process", *Int. J. Rock Mech. Min. Sci.*, vol. 4, 1967, pp. 395-406.
Bilotsky, Y. et al., "Modelling Multilayers Systems with Time-Depended Heaviside and New Transition Functions", excerpt from the Proceedings of the 2006 Nordic COMSOL Conference, 2006, 4 pages.
Birkholzer, J. T. et al., "The Impact of Fracture—Matrix Interaction on Thermal—Hydrological Conditions in Heated Fractured Rock", an origial research paper published online http://vzy.scijournals.org/cgi/content/full/5/2/657, May 26, 2006, 27 pages.
Blackwell, D. D. et al., "Geothermal Resources in Sedimentary Basins", a presentation for the Geothermal Energy Generation in Oil and Gas Settings, Mar. 13, 2006, 28 pages.
Blair, S. C. et al., "Analysis of Compressive Fracture in Rock Using Statistical Techniques: Part I. A Non-linear Rule-based Model", *Int. J. Rock Mech. Min. Sci.*, vol. 35 No. 7, 1998, pp. 837-848.
Blomqvist, M. et al., "All-in-Quartz Optics for Low Focal Shifts", *SPIE Photonics West Conference in San Francisco*, Jan. 2011, 12 pages.

(56) References Cited

OTHER PUBLICATIONS

Boechat, A. A. P. et al., "Bend Loss in Large Core Multimode Optical Fiber Beam Delivery Systems", *Applied Optics.*, vol. 30 No. 3, Jan. 20, 1991, pp. 321-327.

Bolme, C. A., "Ultrafast Dynamic Ellipsometry of Laser Driven Shock Waves", a dissertation for the degree of Doctor of Philosophy in Physical Chemistry at Massachusetts Institute of Technology, Sep. 2008, pp. 1-229.

Brown, G., "Development, Testing and Track Record of Fiber-Optic, Wet-Mate, Connectors", *IEEE*, 2003, pp. 83-88.

Brujan, E. A. et al., "Dynamics of Laser-Induced Cavitation Bubbles Near an Elastic Boundar", *J. Fluid Mech.*, vol. 433, 2001, pp. 251-281.

Burdine, N. T., "Rock Failure Under Dynamic Loading Conditions", Society of Petroleum Engineers Journal, Mar. 1963, pp. 1-8.

Bybee, K., "Modeling Laser-Spallation Rock Drilling", *JPT*, an SPE available at www.spe.org/jpt, Feb. 2006, 2 pages 62-63.

Bybee, Karen, highlight of "Drilling a Hole in Granite Submerged in Water by Use of CO2 Laser", an SPE available at www.spe.org/jpt, *JPT*, Feb. 2010, pp. 48, 50 and 51.

Cai, W. et al., "Strength of Glass from Hertzian Line Contact", *Optomechanics 2011: Innovations and Solutions*, 2011, 5 pages.

Capetta, I. S. et al., "Fatigue Damage Evaluation on Mechanical Components Under Multiaxial Loadings", European Comsol Conference, University of Ferrara, Oct. 16, 2009, 25 pages.

Carstens, J. P. et al., "Rock Cutting by Laser", a paper of *Society of Petroleum Engineers of AIME*, 1971, 11 pages.

Caruso, C. et al., "Dynamic Crack Propagation in Fiber Reinforced Composites", Excerpt from the Proceedings of the COMSOL Conference, 2009, 5 pages.

Chastain, T. et al., "Deepwater Drilling Riser System", *SPE Drilling Engineering*, Aug. 1986, pp. 325-328.

Chen, H. Y. et al., "Characterization of the Austin Chalk Producing Trend", *SPE*, a paper prepared for presentation at the 61st Annual Technical Conference and Exhibition of the Society of Petroleum Engineers, SPE No. 15533, Oct. 1986, pp. 1-12.

Chen, K., paper titled "Analysis of Oil Film Interferometry Implementation in Non-Ideal Conditions", source unknown, Jan. 7, 2010, pp. 1-18.

Chraplyvy, A. R., "Limitations on Lightwave Communications Imposed by Optical-Fiber Nonlinearities", *Journal of Lightwave Technology*, vol. 8 No. 10, Oct. 1990, pp. 1548-1557.

Churcher, P. L. et al., "Rock Properties of Berea Sandstone, Baker Dolomite, and Indiana Limestone", a paper prepared for presentation at the SPE International Symposium on Oilfield Chemistry), *SPE*, SPE No. 21044, Feb. 1991, pp. 431-446 and 3 additional pages.

Cimetiere, A. et al., "A Damage Model for Concrete Beams in Compression", *Mechanics Research Communications*, vol. 34, 2007, pp. 91-96.

Close, F. et al., "Successful Drilling of Basalt in a West of Shetland Deepwater Discovery", a paper prepared for presentation at Offshore Europe 2005 by SPE (Society of Petroleum Engineers) Program Committee, SPE No. 96575, Sep. 2005, pp. 1-10.

Cohen, J. H., "High-Power Slim-Hole Drilling System", a paper presented at the conference entitled Natural Gas RD&D Contractor's Review Meeting, Office of Scientific and Technical Information, Apr. 1995, 10 pages.

Cone, C., "Case History of the University Block 9 (Wolfcamp) Field—Gas-Water Injection Secondary Recovery Project", *Journal of Petroleum Technology*, Dec. 1970, pp. 1485-1491.

Contreras, E. et al., "Effects of Temperature and Stress on the Compressibilities, Thermal Expansivities, and Porosities of Cerro Prieto and Berea Sandstones to 9000 PSI and 208 degrees Celsius", Proceedings Eighth Workshop Geothermal Reservoir Engineering, Leland Stanford Junior University, Dec. 1982, pp. 197-203.

Cooper, R., "Coiled Tubing Deployed ESPs Utilizing Internally Installed Power Cable—A Project Update", a paper prepared by SPE (Society of Petroleum Engineers) Program Committee for presentation at the 2nd North American Coiled Tubing Roundtable, SPE 38406, Apr. 1997, pp. 1-6.

Coray, P. S. et al., "Measurements on 5:1 Scale Abrasive Water Jet Cutting Head Models", source unknown, available prior to 2012, 15 pages.

Cruden, D. M., "The Static Fatigue of Brittle Rock Under Uniaxial Compression", *Int. J. Rock Mech. Min. Sci. & Geomech, Abstr.*, vol. 11, 1974, pp. 67-73.

Da Silva, B. M. G., "Modeling of Crack Initiation, Propagation and Coalescence in Rocks", a thesis for the degree of Master of Science in Civil and Environmental Engineering at the Massachusetts Institute of Technology, Sep. 2009, pp. 1-356.

Dahl, F. et al., "Development of a New Direct Test Method for Estimating Cutter Life, Based on the Sievers' J Miniature Drill Test", *Tunnelling and Underground Space Technology*, vol. 22, 2007, pp. 106-116.

De Castro Lima, J. J. et al., "Linear Thermal Expansion of Granitic Rocks: Influence of Apparent Porosity, Grain Size and Quartz Content", *Bull Eng Geol Env.*, 2004, vol. 63, pp. 215-220.

Degallaix, J. et al., "Simulation of Bulk-Absorption Thermal Lensing in Transmissive Optics of Gravitational Waves Detector", *Appl. Phys.*, B77, 2003, pp. 409-414.

Dey, T. N. et al., "Some Mechanisms of Microcrack Growth and Interaction in Compressive Rock Failure", *Int. J. Rock Mech. Min. Sci. & Geomech. Abstr.*, vol. 18, 1981, pp. 199-209.

Dimotakis, P. E. et al., "Flow Structure and Optical Beam Propagation in High-Reynolds-Number Gas-Phase Shear Layers and Jets", *J. Fluid Mech.*, vol. 433, 2001, pp. 105-134.

Dole, L. et al., "Cost-Effective CementitioMaterial Compatible with Yucca Mountain Repository Geochemistry", a paper prepared by Oak Ridge National Laboratory for the Department of Energy, No. ORNL/TM-2004/296, Dec. 2004, 128 pages.

Dumans, C. F. F. et al., "PDC Bit Selection Method Through the Analysis of Past Bit Performances", a paper prepared for presentation at the *SPE* (Society of Petroleum Engineers—Latin American Petroleum Engineering Conference), Oct. 1990, pp. 1-6.

Dutton, S. P. et al., "Evolution of Porosity and Permeability in the Lower CretaceoTravis Peak Formation, East Texas", *The American Association of Petroleum Geologists Bulletin*, vol. 76, No. 2, Feb. 1992, pp. 252-269.

Dyskin, A. V. et al., "Asymptotic Analysis of Crack Interaction with Free Boundary", *International Journal of Solids and Structure*, vol. 37, 2000, pp. 857-886.

Eckel, J. R. et al., "Nozzle Design and its Effect on Drilling Rate and Pump Operation", a paper presented at the spring meeting of the Southwestern District, Division of Production, Beaumont, Texas, Mar. 1951, pp. 28-46.

Ehrenberg, S. N. et al., "Porosity-Permeability Relationship in Interlayered Limestone-Dolostone Reservoir", *The American Association of Petroleum Geologists Bulletin*, vol. 90, No. 1, Jan. 2006, pp. 91-114.

Ersoy, A., "Wear Characteristics of PDC Pin and Hybrid Core Bits in Rock Drilling", *Wear*, vol. 188, 1995, pp. 150-165.

Falcao, J. L. et al., "PDC Bit Selection Through Cost Prediction Estimates Using Crossplots and Sonic Log Data", *SPE*, a paper prepared for presentation at the 1993 SPE/IADC Drilling Conference, Feb. 1993, pp. 525-535.

Falconer, I. G. et al., "Separating Bit and Lithology Effects from Drilling Mechanics Data", *SPE*, a paper prepared for presentation at the 1988 IADC/SPE Drilling Conference, Feb./Mar. 1988, pp. 123-136.

Farra, G., "Experimental Observations of Rock Failure Due to Laser Radiation", a thesis for the degree of Master of Science at Massachusetts Institute of Technology, Jan. 1969, 128 pages.

Farrow, R. L. et al., "Peak-Power Limits on Fiber Amplifiers Imposed by Self-Focusing", *Optics Letters*, vol. 31, No. 23, Dec. 1, 2006, pp. 3423-3425.

Fertl, W. H. et al., "Spectral Gamma-Ray Logging in the Texas Austin Chalk Trend", *SPE of AIME*, a paper for Journal of Petroleum Technology, Mar. 1980, pp. 481-488.

Field, F. A., "A Simple Crack-Extension Criterion for Time-Dependent Spallation", *J. Mech. Phys. Solids*, vol. 19, 1971, pp. 61-70.

Finger, J. T. et al., "PDC Bit Research at Sandia National Laboratories", Sandia Report No. SAND89-0079-UC-253, a report prepared for Department of Energy, Jun. 1989, 88 pages.

(56) References Cited

OTHER PUBLICATIONS

Freeman, T. T. et al., "THM Modeling for Reservoir Geomechanical Applications", presented at the COMSOL Conference, Oct. 2008, 22 pages.

Friant, J. E. et al., "Disc Cutter Technology Applied to Drill Bits", a paper prepared by Exacavation Engineering Associates, Inc. for the Department of Energy's Natural Gas Conference, Mar. 1997, pp. 1-16.

Fuerschbach, P. W. et al., "Understanding Metal Vaporization from Laser Welding", Sandia Report No. SAND-2003-3490, a report prepared for DOE, Sep. 2003, pp. 1-70.

Gahan, B. C. et al., "Analysis of Efficient High-Power Fiber Lasers for Well Perforation", SPE, No. 90661, a paper prepared for presentation at the SPE Annual Technical Conference and Exhibition, Sep. 2004, 9 pages.

Gahan, B. C. et al., "Effect of Downhole Pressure Conditions on High-Power Laser Perforation", SPE, No. 97093, a paper prepared for the 2005 SPE (Society of Petroleum Engineers) Annual Technical Conference and Exhibition, Oct. 12, 2005, 7 pages.

Gahan, B. C. et al., "Laser Drilling: Drilling with the Power of Light, Phase 1: Feasibility Study", a Topical Report by the *Gas Technology Institute*, for the Government under Cooperative Agreement No. DE-FC26-00NT40917, Sep. 30, 2001, 107 pages.

Gahan, B. C., et al., "Laser Drilling—Drilling with the Power of Light: High Energy Laser Perforation and Completion Techniques", Annual Technical Progress Report by the *Gas Technology Institute*, to the Department of Energy, Nov. 2006, 94 pages.

Gale, J. F. W. et al., "Natural Fractures in the Barnett Shale and Their Importance for Hydraulic Fracture Treatments", The American Assoction of Petroleum Geologists, *AAPG Bulletin*, vol. 91, No. 4, Apr. 2007, pp. 603-622.

Gardner, R. D. et al., "Flourescent Dye Penetrants Applied to Rock Fractures", *Int. J. Rock Mech. Min. Sci.*, vol. 5, 1968, pp. 155-158 with 2 additional pages.

Gelman, A., "Multi-level (hierarchical) modeling: what it can and can't do", source unknown, Jun. 1, 2005, pp. 1-6.

Gerbaud, L. et al., "PDC Bits: All Comes From the Cutter/Rock Interaction", SPE, No. IADC/SPE 98988, a paper presented at the IADC/SPE Drilling Conference, Feb. 2006, pp. 1-9.

Gonthier, F. "High-power All-Fiber® components: The missing link for high power fiber fasers", source unknown, 11 pages.

Graves, R. M. et al., "Comparison of Specific Energy Between Drilling With High Power Lasers and Other Drilling Methods", SPE, No. SPE 77627, a paper presented at the SPE (Society of Petroleum Engineers) Annual Technical Conference and Exhibiton, Sep. 2002, pp. 1-8.

Graves, R. M. et al., "Spectral signatures and optic coeffecients of surface and reservoir rocks at COIL, CO2 and Nd:YAG laser wavelenghts", source unknown, 13 pages.

Graves, R. M. et al., "StarWars Laser Technology Applied to Drilling and Completing Gas Wells", SPE, No. 49259, a paper prepared for presentation at the 1998 SPE Annual Technical Conference and Exhibition, 1998, 761-770.

Green, D. J. et al., "Crack Arrest and Multiple Crackling in Glass Through the Use of Designed Residual Stress Profiles", *Science*, vol. 283, No. 1295, 1999, pp. 1295-1297.

Grigoryan, V., "InhomogeneoBoundary Value Problems", a lecture for Math 124B, Jan. 26, 2010, pp. 1-5.

Grigoryan, V., "Separathion of variables: Neumann Condition", a lecture for Math 124A, Dec. 1, 2009, pp. 1-3.

Gunn, D. A. et al., "Laboratory Measurement and Correction of Thermal Properties for Application to the Rock Mass", *Geotechnical and Geological Engineering*, vol. 23, 2005, pp. 773-791.

Guo, B. et al., "Chebyshev Rational Spectral and Pseudospectral Methods on a Semi-infinite Interval", *Int. J. Numer. Meth. Engng*, vol. 53, 2002, pp. 65-84.

Hagan, P. C., "The Cuttability of Rock Using a High Pressure Water Jet", University of New South Wales, Sydney, Australia, obtained form the Internet on Sep. 7, 2010, at: http://www.mining.unsw.edu.au/Publications/publications_staff/Paper_Hagan_WASM.htm, 16 pages.

Hall, K. et al., "Rock Albedo and Monitoring of Thermal Conditions in Respect of Weathering: Some Expected and Some Unexpected Results", *Earth Surface Processes and Landforms*, vol. 30, 2005, pp. 801-811.

Hammer, D. X. et al., "Shielding Properties of Laser-Induced Breakdown in Water for Pulse Durations from 5 ns to 125 fs", *Applied Optics*, vol. 36, No. 22, Aug. 1, 1997, pp. 5630-5640.

Hancock, M. J., "The 1-D Heat Equation: 18.303 Linear Partial Differential Equations", source unknown, 2004, pp. 1-41.

Hareland, G. et al., "Drag—Bit Model Including Wear", *SPE*, No. 26957, a paper prepared for presentation at the Latin American/Caribbean Petroleum Engineering Conference, Apr. 1994, pp. 657-667.

Hareland, G., et al., "A Drilling Rate Model for Roller Cone Bits and Its Application", *SPE*, No. 129592, a paper prepared for presentation at the CPS/SPE International Oil and Gas Conference and Exhibition, Jun. 2010, pp. 1-7.

Harrison, C. W. III et al., "Reservoir Characterization of the Frontier Tight Gas Sand, Green River Basin, Wyoming", *SPE*, No. 21879, a paper prepared for presentation at the Rocky Mountain Regional Meeting and Low-Permeability Reservoirs Symposium, Apr. 1991, pp. 717-725.

Hasting, M. A. et al., "Evaluation of the Environmental Impacts of Induced Seismicity at the Naknek Geothermal Energy Project, Naknek, Alaska", a final report prepared for ASRC Energy Services Alaska Inc., May 2010, pp. 1-33.

Head, P. et al., "Electric Coiled Tubing Drilling (E-CTD) Project Update", *SPE*, No. 68441, a paper prepared for presentation at the SPE/CoTA Coiled Tubing Roundtable, Mar. 2001, pp. 1-9.

Hood, M., "Waterjet-Assisted Rock Cutting Systems—The Present State of the Art", *International Journal of Mining Engineering*, vol. 3, 1985, pp. 91-111.

Howard, A. D. et al., "VOLAN Interpretation and Application in the Bone Spring Formation (Leonard Series) in Southeastern New Mexico", *SPE*, No. 13397, a paper presented at the 1984 SPE Production Technology Symposium, Nov. 1984, 10 pages.

Howells, G., "Super-Water [R] Jetting Applications from 1974 to 1999", paper presented st the Proceedings of the $10^{th}$ American Waterjet Confeence in Houston, Texas, 1999, 25 pages.

Hu, H. et al., "SimultaneoVelocity and Concentration Measurements of a Turbulent Jet Mixing Flow", *Ann. N. Y. Acad. Sci.*, vol. 972, 2002, pp. 254-259.

Huang, C. et al., "A Dynamic Damage Growth Model for Uniaxial Compressive Response of Rock Aggregates", *Mechanics of Materials*, vol. 34, 2002, pp. 267-277.

Huang, H. et al., "Intrinsic Length Scales in Tool-Rock Interaction", *International Journal of Geomechanics*, Jan./Feb. 2008, pp. 39-44.

Huenges, E. et al., "The Stimulation of a Sedimentary Geothermal Reservoir in the North German Basin: Case Study Grob Schonebeck", *Proceedings, Twenty-Ninth Workshop on Geothermal Reservoir Engineering*, Stanford University, Stanford, California, Jan. 26-28, 2004, 4 pages.

Hutchinson, J. W., "Mixed Mode Cracking in Layered Materials", *Advances in Applied Mechanics*, vol. 29, 1992, pp. 63-191.

Imbt, W. C. et al., "Porosity in Limestone and Dolomite Petroleum Reservoirs", paper presented at the Mid Continent District, Division of Production, Oklahoma City, Oklahoma, Jun. 1946, pp. 364-372.

Jackson, M. K. et al., "Nozzle Design for Coherent Water Jet Production", source unknown, believed to be published prior to 2012, pp. 53-89.

Jadoun, R. S., "Study on Rock-Drilling Using PDC Bits for the Prediction of Torque and Rate of Penetration", *Int. J. Manufacturing Technology and Management*, vol. 17, No. 4, 2009, pp. 408-418.

Jain, R. K. et al., "Development of Underwater Laser Cutting Technique for Steel and Zircaloy for Nuclear Applications", *Journal of Physics for Indian Academy of Sciences*, vol. 75 No. 6, Dec. 2010, pp. 1253-1258.

(56) References Cited

OTHER PUBLICATIONS

Jen, C. K. et al., "Leaky Modes in Weakly Guiding Fiber Acoustic Waveguides", *IEEE Transactions on Ultrasonic Ferroelectrics and Frequency Control*, vol. UFFC-33 No. 6, Nov. 1986, pp. 634-643.
Judzis, A. et al., "Investigation of Smaller Footprint Drilling System; Ultra-High Rotary Speed Diamond Drilling Has Potential for Reduced Energy Requirements", IADC/SPE No. 99020, 33 pages.
Jurewicz, B. R., "Rock Excavation with Laser Assistance", *Int. J. Rock Mech. Min. Sci. & Geomech. Abst.*, vol. 13, 1976, pp. 207-219.
Karakas, M., "Semianalytical Productivity Models for Perforated Completions", *SPE*, No. 18247, a paper for SPE (Society of Petroleum Engineers) Production Engineering, Feb. 1991, pp. 73-82.
Karasawa, H. et al., "Development of PDC Bits for Downhole Motors", *Proceedings 17th NZ Geothermal Workshop*, 1995, pp. 145-150.
Kemeny, J. M., "A Model for Non-linear Rock Deformation Under Compression Due to Sub-critical Crack Growth", *Int. J. Rock Mech. Min. Sci. & Geomech. Abstr.*, vol. 28 No. 6, 1991, pp. 459-467.
Khandelwal, M., "Prediction of Thermal Conductivity of Rocks by Soft Computing", *Int. J. Earth Sci. (Geol. Rundsch)*, May 11, 2010, 7 pages.
Kim, C. B. et al., "Measurement of the Refractive Index of Liquids at 1.3 and 1.5 Micron Using a Fibre Optic Fresnel Ratio Meter", *Meas. Sci. Technol.*, vol. 5, 2004, pp. 1683-1686.
Kiwata, T. et al., "Flow Visualization and Characteristics of a Coaxial Jet with a Tabbed Annular Nozzle", *JSME International Journal Series B*, vol. 49, No. 4, 2006, pp. 906-913.
Kobayashi, T. et al., "Drilling a 2-inch in Diameter Hole in Granites Submerged in Water by CO2 Lasers", *SPE*, No. 119914, a paper prepared for presentation at the SPE/IADC Drilling Conference and Exhibition, Mar. 2009, 6 pages.
Kobyakov, A. et al., "Design Concept for Optical Fibers with Enhanced SBS Threshold", *Optics Express*, vol. 13, No. 14, Jul. 11, 2005, pp. 5338-5346.
Kolari, K., "Damage Mechanics Model for Brittle Failure of Transversely Isotropic Solids (Finite Element Implementation)", *VTT Publications* 628, 2007, 210 pages.
Kollé, J. J., "A Comparison of Water Jet, Abrasive Jet and Rotary Diamond Drilling in Hard Rock", *Tempress Technologies Inc.*, 1999, pp. 1-8.
Kolle, J. J., "HydroPulse Drilling", a Final Report for Department of Energy under Cooperative Development Agreement No. DE-FC26-FT34367, Apr. 2004, 28 pages.
Kovalev, V. I. et al., "Observation of Hole Burning in Spectrum in SBS in Optical Fibres Under CW Monochromatic Laser Excitation", *IEEE*, Jun. 3, 2010, pp. 56-57.
Koyamada, Y. et al., "Simulating and Designing Brillouin Gain Spectrum in Single-Mode Fibers", *Journal of Lightwave Technology*, vol. 22, No. 2, Feb. 2004, pp. 631-639.
Krajcinovic, D. et al., "A Micromechanical Damage Model for Concrete", *Engineering Fracture Mechanics*, vol. 25, No. 5/6, 1986, pp. 585-596.
Kranz, R. L., "Microcracks in Rocks: A Review", *Tectonophysics*, vol. 100, 1983, pp. 449-480.
Labuz, J. F. et al., "Experiments with Rock: Remarks on Strength and Stability Issues", *International Journal of Rock Mechanics & Mining Science*, vol. 44, 2007, pp. 525-537.
Labuz, J. F. et al., "Size Effects in Fracture of Rock", *Rock Mechanics for Industry*, Amadei, Kranz, Scott & Smeallie (eds), 1999, pp. 1137-1143.
Langeveld, C. J., "PDC Bit Dynamics", a paper prepared for presentation at the 1992 IADC/SPE Drilling Conference, Feb. 1992, pp. 227-241.
Lee, S. H. et al., "Themo-Poroelastic Analysis of Injection-Induced Rock Deformation and Damage Evolution", *Proceedings Thirty-Fifth Workshop on Geothermal Reservoir Engineering*, Feb. 2010, 9 pages.
Lee, Y. W. et al., "High-Power Yb3+ Doped Phosphate Fiber Amplifier", *IEEE Journal of Selected Topics in Quantum Electronics*, vol. 15, No. 1, Jan./Feb. 2009, pp. 93-102.

Legarth, B. et al., "Hydraulic Fracturing in a Sedimentary Geothermal Reservoir: Results and Implications", *International Journal of Rock Mechanics & Mining Sciences*, vol. 42 , 2005, pp. 1028-1041.
Lehnhoff, T. F. et al., "The Influence of Temperature Dependent Properties on Thermal Rock Fragmentation", *Int. J. Rock Mech. Min. Sci. & Geomech. Abstr.*, vol. 12, 1975, pp. 255-260.
Leong, K. H., "Modeling Laser Beam-Rock Interaction", a report prepared for Department of Energy (http://www.doe.gov/bridge), 8 pages.
Li, Q. et al., "Experimental Research on Crack Propagation and Failure in Rock-type Materials under Compression", *EJGE*, vol. 13, Bund. D, 2008, p. 1-13.
Li, X. B. et al., "Experimental Investigation in the Breakage of Hard Rock by the PDC Cutters with Combined Action Modes", *Tunnelling and Underground Space Technology*, vol. 16., 2001, pp. 107-114.
Liddle, D. et al., "Cross Sector Decommissioning Workshop", presentation, Mar. 23, 2011, 14 pages.
Lindholm, U. S. et al., "The Dynamic Strength and Fracture Properties of Dresser Basalt", *Int. J. Rock Mech. Min. Sci. & Geomech. Abstr.*, vol. 11, 1974, pp. 181-191.
Loland, K. E., "ContinuoDamage Model for Load-Response Estimation of Concrete", *Cement and Concrete Research*, vol. 10, 1980, pp. 395-402.
Lorenzana, H. E. et al., "Metastability of Molecular Phases of Nitrogen: Implications to the Phase Diagram", a manuscript submitted to the European Hight Pressure Research Group 39 Conference, *Advances on High Pressure*, Sep. 21, 2001, 18 pages.
Lubarda, V. A. et al., "Damage Model for Brittle Elastic Solids with Unequal Tensile and Compressive Strengths", *Engineering Fracture Mechanics*, vol. 29, No. 5, 1994, pp. 681-692.
Lucia, F. J. et al., "Characterization of Diagenetically Altered Carbonate Reservoirs, South Cowden Grayburg Reservoir, West Texas", a paper prepared for presentation at the 1996 SPE Annual Technical Conference and Exhibition, Oct. 1996, pp. 883-893.
Luffel, D. L. et al., "Travis Peak Core Permeability and Porosity Relationships at Reservoir Stress", *SPE Formation Evaluation*, Sep. 1991, pp. 310-318.
Luft, H. B. et al., "Development and Operation of a New Insulated Concentric Coiled Tubing String for ContinuoSteam Injection in Heavy Oil Production", Conference Paper published by Society of Petroleum Engineers on the Internet at: (http://www.onepetro.org/mslib/servlet/onepetropreview?id=00030322), on Aug. 8, 2012, 1 page.
Lund, M. et al., "Specific Ion Binding to Macromolecules: Effect of Hydrophobicity and Ion Pairing", *Langmuir*, 2008 vol. 24, 2008, pp. 3387-3391.
Manrique, E. J. et al., "EOR Field Experiences in Carbonate Reservoirs in the United States", *SPE Reservoir Evaluation & Engineering*, Dec. 2007, pp. 667-686.
Maqsood, A. et al., "Thermophysical Properties of PoroSandstones: Measurement and Comparative Study of Some Representative Thermal Conductivity Models", *International Journal of Thermophysics*, vol. 26, No. 5, Sep. 2005, pp. 1617-1632.
Marcuse, D., "Curvature Loss Formula for Optical Fibers", *J. Opt. Soc. Am.*, vol. 66, No. 3, 1976, pp. 216-220.
Martin, C. D., "Seventeenth Canadian Geotechnical Colloquium: The Effect of Cohesion Loss and Stress Path on Brittle Rock Strength", *Canadian Geotechnical Journal*, vol. 34, 1997, pp. 698-725.
Martins, A. et al., "Modeling of Bend Losses in Single-Mode Optical Fibers", Institutu de Telecomunicacoes, Portugal, 3 pages.
Maurer, W. C. et al., "Laboratory Testing of High-Pressure, High-Speed PDC Bits", a paper prepared for presentation at the 61st Annual Technical Conference and Exhibition of the Society of Petroleum Engineers, Oct. 1986, pp. 1-8.
McKenna, T. E. et al., "Thermal Conductivity of Wilcox and Frio Sandstones in South Texas (Gulf of Mexico Basin)", *AAPG Bulletin*, vol. 80, No. 8, Aug. 1996, pp. 1203-1215.
Meister, S. et al., "Glass Fibers for Stimulated Brillouin Scattering and Phase Conjugation", *Laser and Particle Beams* vol. 25, 2007, pp. 15-21.

(56) References Cited

OTHER PUBLICATIONS

Mejia-Rodriguez, G. et al., "Multi-Scale Material Modeling of Fracture and Crack Propagation", Final Project Report in Multi-Scale Methods in Applied Mathematics, while the date of the publication is unknown, it is believed to be prior to Aug. 19, 2009, pp. 1-9.
Mensa-Wilmot, G. et al., "New PDC Bit Technology, Improved Drillability Analysis, and Operational Practices Improve Drilling Performance in Hard and Highly HeterogeneoApplications", a paper prepared for the 2004 SPE (Society of Petroleum Engineers) Eastern Regional Meeting, Sep. 2004, pp. 1-14.
Messica, A. et al., "Theory of Fiber-Optic Evanescent-Wave Spectroscopy and Sensor", *Applied Optics*, vol. 35, No. 13, May 1, 1996, pp. 2274-2284.
Mills, W. R. et al., "Pulsed Neutron Porosity Logging", SPWLA Twenty-Ninth Annual Logging Symposium, Jun. 1988, pp. 1-21.
Mirkovich, V. V., "Experimental Study Relating Thermal Conductivity to Thermal Piercing of Rocks", *Int. J. Rock Mech. Min. Sci.*, vol. 5, 1968, pp. 205-218.
Mittelstaedt, E. et al., "A Noninvasive Method for Measuring the Velocity of Diffuse Hydrothermal Flow by Tracking Moving Refractive Index Anomalies", *Geochemistry Geophysics Geosystems*, vol. 11, No. 10, Oct. 8, 2010, pp. 1-18.
Moavenzadeh, F. et al., "Thin Disk Technique for Analyzing Fock Fractures Induced by Laser Irradiation", a report prepared for the Department of Transportation under Contract C-85-65, May 1968, 91 pages.
Montross, C. S. et al., "Laser-Induced Shock Wave Generation and Shock Wave Enhancement in Basalt", *International Journal of Rock Mechanics and Mining Sciences*, 1999, pp. 849-855.
Morozumi, Y. et al., "Growth and Structures of Surface Disturbances of a Round Liquid Jet in a Coaxial Airflow", *Fluid Dynamics Research*, vol. 34, 2004, pp. 217-231.
Morse, J. W. et al., "Experimental and Analytic Studies to Model Reaction Kinetics and Mass Transport of Carbon Dioxide Sequestration in Depleted Carbonate Reservoirs", a Final Scientific/Technical Report for DOE, while the date of the publication is unknown, it is believed to be prior to Aug. 19, 2009, 158 pages.
Moshier, S. O., "Microporosity in Micritic Limestones: A Review", *Sedimentary Geology*, vol. 63, 1989, pp. 191-213.
Mostafa, M. S. et al., "Investigation of Thermal Properties of Some Basalt Samples in Egypt", *Journal of Thermal Analysis and Calorimetry*, vol. 75, 2004, pp. 178-188.
Mukhin, I. B. et al., "Experimental Study of Kilowatt-Average-Power Faraday Isolators", OSA/ASSP, 2007, 3 pages.
Multari, R. A. et al., "Effect of Sampling Geometry on Elemental Emissions in Laser-Induced Breakdown Spectroscopy", *Applied Spectroscopy*, vol. 50, No. 12, 1996, pp. 1483-1499.
Munro, R. G., "Effective Medium Theory of the Porosity Dependence of Bulk Moduli", *Communications of American Ceramic Society*, vol. 84, No. 5, 2001, pp. 1190-1192.
Murphy, H. D., "Thermal Stress Cracking and Enhancement of Heat Extraction from Fractured Geothermal Reservoirs", a paper submitted to the Geothermal Resource Council for its 1978 Annual Meeting, Jul. 1978, 7 pages.
Murrell, S. A. F. et al., "The Effect of Temperature on the Strength at High Confining Pressure of Granodiorite Containing Free and Chemically-Bound Water", *Mineralogy and Petrology*, vol. 55, 1976, pp. 317-330.
Myung, I. J., "Tutorial on Maximum Likelihood Estimation", *Journal of Mathematical Psychology*, vol. 47, 2003, pp. 90-100.
Nakano, A. et al., "Visualization for Heat and Mass Transport Phenomena in Supercritical Artificial Air", *Cryogenics*, vol. 45, 2005, pp. 557-565.
Nara, Y. et al., "Study of Subcritical Crack Growth in Andesite Using the Double Torsion Test", *International Journal of Rock Mechanics & Mining Sciences*, vol. 42, 2005, pp. 521-530.
Nicklaus, K. et al., "Optical Isolator for Unpolarized Laser Radiation at Multi-Kilowatt Average Power", *Optical Society of America*, 2005, 3 pages.
Nikles, M. et al., "Brillouin Gain Spectrum Characterization in Single-Mode Optical Fibers", *Journal of Lightwave Technology*, vol. 15, No. 10, Oct. 1997, pp. 1842-1851.
Nilsen, B. et al., "Recent Developments in Site Investigation and Testing for Hard Rock TBM Projects", *1999 RETC Proceedings*, 1999, pp. 715-731.
Nimick, F. B., "Empirical Relationships Between Porosity and the Mechanical Properties of Tuff", *Key Questions in Rock Mechanics*, Cundall et al. (eds), 1988, pp. 741-742.
Nolen-Hoeksema, R., "Fracture Development and Mechnical Stratigraphy of Austin Chalk, Texas: Discussion", a discussion for the American Association of Petroleum Geologists Bulletin, vol. 73, No. 6, Jun. 1989, pp. 792-793.
Oglesby, K. et al., "Advanced Ultra High Speed Motor for Drilling", a project update by Impact Technologies LLC for the Department of Energy, Sep. 12, 2005, 36 pages.
Olsen, F. O., "Fundamental Mechanisms of Cutting Front Formation in Laser Cutting", *SPIE*, vol. 2207, pp. 402-413.
Ouyang, L. B. et al., "General Single Phase Wellbore Flow Model", a report prepared for the COE/PETC, May 2, 1997, 51 pages.
Palchaev, D. K. et al., "Thermal Expansion of Silicon Carbide Materials", *Journal of Engineering Physics and Thermophysics*, vol. 66, No. 6, 1994, 3 pages.
Parker, R. et al., "Drilling Large Diameter Holes in Rocks Using Multiple Laser Beams (504)", while the date of the publication is unknown, it is believed to be prior to Aug. 19, 2009, 6 pages.
Patricio, M. et al., "Crack Propagation Analysis", while the date of the publication is unknown, it is believed to be prior to Aug. 19, 2009, 24 pages.
Peebler, R. P. et al., "Formation Evaluation with Logs in the Deep Anadarko Basin", *SPE of AIME*, 1972, 15 pages.
Pepper, D. W. et al., "Benchmarking COMSOL Multiphysics 3.5a-CFD Problems", a presentation, Oct. 10, 2009, 54 pages.
Pettitt, R. et al., "Evolution of a Hybrid Roller Cone/PDC Core Bit", a paper prepared for Geothermal Resources Council 1980 Annual Meeting, Sep. 1980, 7 pages.
Phani, K. K. et al., "Pororsity Dependence of Ultrasonic Velocity and Elastic Modulin Sintered Uranium Dioxide—a discussion", *Journal of Materials Science Letters*, vol. 5, 1986, pp. 427-430.
Plumb, R. A. et al., "Influence of Composition and Texture on Compressive Strength Variations in the Travis Peak Formation", a paper prepared for presentation at the 67th Annual Technical Conference and Exhibition of the Society of Petroleum Engineers, Oct. 1992, pp. 985-998.
Porter, J. A. et al., "Cutting Thin Sheet Metal with a Water Jet Guided Laser Using VarioCutting Distances, Feed Speeds and Angles of Incidence", *Int. J. Adv. Manuf. Technol.*, vol. 33, 2007, pp. 961-967.
Potyondy, D. O., "Simulating Stress Corrosion with a Bonded-Particle Model for Rock", *International Journal of Rock Mechanics & Mining Sciences*, vol. 44, 2007, pp. 677-691.
Potyondy, D., "Internal Technical Memorandum—Molecular Dynamics with PFC", a Technical Memorandum to PFC Development Files and Itasca Website, *Molecular Dynamics with PFC*, Jan. 6, 2010, 35 pages.
Powell, M. et al., "Optimization of UHP Waterjet Cutting Head, the Orifice", Flow International, while the date of the publication is unknown, it is believed to be prior to Aug. 19, 2009, 19 pages.
Price, R. H. et al., "Analysis of the Elastic and Strength Properties of Yuccs Mountain tuff, Nevada", 26th Symposium on Rock Mechanics, Jun. 1985, pp. 89-96.
Quinn, R. D. et al., "A Method for Calculating Transient Surface Temperatures and Surface Heating Rates for High-Speed Aircraft", NASA, Dec. 2000, 35 pages.
Ramadan, K. et al., "On the Analysis of Short-Pulse Laser Heating of Metals Using the Dual Phase Lag Heat Conduction Model", *Journal of Heat Transfer*, vol. 131, Nov. 2009, pp. 111301-1 to 111301-7.
Rao, M. V. M. S. et al., "A Study of Progressive Failure of Rock Under Cyclic Loading by Ultrasonic and AE Monitoring Techniques", *Rock Mechanics and Rock Engineering*, vol. 25, No. 4, 1992, pp. 237-251.
Rauenzahn, R. M., "Analysis of Rock Mechanics and Gas Dynamics of Flame-Jet Thermal Spallation Drilling", a dissertation for the degree of Doctor of Philosophy at Massachusettes Institute of Technology, Sep. 1986, pp. 1-524.

(56) References Cited

OTHER PUBLICATIONS

Ravishankar, M. K., "Some Results on Search Complexity vs Accuracy", DARPA Spoken Systems Technology Workshop, Feb. 1997, 4 pages.

Ream, S. et al., "Zinc Sulfide Optics for High Power Laser Applications", Paper 1609, while the date of the publication is unknown, it is believed to be prior to Aug. 19, 2009, 7 pages.

Rice, J. R., "On the Stability of Dilatant Hardening for Saturated Rock Masses", *Journal of Geophysical Research*, vol. 80, No. 11, Apr. 10, 1975, pp. 1531-1536.

Richter, D. et al., "Thermal Expansion Behavior of IgneoRocks", *Int. J. Rock Mech. Min. Sci. & Geomech. Abstr.*, vol. 11, 1974, pp. 403-411.

Rietman, N. D. et al., "Comparative Economics of Deep Drilling in Anadarka Basin", a paper presented at the 1979 Society of Petroleum Engineers of AIME Deep Drilling and Production Symposium, Apr. 1979, 5 pages.

Rijken, P. et al., "Predicting Fracture Attributes in the Travis Peak Formation Using Quantitative Mechanical Modeling and Structural Diagenesis", Gulf Coast Association of Geological Societies Transactions vol. 52, 2002, pp. 837-847.

Rijken, P. et al., "Role of Shale Thickness on Vertical Connectivity of Fractures: Application of Crack-Bridging Theory to the Austin Chalk, Texas", *Tectonophysics*, vol. 337, 2001, pp. 117-133.

Rosler, M., "Generalized Hermite Polynomials and the Heat Equation for Dunkl Operators", a paper, while the date of the publication is unknown, it is believed to be prior to Aug. 19, 2009, pp. 1-24.

Rossmanith, H. P. et al., "Fracture Mechanics Applications to Drilling and Blasting", *Fatigue & Fracture Engineering Materials & Structures*, vol. 20, No. 11, 1997, pp. 1617-1636.

Rubin, A. M. et al., "Dynamic Tensile-Failure-Induced Velocity Deficits in Rock", *Geophysical Research Letters*, vol. 18, No. 2, Feb. 1991, pp. 219-222.

Sachpazis, C. I, M. Sc., Ph. D., "Correlating Schmidt Hardness With Compressive Strength and Young's ModulOf Carbonate Rocks", *International Association of Engineering Geology*, Bulletin, No. 42, 1990, pp. 75-83.

Salehi, I. A. et al., "Laser Drilling—Drilling with the Power Light", a final report a contract with DOE with award No. DE-FC26-00NT40917, May 2007, in parts 1-4 totaling 318 pages.

Sandler, I. S. et al., "An Algorithm and a Modular Subroutine for the Cap Model", *International Journal for Numerical and Analytical Methods in Geomechanics*, vol. 3, 1979, pp. 173-186.

Santarelli, F. J. et al., "Formation Evaluation From Logging on Cuttings", *SPE Reservoir Evaluation & Engineering*, Jun. 1998, pp. 238-244.

Sattler, A. R., "Core Analysis in a Low Permeability Sandstone Reservoir: Results from the Multiwell Experiment", a report by Sandia National Laboratories for the Department of Energy, Apr. 1989, 69 pages.

Scaggs, M. et al., "Thermal Lensing Compensation Objective for High Power Lasers", published by Haas Lasers Technologies, Inc., while the date of the publication is unknown, it is believed to be prior to Aug. 19, 2009, 7 pages.

Schaff, D. P. et al., "Waveform Cross-Correlation-Based Differential Travel-Time Measurements at the Northern California Seismic Network", *Bulletin of the Seismological Society of America*, vol. 95, No. 6, Dec. 2005, pp. 2446-2461.

Schaffer, C. B. et al., "Dynamics of Femtosecond Laser-Induced Breakdown in Water from Femtoseconds to Microseconds", *Optics Express*, vol. 10, No. 3, Feb. 11, 2002, pp. 196-203.

Scholz, C. H., "Microfracturing of Rock in Compression", a dissertation for the degree of Doctor of Philosophy at Massachusettes Instutute of Trechnology, Sep. 1967, 177 pages.

Schroeder, R. J. et al., "High Pressure and Temperature Sensing for the Oil Industry Using Fiber Bragg Gratings Written onto Side Hole Single Mode Fiber", publisher unknown, while the date of the publication is unknown, it is believed to be prior to Aug. 19, 2009, 4 pages.

Shiraki, K. et al., "SBS Threshold of a Fiber with a Brillouin Frequency Shift Distribution", *Journal of Lightwave Technology*, vol. 14, No. 1, Jan. 1996, pp. 50-57.

Singh, T. N. et al., "Prediction of Thermal Conductivity of Rock Through Physico-Mechanical Properties", *Building and Environment*, vol. 42, 2007, pp. 146-155.

Sinha, D., "Cantilever Drilling—Ushering a New Genre of Drilling", a paper prepared for presentation at the SPE/IADC Middle East Drilling Technology Conference and Exhibition, Oct. 2003, 6 pages.

Sinor, A. et al., "Drag Bit Wear Model", *SPE Drilling Engineering*, Jun. 1989, pp. 128-136.

Smith, D., "Using Coupling Variables to Solve Compressible Flow, Multiphase Flow and Plasma Processing Problems", COMSOL Users Conference 2006, 38 pages.

Sneider, RM et al., "Rock Types, Depositional History, and Diangenetic Effects, lvishak reservoir Prudhoe Bay Field", *SPE Reservoir Engineering*, Feb. 1997, pp. 23-30.

Soeder, D. J. et al., "Pore Geometry in High- and Low-Permeability Sandstones, Travis Peak Formation, East Texas", *SPE Formation Evaluation*, Dec. 1990, pp. 421-430.

Somerton, W. H. et al., "Thermal Expansion of Fluid Saturated Rocks Under Stress", SPWLA Twenty-Second Annual Logging Symposium, Jun. 1981, pp. 1-8.

Stowell, J. F. W., "Characterization of Opening-Mode Fracture Systems in the Austin Chalk", *Gulf Coast Association of Geological Societies Transactions*, vol. L1, 2001, pp. 313-320.

Straka, W. A. et al., "Cavitation Inception in Quiescent and Co-Flow Nozzle Jets", 9th International Conference on Hydrodynamics, Oct. 2010, pp. 813-819.

Suarez, M. C. et al., "COMSOL in a New Tensorial Formulation of Non-Isothermal Poroelasticity", publisher unknown, while the date of the publication is unknown, it is believed to be prior to Aug. 19, 2009, 2 pages.

Summers, D. A., "Water Jet Cutting Related to Jet & Rock Properties", publisher unknown, while the date of the publication is unknown, it is believed to be prior to Aug. 19, 2009, 13 pages.

Suwarno, et al., "Dielectric Properties of Mixtures Between Mineral Oil and Natural Ester from Palm Oil", *WSEAS Transactions on Power Systems*, vol. 3, Issue 2, Feb. 2008, pp. 37-46.

Tang, C. A. et al., "Numerical Studies of the Influence of Microstructure on Rock Failure in Uniaxial Compression—Park I: Effect of Heterogeneity", *International Journal of Rock Mechanics and Mining Sciences*, vol. 37, 2000, pp. 555-569.

Tao, Q. et al., "A Chemo-Poro-Thermoelastic Model for Stress/Pore Pressure Analysis around a Wellbore in Shale", a paper prepared for presentation at the Symposium on Rock Mechanics (USRMS): *Rock Mechanics for Energy*, Mineral and Infrastructure Development in the Northern Regions, Jun. 2005, 7 pages.

Terra, O. et al., "Brillouin Amplification in Phase Coherent Transfer of Optical Frequencies over 480 km Fiber", publisher unknown, while the date of the publication is unknown, it is believed to be prior to Aug. 19, 2009, 9 pages.

Terzopoulos, D. et al., "Modeling Inelastic Deformation: Viscoelasticity, Plasticity, Fracture", *SIGGRAPH '88*, Aug. 1988, pp. 269-278.

Thomas, R. P., "Heat Flow Mapping at the Geysers Geothermal Field", published by the California Department of Conservation Division of Oil and Gas, 1986, 56 pages.

Thompson, G. D., "Effects of Formation Compressive Strength on Perforator Performance", a paper presented of the Southern District API Division of Production, Mar. 1962, pp. 191-197.

Tovo, R. et al., "Fatigue Damage Evaluation on Mechanical Components Under Multiaxial Loadings", excerpt from the Proceedings of the COMSOL Conference, 2009, 8 pages.

Tuler, F. R. et al., "A Criterion for the Time Dependence of Dynamic Fracture", *The International Jopurnal of Fracture Mechanics*, vol. 4, No. 4, Dec. 1968, pp. 431-437.

Turner, D. et al., "New DC Motor for Downhole Drilling and Pumping Applications", a paper prepared for presentation at the SPE/ICoTA Coiled Tubing Roundtable, Mar. 2001, pp. 1-7.

(56) References Cited

OTHER PUBLICATIONS

Turner, D. R. et al., "The All Electric BHA: Recent Developments Toward an Intelligent Coiled-Tubing Drilling System", a paper prepared for presentation at the 1999 SPE/ICoTA Coiled Tubing Roundtable, May 1999, pp. 1-10.

Tutuncu, A. N. et al., "An Experimental Investigation of Factors Influencing Compressional- and Shear-Wave Velocities and Attenuations in Tight Gas Sandstones", *Geophysics*, vol. 59, No. 1, Jan. 1994, pp. 77-86.

Udd, E. et al., "Fiber Optic Distributed Sensing Systems for Harsh Aerospace Environments", publisher unknown, while the date of the publication is unknown, it is believed to be prior to Aug. 19, 2009, 12 pages.

Valsangkar, A. J. et al., Stress-Strain Relationship for Empirical Equations of Creep in Rocks, *Engineering Geology*, Mar. 29, 1971, 5 pages.

Wagh, A. S. et al., "Dependence of Ceramic Fracture Properties on Porosity", *Journal of Material Sience*, vol. 28, 1993, pp. 3589-3593.

Wagner, F. et al., "The Laser Microjet Technology—10 Years of Development (M401)", publisher unknown, while the date of the publication is unknown, it is believed to be prior to Aug. 19, 2009, 9 pages.

Waldron, K. et al., "The Microstructures of Perthitic Alkali Feldspars Revealed by Hydroflouric Acid Etching", *Contributions to Mineralogy and Petrology*, vol. 116, 1994, pp. 360-364.

Walker, B. H. et al., "Roller-Bit Penetration Rate Response as a Function of Rock Properties and Well Depth", a paper prepared for presentation at the 61st Annual Technical Conference and Exhibition of the Society of Petroleum Engineers, Oct. 1986, 12 pages.

Wandera, C. et al., "Characterization of the Melt Removal Rate in Laser Cutting of Thick-Section Stainless Steel", *Journal of Laser Applications*, vol. 22, No. 2, May 2010, pp. 62-70.

Wandera, C. et al., "Inert Gas Cutting of Thick-Section Stainless Steel and Medium Section Aluminun Using a High Power Fiber Laser", *Journal of Chemical Physics*, vol. 116, No. 4, Jan. 22, 2002, pp. 154-161.

Wandera, C. et al., "Laser Power Requirement for Cutting of Thick-Section Steel and Effects of Processing Parameters on Mild Steel Cut Quality", a paper accepted for publication in the Proceedings IMechE Part B, *Journal of Engineering Manufacture*, vol. 225, 2011, 23 pages.

Wandera, C. et al., "Optimization of Parameters for Fiber Laser Cutting of 10mm Stainless Steel Plate", a paper for publication in the Proceeding IMechE Part B, *Journal of Engineering Manufacture*, vol. 225, 2011, 22 pages.

Wandera, C., "Performance of High Power Fibre Laser Cutting of Thick-Section Steel and Medium-Section Aluminium", a thesis for the degree of Doctor of Science (Technology) at , Lappeenranta University of Technology, Oct. 2010, 74 pages.

Wang, C. H., "Introduction to Fractures Mechanics", published by DSTO Aeronautical and Maritime Research Laboratory, Jul. 1996, 82 pages.

Wang, G. et al., "Particle Modeling Simulation of Thermal Effects on Ore Breakage", *Computational Materials Science*, vol. 43, 2008, pp. 892-901.

Waples, D. W. et al., "A Review and Evaluation of Specific Heat Capacities of Rocks, Minerals, and Subsurface Fluids. Part 1: Minerals and NonporoRocks", *Natural Resources Research*, vol. 13, No. 2, Jun. 2004, pp. 97-122.

Waples, D. W. et al., "A Review and Evaluation of Specific Heat Capacities of Rocks, Minerals, and Subsurface Fluids. Part 2: Fluids and PoroRocks", *Natural Resources Research*, vol. 13 No. 2, Jun. 2004, pp. 123-130.

Warren, T. M. et al., "Laboratory Drilling Performance of PDC Bits", *SPE Drilling Engineering*, Jun. 1988, pp. 125-135.

White, E. J. et al., "Reservoir Rock Characteristics of the Madison Limestone in the Williston Basin", *The Log Analyst*, Sep.-Oct. 1970, pp. 17-25.

White, E. J. et al., "Rock Matrix Properties of the Ratcliffe Interval (Madison Limestone) Flat Lake Field, Montana", *SPE of AIME*, Jun. 1968, 16 pages.

Wilkinson, M. A. et al., "Experimental Measurement of Surface Temperatures During Flame-Jet Induced Thermal Spallation", *Rock Mechanics and Rock Engineering*, 1993, pp. 29-62.

Winters, W. J. et al., "Roller Bit Model with Rock Ductility and Cone Offset", a paper prepared for presentation at 62nd Annual Technical Conference and Exhibition of the Society of Petroleum Engineers, Sep. 1987, 12 pages.

Wippich, M. et al., "Tunable Lasers and Fiber-Bragg-Grating Sensors", Obatined from the at: from the Internet website of the Industrial Physicist at: http://www.aip.org/tip/INPHFA/vol-9/iss-3/p24.html, on May 18, 2010, pp. 1-5.

Wu, X. Y. et al., "The Effects of Thermal Softening and Heat Conductin on the Dynamic Growth of Voids", *International Journal of Solids and Structures*, vol. 40, 2003, pp. 4461-4478,.

Xiao, J. Q. et al., "Inverted S-Shaped Model for Nonlinear Fatigue Damage of Rock", *International Journal of Rock Mechanics & Mining Sciences*, vol. 46, 2009, pp. 643-648.

Xu, Z. et al., "Application of High Powered Lasers to Perforated Completions", *International Congress on Applications of Laser & Electro-Optics*, Oct. 2003, 6 pages.

Xu, Z. et al., "Laser Rock Drilling by a Super-Pulsed CO2 Laser Beam", a manuscript created for the Department of Energy, while the date of the publication is unknown, it is believed to be prior to Aug. 19, 2009, 9 pages.

Xu, Z. et al., "Modeling of Laser Spallation Drilling of Rocks for Gas-and Oilwell Drilling", a paper prepared for the presentation at the 2005 SPE (Society of Petroleum Engineers) Annual Technical Conference and Exhibition, Oct. 2005, 6 pages.

Xu, Z. et al., "Rock Perforation by Pulsed Nd:YAG Laser", Proceedings of the 23rd International Congress on Applications of Lasers and Electro-Optics 2004, 2004, 5 pages.

Yabe, T. et al., "The Constrained Interpolation Profile Method for Multiphase Analysis", *Journal of Computational Physics*, vol. 169, 2001, pp. 556-593.

Yamamoto, K. Y. et al., "Detection of Metals in the Environment Using a Portable Laser-Induced Breakdown Spectroscopy Instrument", *Applied Spectroscopy*, vol. 50, No. 2, 1996, pp. 222-233.

Yamashita, Y. et al., "Underwater Laser Welding by 4kW CW YAG Laser", *Journal of Nuclear Science and Technology*, vol. 38, No. 10, Oct. 2001, pp. 891-895.

Yasar, E. et al., "Determination of the Thermal Conductivity from Physico-Mechanical Properties", *Bull Eng. Geol. Environ.*, vol. 67, 2008, pp. 219-225.

York, J. L. et al., "The Influence of Flashing and Cavitation on Spray Formation", a progress report for UMRI Project 2815 with Delavan Manufacturing Company, Oct. 1959, 27 pages.

Zamora, M. et al., "An Empirical Relationship Between Thermal Conductivity and Elastic Wave Velocities in Sandstone", *Geophysical Research Letters*, vol. 20, No. 16, Aug. 20, 1993, pp. 1679-1682.

Zehnder, A. T., "Lecture Notes on Fracture Mechanics", 2007, 227 pages.

Zeng, Z. W. et al., "Experimental Determination of Geomechanical and Petrophysical Properties of Jackfork Sandstone-A Tight Gas Formation", a paper prepared for the presentation at the 6th North American Rock Mechanics Symposium (NARMS): *Rock Mechanics Across Borders and Disciplines*, Jun. 2004, 9 pages.

Zeuch, D. H. et al., "Rock Breakage Mechanisms With a PDC Cutter", a paper prepared for presentation at the 60th Annual Technical Conference and Exhibition of the Society of Petroleum Engineers, Sep. 1985, 12 pages.

Zhang, L. et al., "Energy from Abandoned Oil and Gas Reservoirs", a paper prepared for presentation at the 2008 SPE (Society of Petroleum Engineers) Asia Pacific Oil & Gas Conference and Exhibition, 2008, pp. 1-10.

Zheleznov, D. S. et al., "Faraday Rotators With Short Magneto-Optical Elements for 50-kW Laser Power", *IEEE Journal of Quantum Electronics*, vol. 43, No. 6, Jun. 2007, pp. 451-457.

Zhou, T. et al., "Analysis of Stimulated Brillouin Scattering in Multi-Mode Fiber by Numerical Solution", *Journal of Zhejiang University of Science*, vol. 4 No. 3, May-Jun. 2003, pp. 254-257.

(56) References Cited

OTHER PUBLICATIONS

Zhu, X. et al., "High-Power ZBLAN Glass Fiber Lasers: Review and Prospect", *Advances in OptoElectronics*, vol. 2010, pp. 1-23.

Zietz, J. et al., "Determinants of House Prices: A Quantile Regression Approach", *Department of Economics and Finance Working Paper Series*, May 2007, 27 pages.

Zuckerman, N. et al., "Jet Impingement Heat Transfer: Physics, Correlations, and Numerical Modeling", *Advances in Heat Transfer*, vol. 39, 2006, pp. 565-631.

"Chapter I—Laser-Assisted Rock-Cutting Tests", publisher unknown, while the date of the publication is unknown, it is believed to be prior to Aug. 19, 2009, 64 pages.

"Chapter 7: Energy Conversion Systems—Options and Issues", publisher unknown, while the date of the publication is unknown, it is believed to be prior to Aug. 19, 2009, pp. 7-1 to 7-32 and table of contents page.

"Cross Process Innovations", Obtained from the Internat at: http://www.mrl.columbia.edu/ntm/CrossProcess/CrossProcessSect5.htm, on Feb. 2, 2010, 11 pages.

"Fourier Series, Generalized Functions, Laplace Transform", publisher unknown, while the date of the publication is unknown, it is believed to be prior to Aug. 19, 2009, 6 pages.

"Introduction to Optical Liquids", published by Cargille-Sacher Laboratories Inc., Obtained from the Internet at: http://www.cargille.com/opticalintro.shtml, on Dec. 23, 2008, 5 pages.

"Laser Drilling", Oil & Natural Gas Projects (Exploration & Production Technologies) Technical Paper, Dept. of Energy, Jul. 2007, 3 pages.

"Leaders in Industry Luncheon", IPAA & TIPRO, Jul. 8, 2009, 19 pages.

"Measurement and Control of Abrasive Water-Jet Velocity", publisher unknown, while the date of the publication is unknown, it is believed to be prior to Aug. 19, 2009, 8 pages.

"NonhomogeneoPDE—Heat Equation with a Forcing Term", a lecture, 2010, 6 pages.

"Performance Indicators for Geothermal Power Plants", prepared by International Geothermal Association for World Energy Council Working Group on Performance of Renewable Energy Plants, author unknown, Mar. 2011, 7 pages.

"Rock Mechanics and Rock Engineering", publisher unknown, while the date of the publication is unknown, it is believed to be prior to Aug. 19, 2009, 69 pages.

"Shock Tube", Cosmol MultiPhysics 3.5a, 2008, 5 pages.

"Silicone Fluids: Stable, Inert Media", Gelest, Inc., while the date of the publication is unknown, it is believed to be prior to Aug. 19, 2009, 27 pages.

"Stimulated Brillouin Scattering (SBS) in Optical Fibers", Centro de Pesquisa em Optica e Fotonica, Obtained from the Internet at: http://cepof.ifi.unicamp.br/index.php . . . ), on Jun. 25, 2012, 2 pages.

"Underwater Laser Cutting", TWI Ltd, May/Jun. 2011, 2 pages.

Utility U.S. Appl. No. 13/768,149, filed Feb. 15, 2013, 27 pages.
Utility U.S. Appl. No. 13/777,650, filed Feb. 26, 2013, 73 pages.
Utility U.S. Appl. No. 13/782,869, filed Mar. 1, 2013, 80 pages.
Utility U.S. Appl. No. 13/782,942, filed Mar. 1, 2013, 81 pages.
Utility U.S. Appl. No. 13/800,559, filed Mar. 13, 2013, 73 pages.
Utility U.S. Appl. No. 13/800,820, filed Mar. 13, 2013, 73 pages.
Utility U.S. Appl. No. 13/800,879, filed Mar. 13, 2013, 73 pages.
Utility U.S. Appl. No. 13/800,933, filed Mar. 13, 2013, 73 pages.
Utility U.S. Appl. No. 13/849,831, filed Mar. 25, 2013, 83 pages.
Utility U.S. Appl. No. 13/852,719, filed Mar. 28, 2013, 85 pages.

Office Action from JP Application No. 2011-551172 dated Sep. 17, 2013.

Office Action from EP Application No. 10786516.4 dated Jun. 10, 2014.

* cited by examiner

US 9,347,271 B2

OPTICAL FIBER CABLE FOR TRANSMISSION OF HIGH POWER LASER ENERGY OVER GREAT DISTANCES

This application is a continuation-in-part of U.S. patent application Ser. No. 12/544,136 filed Aug. 19, 2009 now U.S. Pat. No. 8,511,401, title Method and Apparatus for Delivering High Power Laser Energy over Long Distances, which claims the benefit of the filing date of Oct. 17, 2008 under 35 U.S.C. §119(e)(1) of U.S. Provisional Application Ser. No. 61/106,472, titled Transmission of High Optical Power Levels via Optical Fibers for Applications such as Rock Drilling and Power Transmission; and this application claims the benefit of priority under 35 U.S.C. §119(e)(1) of the following listed applications: U.S. Provisional Application Ser. No. 61/295,562, filed Jan. 15, 2010, title Optical Fiber Cable for Transmission of High Power Laser Energy Over Great Distances and U.S. Provisional Application Ser. No. 61/153,271, filed Feb. 17, 2009, title Method and Apparatus for an Armored High Power Optical Fiber for Providing Boreholes in the Earth; the entire disclosure of each of the above mentioned regular and provisional patent application are incorporated herein by reference.

This invention was made with Government support under Award DE-AR0000044 awarded by the Office of ARPA-E U.S. Department of Energy. The Government has certain rights in this invention.

BACKGROUND OF THE INVENTION

1. Field of the Invention

The present invention relates to the construction and composition of optical fiber cables and laser systems utilizing such cables that provide for the ability to transmit high power laser energy over great distances, which distances and power transmission levels were heretofore believed to be unobtainable. The present invention further relates to the construction of such cables to withstand harsh environments. In particular, the present invention relates to a unique and novel combination of an optical fiber and a multi-layered structure for such cables.

As used herein, unless specified otherwise "high power laser energy" means a laser beam having at least about 5 kW (kilowatt) of power. As used herein, unless specified otherwise "great distances" means at least about 500 m (meter). As used herein the term "substantial loss of power" and "substantial power loss" means more than about 2.0 dB/km (decibel/kilometer) for a selected wavelength. As used herein the term "substantial power transmission" means at least about 50% transmittance.

2. Discussion of Related Art

Until the present invention, it was believed that a paradigm existed in that the transmission of high power laser energy over great distances without substantial loss of power was unobtainable. As a consequence, it was further believed that there was no reason to construct, or investigate the composition of, an optical fiber or an optical fiber cable for the transmission of high power laser energy over great distances.

Power loss over long distances occurs in an optical fiber from many sources including: absorption loss, and in particular absorption loss from hydroxyl ions (OH⁻); Rayleigh scattering; Brillouin scattering; Raman scattering; defects; inclusions; and bending loss. These problems have been documented in the literature.

For example, in the 2006, Crystal Fiber White Paper, titled "Towards 100 kW fiber laser system Scaling up power in fiber lasers for beam combining" it is provided, at page 4, that for stimulated Brillouin scattering (SBS) "the threshold scales as the square of signal mode field diameter (MFD) and inversely with the effective fiber length. Hence, larger core size and short fiber length are desired for power scaling." (emphasis original) In Corning paper, NIST-SOFM 2004, titled "Stimulated Brillouin Scattering: An Overview of Measurements, System Impairments, and Applications" it is provided, at page 1, that "[o]f the three types of scattering events [Rayleigh, Raman and Brillouin] stimulated Brillouin scattering (SBS) is recognized as the dominant optical fiber nonlinearity." (bracketed matter added) The Corning paper, at page 3, goes on to provide that "[t]he output power curve . . . also shows that the signal power becomes depleted beyond a certain input power. This deleterious result will effectively clamp the signal output power, but continue to transfer power to the Stokes (reflected) signal via the electrostrictive process which underlies the stimulated Brillouin phenomenon." Thus, the Corning paper, at page 4, provides that "[s]timuated Brillouin scattering is known to grossly limit the design of several optical transmission systems, amplifiers, and lasers."

This perceived paradigm, expressed in the art to be believed to exist between length of fiber and power transmittance is further illustrated in the May 31, 2007, Vol. 5, Supplement, pages S39-S41, CHINESE OPTICS LETTERS, Muto et al., titled "Laser cutting for thick concrete by multi-pass technique", although Muto states that 4 kW of power were delivered down a 1 km fiber, when 5 kW of laser power was put into the fiber, Muto, however, fails to eliminate the stimulated Raman scattering SRS phenomena. As shown by Muto's paper this deleterious phenomenon will effectively clamp the output power as length or power is increased. The SRS phenomenon is seen by the spectrum that is shown in FIG. 3 of Muto, which figure is provided herein as FIG. 2 in this specification. In FIG. 2 the laser beam is shown as band 200 and the SRS is shown as band 201. Thus, prior to the present invention, it was believed that as input laser power, or the length of the fiber increased, the power output of a fiber would not increase because of the SBS, SRS and other non-linear phenomenon. In particular, SBS would transfer the output power to back up the fiber toward the input. Further, SBS, SRS, as well as the other deleterious nonlinear effects, in addition to limiting the amount of power that can be transmitted out of the fiber, can result in fiber heating and ultimate failure. Thus, as recognized by Muto, at page S41 "[i]t is found that 10-kW power delivery is feasible through a 250-m-long fiber with the core diameter of 150 μm. The physical phenomenon which restricts the transmitted power is SRS." Thus, Muto, as did others before him, failed to deliver high power laser energy over great distances.

The present invention breaks this length-power-paradigm, and advances the art of high power laser delivery beyond this paradigm, by providing an optical fiber cable laser system that overcomes these and other losses, brought about by non-linear effects, and provides for the transmission of high power laser energy over great distances without substantial power loss.

SUMMARY

It is desirable to have an optical fiber cable that provides for the delivery of high power laser energy over great distances and without substantial power loss. The present invention, among other things, solves this need by providing the articles taught herein.

Thus there is provided herein an optical fiber cable for transmitting high power laser energy over great distances, the cable can have a length that is greater than about 0.5 km, greater than 2 km greater than about 3 km or greater than about 5 km; the cable is a layered structure comprising: a core; a cladding; a coating; a first protective layer; and, a second protective layer, the cable is capable of transmitting laser energy having a power greater than or equal to about 1 kW, about 5 kW or about 10 kW, over the length of the cable with a power loss of less than about 2 dB/km and preferably less than about 1 dB/km and more preferably less than about 0.3 dB/km for a selected wavelength. There is further provided such an optical fiber cable that delivers the laser energy to a tool or surface having a spectrum that is substantially free from SRS phenomena.

A system for delivering high power laser energy to a tool, the system having a high power laser having a power of at least about 1 kW, at least about 5 kW or at least about 10 kW. The system having an optical fiber cable having a core; cladding; coating; and, a first protective layer. The system having a tool. The cable in the system having first and second ends and a length between the first and second end; the length of the cable being greater than 0.5 km, greater than about 1 km, greater than about 2 km, or greater than about 3 km. The first end of the cable being optically associated or connected to the laser and the second end of the cable being associated with and preferably optically associated with or connected to the tool. The laser beam, from at least in part the laser, transmitted in the cable and having a power of at least about 1 kW at the first end of the cable, and, the power loss of the laser beam in the cable from the first end to the second end being less than about 2 dB/km and preferably being less than about 1 db/km and more preferably less than about 0.5 dB/km for a selected wave length. There is further provided such an optical fiber cable that delivers the laser energy to a tool or surface having a spectrum in which the SRS phenomena is substantially absent.

A spool of optical fiber cable for transmitting laser energy over great distances. The spool having a cable wound around the spool, the cable being capable of being unwound from and wound onto the spool, and thus being rewindable. The cable having a length greater than about 0.5 km, about 1 km, about 2 km or about 3 km and comprising: a core; a cladding; a coating; a first protective layer; and, a second protective layer. The cable is capable of transmitting high power laser energy for its length with a power loss of less than about 2 dB/km and more preferably less than about 1 dB/km and still more preferably less than about 0.5 dB/km and yet more preferably about 0.3 dB/km. The outer diameter of the spool when wound is less than about 6 m to facilitate transporting of the cable by truck.

DESCRIPTION OF THE DRAWINGS AND THE PREFERRED EMBODIMENTS

In general, the present inventions relate to optical fiber structures for transmitting high power laser energy over great distances without substantial loss of power. This invention further relates to the structure of optical fiber cables and, without limitation, the structure of such cables for use in harsh environments.

Figure 1A:
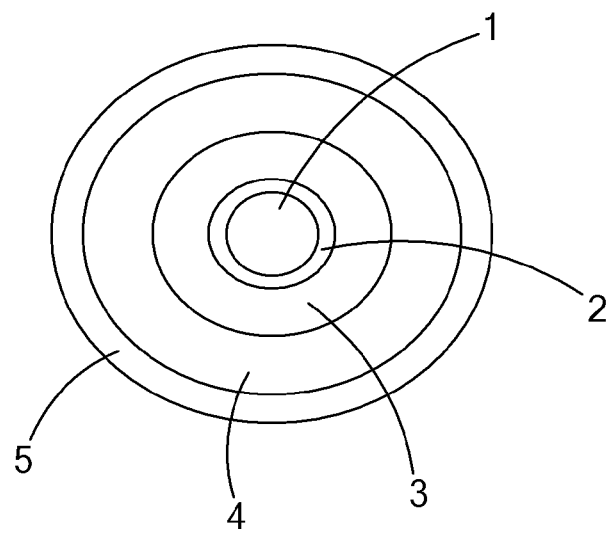
FIG. 1A is a transverse cross sectional view, not necessarily to scale, showing the structure of an optical fiber cable of the present invention.
Figure 1B:
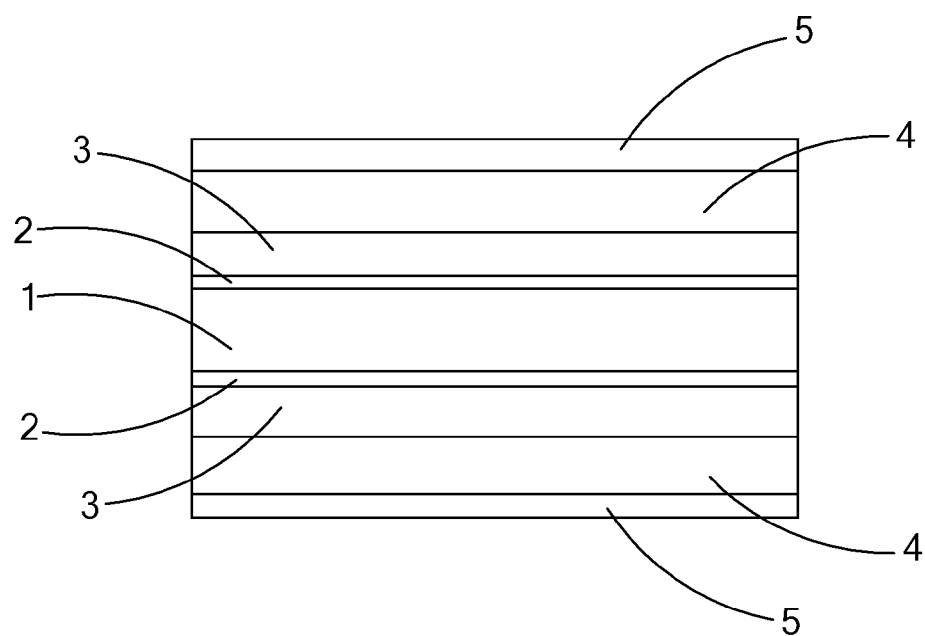
FIG. 1B is a longitudinal cross sectional view of the optical fiber cable of FIG. 1A.
Figure 2:
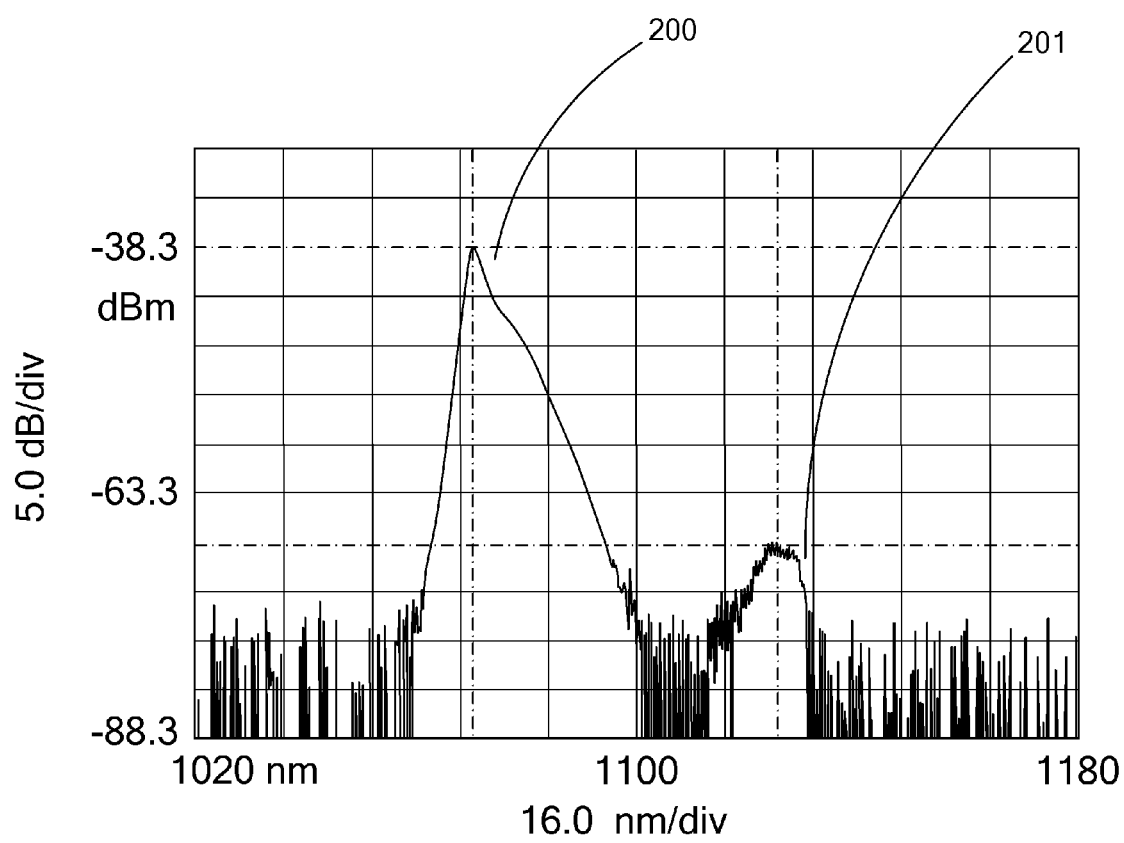
FIG. 2 is a prior art spectrum showing the presence of SRS phenomena.

Thus, in general there is provided in FIGS. 1A and 1B an optical fiber cable having a core 1, a cladding 2, a coating 3, a first protective layer 4, and a second protective layer 5. Although shown in the figures as being concentric, it is understood that the components may be located off-center, off-center and on-center at different locations, and that the core, the core and cladding and the core, cladding and coating maybe longer or shorter than the one or more of the protective layers.

The core 1 is preferably composed of fused silica having a water content of at most about 0.25 ppm. The core may be composed of other materials, such as those disclosed in patent application Ser. No. 12/544,136, the entire disclosure of which is incorporated herein by reference. Higher purity materials, and the highest purity material available, for use in the core are preferred. Thus this higher purity material minimizes the scattering losses caused by defects and inclusions. The core is about 200 to about 700 microns in diameter, preferably from about 500 to about 600 microns in diameter and more preferably about 600 microns in diameter. As used herein the term "about" would include ranges of plus or minus 10%.

The cladding 2 is preferably composed of fluorine doped fused silica. The cladding may be composed of other materials such as fused silica doped with index-altering ions (germanium), as well as those disclosed in patent application Ser. No. 12/544,136, the disclosure of which is incorporated herein by reference. The cladding thickness, depending upon the wavelength being used and the core diameter, is from about 50 microns to about 250 microns, preferably about 40 microns to about 70 microns and more preferably about 60 microns. As used herein with respect to a multi-layer structure, the term "thickness" means the distance between the layer's inner diameter and its outer diameter. The thickness of the cladding is dependent upon and relative to the core size and the intended wavelength. In general for 1.1 micron wavelength the outer diameter of the cladding should be 1.1× the outer diameter of core or greater; and, for a 1.5 micron wavelength the outer diameter of the cladding should be 1.5× the outer diameter of the core or greater. Although a single cladding is illustrated, it is understood that multiple cladding may be utilitzied.

The coating 3 is preferably composed of a high temperature acrylate polymer, for higher temperatures a polyimide coating is desirable. The coating may be composed of other materials, such a metal, as well as those disclosed in patent application Ser. No. 12/544,136, the disclosures of which are incorporated herein by reference. The coating thickness is preferably from about 50 microns to about 250 microns, preferably about 40 microns to about 150 microns and more preferably about 90 microns. The coating thickness may even be thicker for extreme environments, conditions and special uses or it may be thinner for environments and uses that are less demanding. It can be tailored to protect against specific environmental and/or physical risks to the core and cladding that may be encountered and/or anticipated in a specific use for the cable.

The first protective layer 4 and the second protective layer 5 may be the same or they may be different, or they may be a single composite layer comprising different materials. Preferably the first and second protective layers are different materials.

The first protective layer is preferably thixotropic gel. In this preferred embodiment, this layer primarily protects the fiber from absorption loss from hydroxyl ions and vibration. The thixotropic gel protects the fiber from mechanical damage due to vibrations, as well as, provides support for the fiber when hanging vertically because its viscosity increases when it is static. A palladium additive is be added to the thixotropic gel to provide hydrogen scavenging. The hydrogen which diffuses into the fiber may be problematic for Germanium or similar ion doped cores. When using a pure slica doped core, it is less of an effect. The first protective layer may be composed of other materials, such as those disclosed in patent application Ser. No. 12/544,136, the entire disclosure of which is incorporated herein by reference. The thickness of the first protective layer should be selected based upon the environment and conditions of use as well as the desired flexibility and/or stiffness of the cable. Thus, the composition and thickness of the first protective layer can be tailored to protect against specific environmental and/or physical risks to the core, cladding and coating that may be encountered and/or anticipated in a specific use for the cable. Thus, the use of the preferred thixotropic gel provides the dual benefit of adding in the manufacture of the cable as well as providing mechanical protection to the core once the cable manufacturing is completed.

The second protective layer is preferably a stainless steel tube composed of 316 stainless. The second protective layer preferably provides physical strength to the fiber over great distances, as well as, protection from physical damage and the environment in which the cable may be used. The second protective layer may be composed of other materials, such as those disclosed in patent application Ser. No. 12/544,136, the entire disclosure of which is incorporated herein by reference. The second protective layer thickness should be selected based upon the requirements for use and the environment in which the cable will be used. The thickness my further be dependent upon the weight and strength of the material from which it is made. Thus, the thickness and composition of the second protective layer can be tailored to protect against specific environmental and/or physical risks to the core, cladding and coating that may be encountered and/or anticipated in a specific use for the cable.

The optical fiber cables can be greater than about 0.5 km (kilometer), greater than about 1 km, greater than about 2 km, greater than about 3 km, greater than about 4 km and greater than about 5 km. The preferred fibers using the preferred first and second protective layers can withstand temperatures of up to about 300 degrees C., pressures of up to about 3000 psi and as great as 36,000 psi, and corrosive environments over the length of the fiber without substantial loss of power and for extended periods of time. The optical fiber cables can have a power loss, for a given wavelength, of less then about 2.0 dB/km, less than about 1.5 dB/km, less than about 1.0 dB/km, less than about 0.5 dB/km and less than about 0.3 dB/km. The optical fiber cables can have power transmissions of at least about 50%, at least about 60%, at least about 80%, and at least about 90%.

The flexibility and/or stiffness of the cable can be varied based upon the size and types of materials that are used in the various layers of the cable. Thus, depending upon the application a stiffer or more flexible cable may be desirable. It is preferred that the cables have sufficient flexibility and strength to be capable of being repeatedly wound and unwound from a spool or reel having an outside diameter of no more than about 6 meters. This outside diameter spool size can be transported by truck on public highways. Thus, the present invention encompasses a spool or reel having an outside diameter of less than about 6 meters and comprising between 0.5 meters and 5 km of the optical fiber cable of the present invention; a spool or reel having an outside diameter of less than about 6 meters and comprising greater than about 0.5 km (kilometer), greater than about 1 km, greater than about 2 km, greater than about 3 km, greater than about 4 km and greater than about 5 km in length of the optical fiber cable of the present invention.

Any type of high power laser may be used as a source of laser energy for use with the optical fiber cables of the present invention. Examples of such lasers are disclosed in patent application Ser. No. 12/544,136, the disclosures of which are incorporated herein by reference. The composition and construction of the optical fiber cable, and in particular the composition of the core and cladding, should be selected to optimize the reduction in power loss for the particular beam that the laser generates. It is believed that lasers that generate a beam having a wavelength of about 800 nm to about 2000 nm, may see acceptable power loss, i.e., have a benefit, when used with the cables of the present invention. However, wavelengths from about 1060 nm to about 1100 nm and about 1470 nm to about 1600 nm have a greater potential benefit. High power infrared lasers are preferable. At present wavelengths of about 1490 nm, about 1550 nm, and about 1080 nm have even greater potential benefits and are preferred. Further, broad band beams within these wavelength ranges may have greater benefits. Preferably, the laser should generate a laser beam in the infrared wavelength having a power of at least about 1 kW, at least about 3 kW, at least about 5 kW, at least about 10 kW, and at least about 20 kW or greater.

An example of such a preferred laser for use with the optical fiber cables of the present invention is the IPG 20000 YB. The detailed properties of this laser are disclosed in patent application Ser. No. 12/544,136, the disclosures of which are incorporated herein by reference. The preferred laser consists of 20 modules. The gain bandwidth of a fiber laser is on the order of 20 nm, the linewidth of the free oscillator is 3 nm, Full Width Half Maximum (FWHM) and may range from 3 nm to 5 nm (although higher linewidths including 10 nm are envisioned and contemplated). Each module's wavelength is slightly different. The modules further each create a multi-mode beam. Thus, the cumulative effect of combining the beams from the modules is to maintain the Raman gain and the Brillouin gain at a lower value corresponding to the wavelengths and linewidths of the individual modules, and thus, consequently reducing the SBS and SRS phenomenon in the fiber when the combined beams are transmitted through the fiber.

Figure 3:
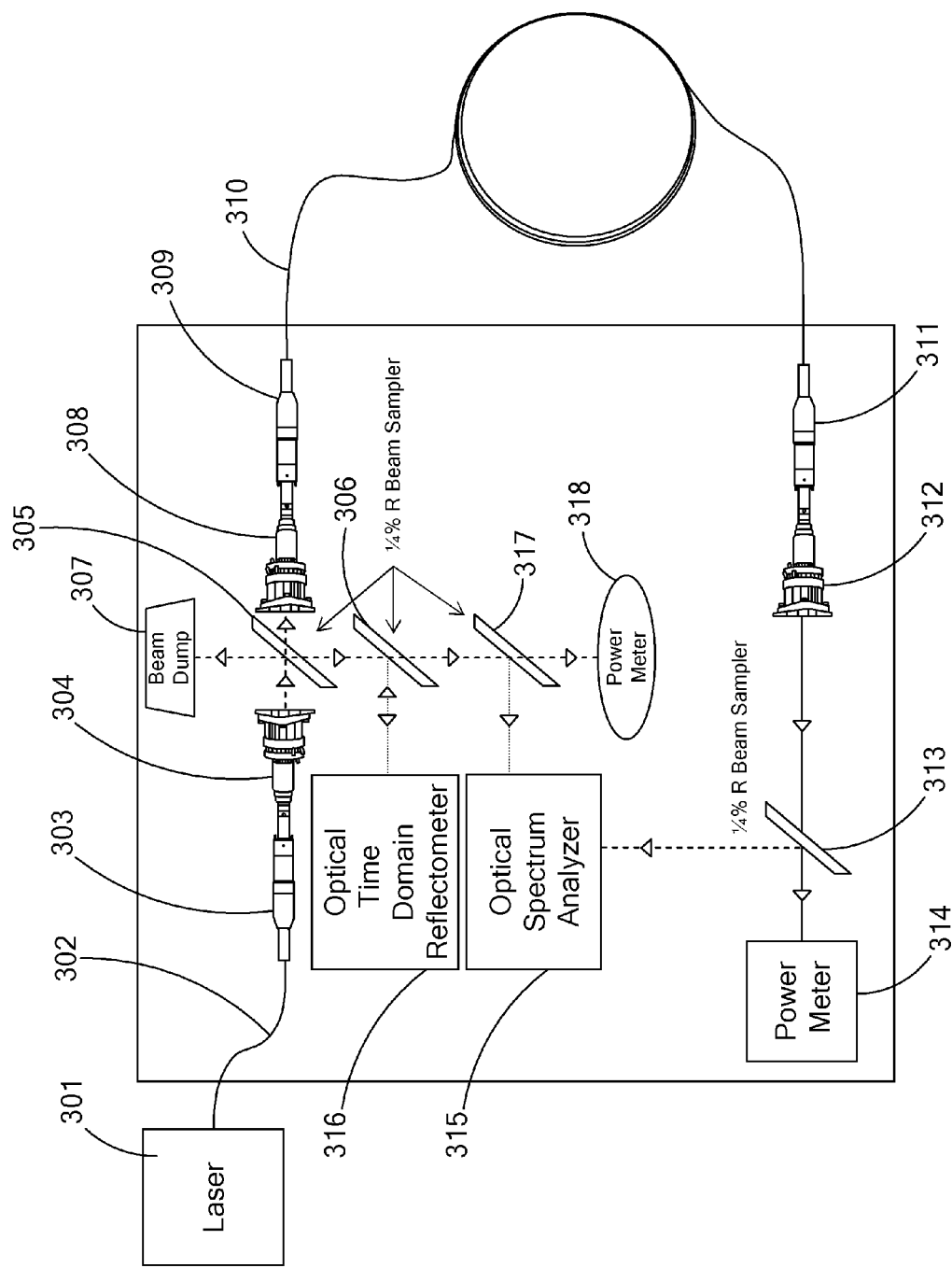
FIG. 3 is a schematic of a testing system.

The testing system of FIG. 3 can be used to evaluate various fibers of the present invention. Thus, there is provided a laser 301, a short, less than about 25 m, 300 μm fiber 302 connecting the laser to a QBH connector 303, which connects the fiber 302 to a collimator 304. The collimator 304 collimates the laser beam and passes the beam through a ¼% beam sampler 305. The beam may be directed at this point in the system to ¼% beam sampler 306, a beam dump 307, or collimator 308. Collimator 308 focuses the beam to input the beam into QBH connector 309. Collimator 308 comprises a focusing lens, a heat sink, and a fiber receptacle. Connector 309 is connected to collimator 308. Connector 309 is affixed to the long test fiber 310. The long test fiber 310 has a QBH connector 311, which connects long test the fiber 310 to a collimator 312. The laser beam travels from collimator 312 to ¼% beam sampler 313. From sampler 313 the beam can travel to a power meter 314 or an optical spectrum analyzer (OSA) 315. Optical time domain reflectometer (OTDR) 316, transmits and receives a timed laser beam through sampler 316, to sampler 305 and then along fiber 310. The OTDR 315 may also be used to test the fiber 310 separate from the laser 301. The laser beam from laser 301 travels from sampler 306 to ¼% beam sampler 317 and then to either OSA 315 or to power meter 318.

Example 1

An example of an embodiment of the optical fiber cable of the present invention is a fused silica core of about 600 microns diameter, a fluorine doped fused silica cladding, having a thickness of 60 microns, a high temperature Acrylate coating having a thickness of about 90 microns, a thixotropic gel first protective layer having a thickness of about 2500 microns, and a 316 stainless steel second protective layer having an outer diameter of about 6250 microns and a length of about 2 km. The length of the fiber structure comprising the core, cladding and coating is longer than the length of the stainless steel protective layer. This difference in length addresses any differential stretch of the stainless steel relative to the stretch of the fiber structure when the cable is in a hanging position, or under tensions, such as when it is extended down a well bore. The fiber has a numerical aperture of at least about 0.14. The fiber of this example can transmit a laser beam (wavelength 1080 nm) of about 20 kW (kilowatt) power, from the preferred laser, over a distance of about 2 km in temperatures of up to about 200 degrees C. and pressures of about 3000 psi with less than 1 dB/km power loss.

Example 2

An example of an embodiment of the optical fiber cable of the present invention would have a fused silica core of about 500 microns diameter, a fluorine doped fused silica cladding, having a thickness of 50 microns, an Acrylate coating having a thickness of about 60 microns, and an ⅛ inch outer diameter stainless steel protective layer and a length of about 2 km. The fiber has a numerical aperture (NA) of 0.22. The fiber of this example transmitted a laser beam (wavelength 1080 nm) of about 10 kW (kilowatt) power, from the preferred laser, over a distance of about 2 km in temperatures of up to about 150 degrees C. and at ambient pressure and with less than 0.8 dB/km power loss.

Example 3

An example of an embodiment of the optical fiber cable of the present invention is a fused silica core of about 600 microns diameter, a fluorine doped fused silica cladding, having a thickness of 60 microns, a high temperature Acrylate coating having a thickness of about 90 microns, and a ⅛ inch outer diameter stainless steel protective layer and a length of about 0.5 km. The fiber had a numerical aperture of 0.17. The fiber of this example transmitted a laser beam (wavelength 1080 nm) of about 10 kW power from the preferred laser, over a distance of about 0.5 km in temperatures of up to about 200 degrees C. and at ambient pressure and with less than 1 dB/km power loss.

Example 4

The preferred IPG 20000 YB laser was operated a duty cycle of 10% for a 1 kHz pulse rate. The operating conditions for this example were established to keep the pulse duration longer than the time constant for SBS. Thus, the absence of SBS was the result of the fiber and laser, not the pulse duration. The laser beam was transmitted through the 2 km fiber of Example 2, evaluated in a test system along the lines of the test system shown in FIG. 3 and provided the results set forth in Table I, where peak power launched and power output are in watts.

TABLE I

| Peak Power Launched | Peak Power Output | Percentage transmitted |
|---|---|---|
| 924 | 452 | 48.9 |
| 1535 | 864 | 56.3 |
| 1563 | 844 | 54.0 |
| 1660 | 864 | 52.0 |
| 1818 | 970 | 53.3 |
| 1932 | 1045 | 54.1 |
| 2000 | 1100 | 55.0 |
| 2224 | 1153 | 51.8 |
| 2297 | 1216 | 52.9 |
| 2495 | 1250 | 50.1 |
| 2632 | 1329 | 50.5 |
| 2756 | 1421 | 51.6 |
| 3028 | 1592 | 52.6 |
| 3421 | 1816 | 53.1 |
| 3684 | 1987 | 53.9 |
| 3947 | 2105 | 53.3 |
| 4342 | 2263 | 52.1 |
| 4605 | 2382 | 51.7 |
| 4868 | 2487 | 51.1 |

Figure 4:
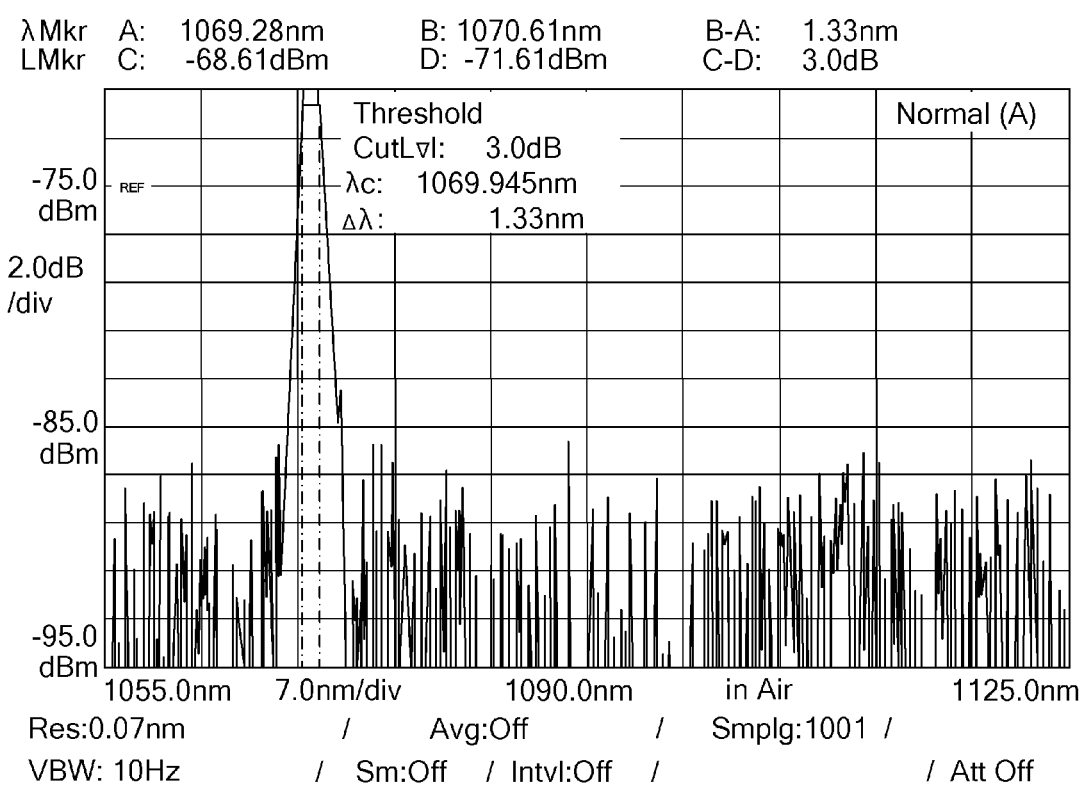
FIGS. 4-6 are spectrums of laser energy transmitted by the present invention showing the absence of SRS phenomena.

The spectrum for 4868 Watt power is shown at FIG. 4. The absence of SRS phenomenon is clearly shown in the spectrum. (As used herein terms such as, "absence of", "without any" or "free from" a particular phenomena or effect means that for all practical purpose the phenomena or effect is not present, and/or not observable by ordinary means used by one of skill in the art) Further the linear relationship of the launch (input) and output power confirms the absence of SBS phenomena. Further, the pulsed operation of the laser may have caused the wavelength of the fiber laser to chirp, which may have further contributed to the suppression of SBS and SRS phenomenon since this would result in an effectively wider laser linewidth.

Example 5

The preferred IPG 20000 YB laser was operated to provide a continuous wave. As set forth below in the table 1, 2, 4 and 6 modules were used. For each power the laser was fired for about 2 minutes and 15 seconds. The laser beam was transmitted through the 2 km fiber of Example 2, evaluated in a test system along the lines of the test system shown in FIG. 3 and provided the results set forth in Tables II, where laser power (input power), and power output are in watts and power throughput is synonymous with transmittance.

TABLE II

| | Laser Setting % | Laser Power Watts | Output of 2 km Fiber Watts | Power Throughput |
|---|---|---|---|---|
| One Module | 10 | 25 | 20 | 80% |
| | 11 | 70 | 52 | 74% |
| | 12 | 80 | 59 | 74% |
| | 13 | 90 | 66.5 | 74% |
| | 14 | 90 | 73.9 | 82% |
| | 15 | 110 | 81.5 | 74% |
| | 16 | 120 | 89.2 | 74% |
| | 17 | 130 | 96.5 | 74% |
| | 18 | 140 | 104.2 | 74% |
| | 19 | 150 | 111.2 | 74% |
| | 20 | 160 | 118.8 | 74% |
| | 21 | 170 | 126.2 | 74% |
| | 22 | 180 | 133.2 | 74% |
| | 23 | 190 | 140.5 | 74% |
| | 24 | 200 | 147.9 | 74% |
| | 25 | 210 | 155.2 | 74% |
| | 26 | 220 | 160.4 | 73% |
| | 27 | 230 | 167.2 | 73% |
| | 28 | 240 | 181 | 75% |

TABLE II-continued

| | Laser Setting % | Laser Power Watts | Output of 2 km Fiber Watts | Power Throughput |
|---|---|---|---|---|
| | 29 | 260 | 177.7 | 68% |
| | 31 | 280 | 191.8 | 69% |
| | 33 | 300 | 206.7 | 69% |
| | 35 | 330 | 221.5 | 67% |
| | 37 | 350 | 236.4 | 68% |
| | 39 | 360 | 250.1 | 69% |
| | 41 | 390 | 263.3 | 68% |
| | 23 | 190 | 120 | 63% |
| | 35 | 330 | 215 | 65% |
| | 41 | 400 | 257 | 64% |
| | 45 | 430 | 288 | 67% |
| | 50 | 490 | 313 | 64% |
| | 55 | 540 | 352 | 65% |
| | 60 | 590 | 382 | 65% |
| | 65 | 640 | 411 | 64% |
| | 70 | 690 | 477 | 69% |
| | 75 | 750 | 493 | 66% |
| | 80 | 800 | 525 | 66% |
| | 85 | 850 | 565 | 66% |
| | 90 | 900 | 599 | 67% |
| | 95 | 950 | 625 | 66% |
| | 100 | 1000 | 647 | 65% |
| Two modules | 50 | 990 | 655 | 66% |
| | 55 | 1100 | 709 | 64% |
| | 60 | 1200 | 820 | 68% |
| | 65 | 1310 | 855 | 65% |
| | 70 | 1410 | 940 | 67% |
| | 75 | 1510 | 1005 | 67% |
| | 80 | 1620 | 1060 | 65% |
| | 85 | 1730 | 1200 | 69% |
| | 90 | 1830 | 1220 | 67% |
| | 95 | 1930 | 1265 | 66% |
| | 100 | 2000 | 1340 | 67% |
| Four Modules | 50 | 1999 | 1310 | 66% |
| | 55 | 2200 | 1460 | 66% |
| | 60 | 2410 | 1588 | 66% |
| | 65 | 2630 | 1740 | 66% |
| | 70 | 2800 | 1852 | 66% |
| | 75 | 3040 | 2000 | 66% |
| | 80 | 3250 | 2130 | 66% |
| | 85 | 3460 | 2290 | 66% |
| | 90 | 3670 | 2430 | 66% |
| | 95 | 3870 | 2535 | 66% |
| | 100 | 4000 | 2675 | 67% |
| Six Modules | 65 | 4040 | 2665 | 66% |
| | 70 | 4350 | 2875 | 66% |
| | 75 | 4650 | 3100 | 67% |
| | 80 | 4930 | 3300 | 67% |

Figure 5:
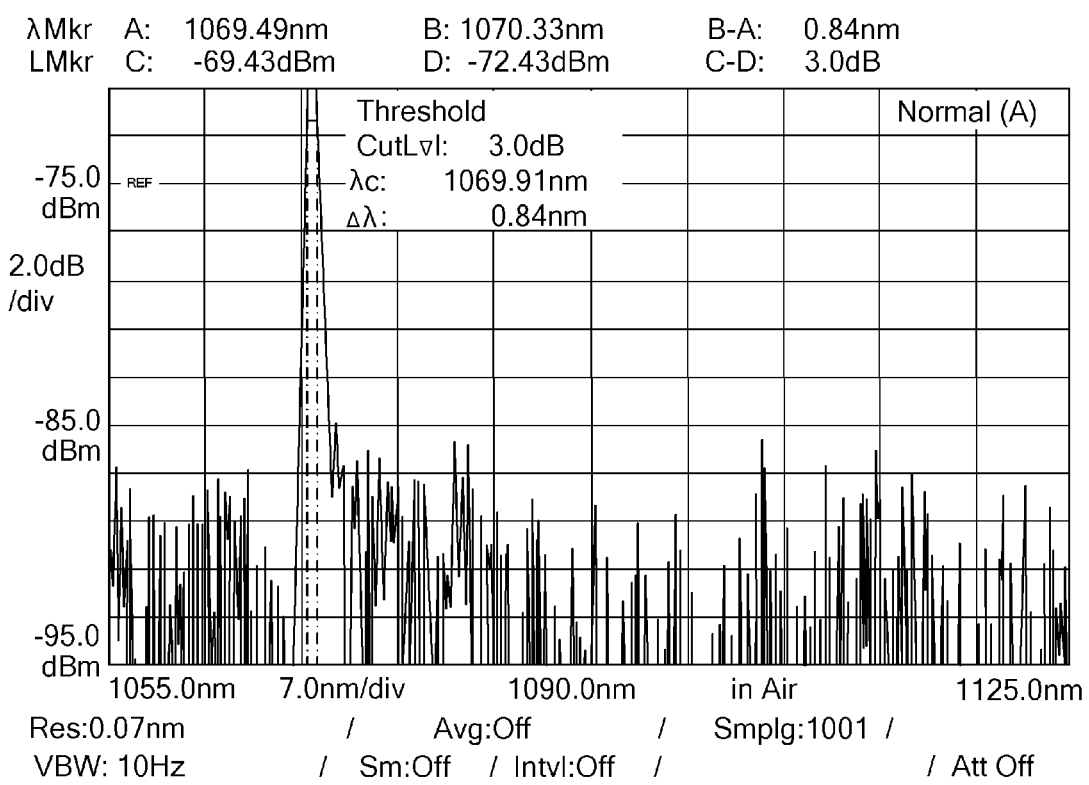

The spectrum for 4 modules at 100% laser setting is shown at FIG. 5. The absence of SRS phenomenon is clearly shown in the spectrum. Further the linear relationship of the input and output power confirms the absence of SBS phenomena.

Example 6

The preferred IPG 20000 YB laser was operated to provide a continuous wave. One module was used. For each power the laser was fired for about 2 minutes and 15 seconds. The laser beam was transmitted through the 0.5 km fiber of Example 3, evaluated in a test system along the lines of the test system shown in FIG. 3 and provided the results set forth in Tables III and IV, where laser power (input power), and power output are in watts and power throughput is synonymous with transmittance.

TABLE III

| Power in (W) | Power out (W) | % Transmission |
|---|---|---|
| 220 | 196 | 89.09% |
| 440 | 380 | 86.36% |
| 660 | 560 | 84.85% |
| 880 | 740 | 84.09% |
| 1000 | 840 | 84.00% |
| 1000 | 860 | 86.00% |
| 1000 | 880 | 88.00% |
| 1000 | 850 | 85.00% |
| 1000 | 850 | 85.00% |
| 1000 | 850 | 85.00% |
| 1000 | 850 | 85.00% |

TABLE IV

| Number of Modules | % laser power | Power in (W) | Power out (W) | % Transmission |
|---|---|---|---|---|
| 1 | 30 | 270 | 253 | 93.70% |
| 1 | 30 | 270 | 244 | 90.37% |
| 1 | 35 | 320 | 300 | 93.75% |
| 1 | 40 | 390 | 370 | 94.87% |
| 1 | 45 | 430 | 390 | 90.70% |
| 1 | 30 | 270 | 247 | 91.48% |
| 5 | 15 | 580 | 520 | 89.66% |
| 5 | 20 | 860 | 770 | 89.53% |
| 5 | 25 | 1140 | 980 | 85.96% |
| 5 | 30 | 1420 | 1230 | 86.62% |
| 5 | 35 | 1700 | 1440 | 84.71% |
| 5 | 40 | 1970 | 1700 | 86.29% |
| 5 | 45 | 2250 | 1910 | 84.89% |
| 5 | 50 | 2520 | 2150 | 85.32% |
| 5 | 55 | 2790 | 2350 | 84.23% |
| 5 | 60 | 3060 | 2600 | 84.97% |
| 5 | 65 | 3320 | 2800 | 84.34% |
| 5 | 70 | 3590 | 3000 | 83.57% |
| 5 | 75 | 3850 | 3200 | 83.12% |
| 5 | 80 | 4120 | 3500 | 84.95% |

Example 7

The preferred IPG 20000 YB laser was operated to provide a continuous wave. As set forth below in the table, 2, 6, 8 and 10 modules were used. For each power the laser was fired for about 2 minutes and 15 seconds. The laser beam was transmitted through the 2 km fiber of Example 2, evaluated in a test system along the lines of the test system shown in FIG. 3 and provided the results set forth in Table V, where laser power (input power), and power output are in watts and power throughput is synonymous with transmittance.

TABLE V

| Modules | Laser Setting % | Laser Power Watts | Output of 2k Fiber Watts | Throughput |
|---|---|---|---|---|
| Two Modules | 10 | 50 | 39 | 78% |
| | 15 | 220 | 162 | 74% |
| | 20 | 330 | 243 | 74% |
| | 25 | 440 | 320 | 73% |
| | 30 | 550 | 420 | 76% |
| | 35 | 660 | 470 | 71% |
| | 40 | 770 | 550 | 71% |
| | 45 | 880 | 650 | 74% |
| | 50 | 990 | 700 | 71% |
| | 55 | 1100 | 770 | 70% |
| | 60 | 1200 | 850 | 71% |
| | 65 | 1310 | 940 | 72% |
| | 70 | 1420 | 990 | 70% |
| | 75 | 1510 | 1070 | 71% |
| | 80 | 1610 | 1130 | 70% |
| | 85 | 1720 | 1200 | 70% |
| | 90 | 1820 | 1290 | 71% |
| | 95 | 1930 | 1370 | 71% |
| | 100 | 2020 | 1420 | 70% |

TABLE V-continued

| Modules | Laser Setting % | Laser Power Watts | Output of 2k Fiber Watts | Throughput |
|---|---|---|---|---|
| Six Modules | 10 | 150 | 130 | 87% |
| | 20 | 1040 | 710 | 68% |
| | 25 | 1380 | 940 | 68% |
| | 30 | 1720 | 1200 | 70% |
| | 35 | 2050 | 1420 | 69% |
| | 40 | 2390 | 1660 | 69% |
| | 45 | 2720 | 1900 | 70% |
| | 50 | 3050 | 2140 | 70% |
| | 55 | 3390 | 2350 | 69% |
| | 60 | 3710 | 2580 | 70% |
| | 65 | 4030 | 2810 | 70% |
| | 70 | 4350 | 3100 | 71% |
| | 75 | 4660 | 3200 | 69% |
| | 80 | 4980 | 3500 | 70% |
| | 85 | 5300 | 3700 | 70% |
| | 90 | 5620 | 3900 | 69% |
| | 95 | 5910 | 4100 | 69% |
| | 100 | 6210 | 4300 | 69% |
| Eight Modules | 40 | 3200 | 2150 | 67% |
| | 45 | 3650 | 2400 | 66% |
| | 50 | 4090 | 2750 | 67% |
| | 55 | 4530 | 3100 | 68% |
| | 60 | 4970 | 3400 | 68% |
| | 65 | 5390 | 3700 | 69% |
| | 70 | 5820 | 4000 | 69% |
| | 75 | 6240 | 4300 | 69% |
| | 80 | 6650 | 4600 | 69% |
| | 85 | 7080 | 4900 | 69% |
| | 90 | 7500 | 5200 | 69% |
| | 95 | 7920 | 5400 | 68% |
| | 100 | 8280 | 5700 | 69% |
| Ten Modules | 10 | 280 | 202 | 72% |
| | 15 | 1190 | 860 | 72% |
| | 20 | 1750 | 1210 | 69% |
| | 25 | 2320 | 1610 | 69% |
| | 30 | 2880 | 1980 | 69% |
| | 35 | 3440 | 2380 | 69% |
| | 40 | 4000 | 2750 | 69% |
| | 45 | 4550 | 3100 | 68% |
| | 50 | 5100 | 3500 | 69% |
| | 55 | 5640 | 3900 | 69% |
| | 60 | 6170 | 4300 | 70% |
| | 65 | 6690 | 4600 | 69% |
| | 70 | 7220 | 5000 | 69% |
| | 75 | 7740 | 5300 | 68% |
| | 80 | 8270 | 5700 | 69% |
| | 85 | 8790 | 6000 | 68% |
| | 90 | 9300 | 6300 | 68% |

Figure 6:
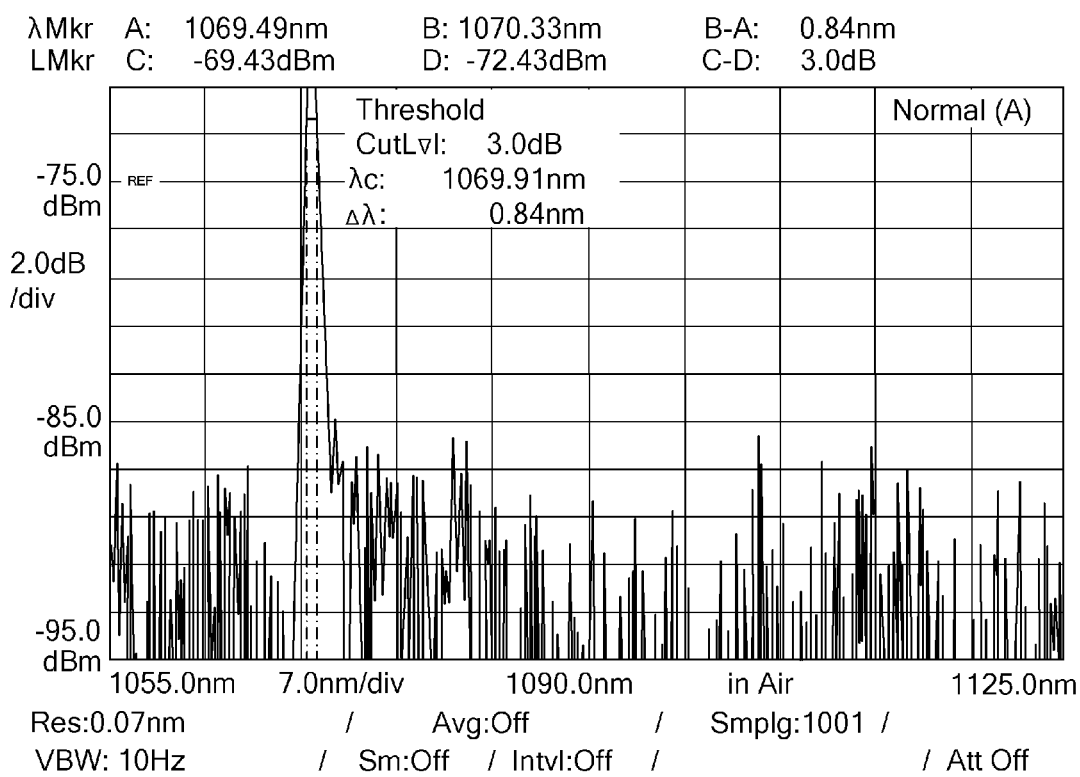

The spectrum for 10 modules at 9300 W output power, 90% laser setting is shown at FIG. 6. The absence of SRS phenomenon is clearly shown in the spectrum. Further the linear relationship of the input and output power confirms the absence of SBS phenomena.

The optical fiber cables of the present invention will have many and varied uses, some of which have yet to be realized. Thus, the optical fiber cables may be used to provide laser energy for use in well known laser tools, such as laser welding and cutting tools. It may be used to provide laser energy for use in newly developed and innovative laser tools, such as laser bottom hole assemblies for advancing boreholes, e.g., patent application Ser. No. 61/247,796 filed Oct. 1, 2009 title Method of Communicating Power and/or Data Though a Mud Motor and Ser. No. 12/544,038 filed Aug. 19, 2009, titled Apparatus for Advancing a Wellbore using High Power Laser Energy. It may be used to provide laser energy for use in the construction of pipelines. Further, the optical fiber cables of the present invention, because of their ability to be constructed of lightweight high strength material and to provide high power over great distances, maybe used to convert and/or create laser mechanical tools and equipment such as tunneling and earth boring and removal machines. Yet further, the cables of the present invention, because of their ability to be constructed of light weight high strength material and to provide high power over great distances, have the capability of being used in any application known or later discovered where the efficient transmission of high power energy over great distances is needed, useful and/or beneficial.

The optical fiber cables of the present invention may further be incorporated into, contained in, or used in conjunction with other tubular and/or wire types of equipments, such as for example, coiled tubing used in the drilling industry, drill pipe used in the drilling industry, and cables used for lowering, raising, holding and connecting equipment. The optical fiber cables of the present invention may be bundled together for a particular application, thus a plurality of cables may be used in a particular application and may be incorporated into, or enclosed within, and/or associated with tubulars, such as coiled tubing, drill pipe, casing and riser used in the drilling industry. Moreover, the optical fiber cables may be connected to each other. Further, a single cable may be connect to, or branched into using switches, several cables. In this way one high power laser may be used to provide high power energy to multiple tools over great distances and/or to provide high power laser energy to multiple tools that are separated by great distances.

Further although the use of single length of fiber, i.e., the length of fiber is made up of one fiber rather than a series of fibers coupled, spliced or other wise optically affixed end to end, for the longer distance power transmission is preferred, the use of multiple lengths of fiber joined end to end may be utilized. Moreover, several lengths of the optical fiber cables, or several lengths of fiber core structures, or combinations of both, many be joined into a plurality of such structures, such as in a bundle of optical fiber cables, fiber core structures or combinations of both.

Thus, the optical fiber cables of the present invention may be used to deliver high power laser energy over great distances to tools or machines, such as welders, cutters, earth boring, earth removal, and material removal equipment, in which the laser energy is then directed by such tools or machines onto a surface, material or work piece. Further, the optical fibers of the present invention may be used to provide operational power, e.g., power to operate a machine or device, over great distances. The optical fibers cables of the present invention can provide high power laser energy over great distances, for such uses, in harsh environments, such as for example in mines, tunnels, boreholes, shipyards, factories, nuclear sites, elevated temperatures, caustic conditions, corrosive conditions, and under water.

From the foregoing description, one skilled in the art can readily ascertain the essential characteristics of this invention, and without departing from the spirit and scope thereof, can make various changes and/or modifications of the invention to adapt it to various usages and conditions.

What is claimed:

1. An optical fiber cable for transmitting high power laser energy over great distances comprising: an optical fiber cable having a length that is greater than about 1 Km; the cable comprising:
   a. a core, comprising fused silica, and having a diameter of about 200 microns to about 700 microns;
   b. a cladding, comprising fused silica; and,
   c. a protective layer, wherein the protective layer surrounds the cladding, whereby the protective layer protects the cladding and the core;
   d. wherein, the cable is capable of transmitting laser energy having a power greater than or equal to about 5 kW over the length of the cable with a power loss of less than 2.2 dB/Km and without the presence of stimulated Brillouin scattering.

2. The optical fiber cable of claim 1, wherein the cable is capable of transmitting the laser energy without the presence of a stimulated Raman scattering spectral band; and, wherein the protective layer is adjacent the cladding.

3. The optical fiber cable of claim 1, wherein the laser energy has a power greater than or equal to about 10 kW, and wherein the cladding is adjacent the core.

4. The optical fiber cable of claim 1, wherein the cable is capable of transmitting the laser energy with a power loss of less than 1.1 dB/km; and, comprising a second protective layer between the cladding and the protective layer.

5. The optical fiber cable of claim 3, wherein the cable is capable of transmitting the laser energy with a power loss of less than 1.1 dB/km.

6. An optical fiber cable for transmitting high power laser energy over great distances comprising: an optical fiber cable having a length that is greater than about 1 Km; the cable comprising: a core; a cladding; a coating; and, a protective layer; wherein the coating is exterior of the cladding and interior of the protective layer; wherein, the cable is capable of transmitting laser energy having a power greater than or equal to about 5 kW over the length of the cable with a power loss of less than 1.1 dB/Km and with a substantially linear relationship of launch to output laser energy, thereby defining the avoidance of Stimulated Brillouin scattering.

7. The optical fiber cable of claim 6, wherein the cable is cable of transmitting the laser energy without the presence of a stimulated Raman scattering spectral band.

8. The optical fiber cable of claim 6, wherein the power loss is less than 0.33 dB/km.

9. An optical fiber cable for transmitting high power laser energy over great distances comprising: an optical fiber cable having a length that is greater than about 5 Km; the cable comprising: a core consisting essentially of fused silica, and defining a diameter of at least about 200 microns; a cladding comprising fused silica; a coating for withstanding high temperatures; a first protective layer; and, a second protective layer; wherein the coating, the first protective layer and the second protective layer are exterior to and protect the core and cladding; wherein, the cable is capable of transmitting laser energy having a power greater than or equal to about 10 kW over the length of the cable with a power loss of less than 2.2 dB/km.

10. The optical fiber of claim 9, wherein the cable is capable of transmitting the laser energy with a power loss of less than 1.1 dB/km; and, wherein the coating is adjacent the cladding.

11. The optical fiber cable of claim 9, wherein the cable is capable of transmitting the laser energy without the presence of a stimulated Raman scattering spectral band; and, wherein the coating is adjacent the cladding, and the first protective layer is adjacent the coating.

12. The optical fiber cable of claim 9, wherein the cable is capable of transmitting the laser energy with a linear relationship of launch to output laser energy; and wherein the cladding is adjacent the core.

13. The optical fiber cable of claim 9, wherein the cable is capable of transmitting the laser energy with a linear relationship of launch to output laser energy, thereby defining the absence of Stimulated Brillouin scattering.

14. An optical fiber cable for transmitting high power laser energy over great distances comprising: an optical fiber cable having a length that is greater than about 1 Km; the cable comprising: a core; a cladding; a coating; and, a protective layer; wherein the coating surrounds the cladding and the protective layer surrounds the coating; wherein, the cable is capable of transmitting laser energy having a power greater than or equal to about 5 kW over the length of the cable with a power loss of less than 1.1 dB/Km and with a substantially linear relationship of launch to output laser energy, thereby defining the management of Stimulated Brillouin scattering.

15. The optical fiber cable of claim 14, wherein the core comprises fused silica and defines a diameter of at least about 600 microns, wherein the cladding comprises a fluorine doped fused silica and defines a thickness of at least about 60 microns, and wherein the coating comprises a high temperature acrylate defining a thickness of at least about 90 microns, and the protective layer comprises an inner layer comprising a thixotropic gel and an outer layer comprising a stainless steel, whereby the optical fiber cable is capable of transmitting the laser energy in temperatures of up to about 200 degrees C. and pressures of about 3000 psi.

16. The optical fiber cable of claim 14, wherein the core comprises fused silica, wherein the cladding comprises a fluorine doped fused silica, and wherein the coating comprises a high temperature polymer, and the protective layer, comprises an inner layer and an outer layer, whereby the optical fiber cable is capable of transmitting the laser energy in temperatures of up to about 200 degrees C. and pressures of about 3000 psi.

* * * * *